United States Patent
Murase et al.

(10) Patent No.: US 7,802,295 B2
(45) Date of Patent: *Sep. 21, 2010

(54) AUTHENTICATION METHOD, AUTHENTICATION SYSTEM, AND AUTHENTICATION SERVER

(75) Inventors: Yasuhiro Murase, Tokyo (JP); Jun Moriya, Tokyo (JP); Noriyuki Sakoh, Tokyo (JP); Takeshi Iwatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 780 days.

This patent is subject to a terminal disclaimer.

(21) Appl. No.: 10/557,141

(22) PCT Filed: May 18, 2004

(86) PCT No.: PCT/JP2004/007052

§ 371 (c)(1),
(2), (4) Date: Nov. 17, 2005

(87) PCT Pub. No.: WO2005/015422

PCT Pub. Date: Feb. 17, 2005

(65) Prior Publication Data

US 2007/0044146 A1 Feb. 22, 2007

(30) Foreign Application Priority Data

Aug. 11, 2003 (JP) ............................. 2003-291741
Sep. 29, 2003 (JP) ............................. 2003-338917

(51) Int. Cl.
*H04L 29/06* (2006.01)
(52) U.S. Cl. ........................... 726/10; 713/156; 713/175
(58) Field of Classification Search .................. 726/10; 713/173, 175, 156, 158
See application file for complete search history.

(56) References Cited

U.S. PATENT DOCUMENTS 5,684,950 A * 11/1997 Dare et al. ..................... 726/10

(Continued)

FOREIGN PATENT DOCUMENTS

JP 2000-222360 8/2000

(Continued)

OTHER PUBLICATIONS

Neuman, B. Clifford and Ts'o, Theodore. Kerberos: An Authentication Service for Computer Networks, Sep. 1994, Insitute of Electrical and Electronics Engineers, pp. 33-38.*

(Continued)

*Primary Examiner*—Gilberto Barron, Jr.
*Assistant Examiner*—Virginia Ho
(74) *Attorney, Agent, or Firm*—Oblon, Spivak, McClelland, Maier & Neustadt, L.L.P.

(57) ABSTRACT

A user authentication processing is performed and an authentication session ID is returned to a terminal 500 (A14). An authentication server 600 issues and stores an authentication ticket (A17). The authentication ticket and authentication session are returned to the terminal 500 (A18). A user 100 transmits a request of service provision and the authentication ticket to a service provider's server 700, and the service provider's server 700 transmits the authentication ticket to the authentication server 600 (A20). The authentication server 600 performs an authentication processing of the authentication ticket (A21), and the authentication result is notified (A22). In the case of the authentication approval, a service session ID is issued together with the notification of authorization (A23). When receiving the notification of the authentication approval, the terminal 500 performs an establishment processing of the session using the received service session ID, and stores the service session ID (A27).

4 Claims, 26 Drawing Sheets

U.S. PATENT DOCUMENTS

| | | | |
|---|---|---|---|
| 7,275,260 B2* | 9/2007 | de Jong et al. | 726/10 |
| 7,530,099 B2* | 5/2009 | Flurry et al. | 726/8 |
| 2001/0037469 A1* | 11/2001 | Gupta et al. | 713/202 |
| 2002/0059574 A1* | 5/2002 | Tudor et al. | 725/1 |
| 2002/0147927 A1* | 10/2002 | Tait | 713/201 |
| 2003/0046541 A1* | 3/2003 | Gerdes et al. | 713/168 |
| 2004/0003396 A1* | 1/2004 | Babu | 725/34 |
| 2005/0022013 A1* | 1/2005 | Schwenk | 713/201 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 2003-196563 | 7/2003 |
| JP | 2003-296277 | 10/2003 |
| JP | 2004-185396 | 7/2004 |

OTHER PUBLICATIONS

IEEE 100: The Authoritative Dictionary of IEEE Standards Terms, Institute of Electrical and Electronics Engineers, Inc., Seventh Edition, Dec. 2000, p. 882.*

U.S. Appl. No. 10/526,902, filed Aug. 16, 2005, Yamashita et al.
U.S. Appl. No. 10/554,542, filed Oct. 25, 2005, Iwatsu et al.
U.S. Appl. No. 10/546,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murse et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

| USER NAME | USER ID | PASSWORD | SERVICE UTILIZATION HISTORY INFORMATION | USER'S PREFERENCE INFORMATION |
|---|---|---|---|---|
| YUKIHIRO YAMADA | 01587638 | atlantic | 02'/08/30 SHIOZAKI SUSUMU HAMABE ONLINE MUSIC PURCHASE USE SERVICE PROVIDER'S ID 4 | 02'/11/08 UDAGAWA AKARI FIRST DISTANCE CD PURCHASE USE SERVICE PROVIDER'S ID 1 | SHIOZAKI SUSUMU UDAGAWA AKARI POPS HIT CHART |
| ETSUKO HIRAKAWA | 01497635 | pacific | 03'/06/07 JAM OF NO. 497 AIRLINE TICKET PURCHASE USE SERVICE PROVIDER'S ID 3 | 03'/04/25 BERIDIAN BANGKOK HOTEL RESERVATION USE SERVICE PROVIDER'S ID 2 | TRAVEL HOTEL ETHNIC VACATION |

FIG. 4

AUTHENTICATION METHOD, AUTHENTICATION SYSTEM, AND AUTHENTICATION SERVER

TECHNICAL FIELD

The present invention relates to a single sign-on authentication method, system and server.

BACKGROUND OF THE INVENTION

Heretofore, the user authentication of a service offered by a service provider on the Internet (WWW server) has been individually performed by the service provider, so that a user has been required to make a direct contract with each of the service providers so as to receive the authentication from them. As a result, there has been a need for the user to store and periodically update the authentication information of each service provider, which has often caused inconveniences for the user (For example, Japanese Laid-Open Patent Publication No. 2003-44484).

Thus, a system referred to as the single sign-on system has been devised in which a user is required only to make a single log-in operation so as to be accessible to a plurality of service providers. The single sign-on system eliminates the need for the user to store and update a plurality of IDs and passwords, thereby reducing the user's load. The authentication which is available in common also reduces the load of the system managers or the application developers. In such conventional system, however, there have been following problems in the aspects of the system building and security.

1. Service providers are required to make their systems synchronized with a directory service and a predetermined single sign-on authentication processing procedure, etc., adopted by a single sign-on authentication facility provider, and thereby to build and operate their systems under this requirement, resulting in an additional cost.

2. When a service provider contracts with a plurality of network service providers and offers the service for the user of the plurality of network service providers, the service provider is required to build and operate a system corresponding to the single sign-on authentication system provided by each network service provider.

3. After the single sign-on authentication (the user authentication) by means of a user's ID/password, the information (hereinafter referred to as the session ID) sent from a user authentication server, for uniquely specifying the authorized user, needs to be stored in a terminal used by the user. As a result, when the session ID is stolen and illegally used in the other terminal, the service provider is unable to discriminate whether the access is made by the authorized user or not.

4. Since all services can be received with a session ID, if the session ID is stolen, the unauthorized user is able to access to all of the service providers from the other terminal.

BRIEF SUMMARY OF THE INVENTION

Accordingly, it is an object of the invention to provide an authentication method, system and server in which the above-mentioned problems are solved.

To this end, according to the invention, there is provided an authentication method in a system in which a plurality of authentication terminals subjected to authentication and operated by users, a common authentication server, and a plurality of servers of service providers are connected by way of a network, the authentication method comprising the steps of: a first authentication step in which the authentication server which has received a request of user authentication from an authentication terminal, authenticates the user operating the authentication terminal, and returns data generated as the authentication result to the authentication terminal, a second authentication step in which the authentication server which has received data of an authentication ticket request from the authentication terminal, performs authentication for issuing an authentication ticket, and returns data generated as the authentication result to the authentication terminal, a third authentication step performed so that a service provider's server which has received data of a service providing request including the authentication ticket from the authentication terminal, discriminates whether the authentication ticket is authorized, the third step comprising the steps of: transmitting an authentication ticket authentication request including data for certifying the authenticity of the service provider itself; determining the authenticity of the authentication ticket by receiving the result of authentication performed in the authentication server; and returning the data generated in the determination step to the authentication terminal.

According to the invention, there is provided an authentication system in which, a plurality of authentication terminals subjected to authentication and operated by users, a common authentication server and a plurality of the service provider's servers are connected by way of a network, the system comprising: first authentication means in which the authentication server which has received a request of user authentication from an authentication terminal, performs authentication of the user operating the authentication terminal, and returns data generated as the authentication result to the authentication terminal;

second authentication means in which the authentication server which has received data for an authentication ticket request from the authentication terminal, performs authentication for issuing an authentication ticket, and returns data generated as the authentication result including the authentication ticket to the authentication terminal; and third authentication means performed so that a service provider's server which has received a service providing request including the authentication ticket from the authentication terminal, discriminates the authenticity of the authentication ticket, the third authentication means comprising: transmission means for transmitting to the authentication server an authentication ticket authentication request including data for certifying the authenticity of the service provider itself;

determination means for determining the authenticity of the authentication ticket by receiving the result of authentication performed in the authentication server; and means for returning the data generated in the determination means to the authentication terminal.

According to the invention, there is provided an authentication server which are connected with a plurality of authentication terminals subjected to authentication and operated by users and with a plurality of service provider's servers by way of a network, and which are common to the authentication terminals and the service provider's servers, the authentication server comprising: first authentication means for receiving a request of user authentication from an authentication terminal to perform authentication of a user operating the authentication terminal, and for returning data generated as the authentication result to the authentication terminal;

second authentication means for receiving data of an authentication ticket request from the authentication terminal to perform authentication for issuing an authentication ticket, and for returning data including the authentication ticket generated as the authentication result to the authentication terminal; and third authentication means performed so that a service provider's server, which has received data of a service providing request including the authentication ticket from the authentication terminal, discriminates the authenticity of the authentication ticket;

the third authentication means comprising: receiving means for receiving from the service provider's server an authentication ticket authentication request including data for certifying the authenticity of the service provider itself;

determination means for determining the authenticity of the authentication ticket; and means for transmitting data generated in the determination means to the service provider's server, the service provider's server returning the data generated in the determination means to the authentication terminal.

A first advantage of the invention is that the cost required of the service provider 300 for building and operating the system can be substantially reduced.

In the prior art method, it has been necessary to comply with the method in accordance with the directory services, etc. provided by the network providers, but in the method according to the invention, it is possible to build the system even by means of the HTTP (Hypertext Transfer Protocol) and SSL (Secure Socket Layer) which are generally known. Also, the portions which the service providers are required to build are fundamentally as follows;

1) issuance, transmission/reception, management of the service session ID, 2) transmission/reception of the authentication ticket and of the authentication result of the authentication ticket, 3) transmission of the service provider's ID to the authentication server 600.

The framework of any service currently provided by way of the network, if any, can be diverted to 1), so that the system building is actually required only for 2) and 3). Accordingly, with the use of the single sign-on authentication system according to the invention, the service provider will be able to achieve a substantial cost reduction compared to the prior art system.

Moreover, when the service provider makes contracts with a plurality of network service providers and provides services for the user of the plurality of network service providers, a substantial cost reduction will be able to be achieved. Although the system building and operation in the prior art system have been required to comply with the single sign-on authentication system of each network service provider, the single sign-on system of the network service provider, according to the invention, despite the fact that the single sign-on system is the same as in the prior art, enables the form of the authentication ticket to be changed for each network service provider. Thus, by the discriminating the form of the authentication ticket, the service provider is able to discriminate the network service provider which is utilized by the user to access the service provider, so that the service provider needs to build the system only once in order to provide services for the user of the plurality of network service providers.

A second advantage of the invention is that when the network service provider builds a system based on the single sign-on authentication system according to the invention, the participation barrier for providing services as the service provider can be substantially eliminated. As described in the first advantage of the invention, this is because the system is easily built.

A third advantage of the invention is that the level of the security will be substantially enhanced. Since, in the prior art system, the terminal accesses the authentication server and each service provider's server by using the session ID which is obtained by the terminal from the authentication server after completion of authentication between the terminal and the authentication server, if the session ID is stolen on the communication path, and from the terminal and the service provider's server, an unauthorized user is able to access to all of the service provider's servers from the other terminal by using the stolen ID.

However, in the system according to the invention, all of the session IDs which are transmitted and received on the communication path are different, so that the service session ID used in managing the session between the terminal and the service provider's server is uniquely specified for each service provider's server, and the session management system is also different for each service provider. As a result, even if a service session ID is stolen, the area that an unauthorized user can access from the other terminal will be able to be restricted only to the service provider's server corresponding to the stolen ID.

Moreover, even if the authentication ticket is stolen, since the validity period of the authentication ticket is set to be within several minutes, the unauthorized use of the authentication ticket by the unauthorized user is difficult. In a case where the authentication ticket is encrypted, for example, it is almost impossible to decrypt and use the authentication ticket within several minutes.

The fourth advantage is that unauthorized service providers can be systematically eliminated. In the prior art single sign-on system, there has been systematically no choice but to fundamentally trust the service provider's server, but in the system according to the invention, the service provider is obliged to transmit the above-mentioned service provider's ID to the authentication server when accessing the authentication server, which makes it possible to discriminate whether the service provider is authorized or not.

The fifth advantage is that the linking between the authentication ticket and various system services will be possible. For example, since the form of the authentication ticket can be changed for each network service provider, the service providers will be able to customize their services for the user of each network service provider by discriminating the form of the authentication ticket.

For example, when it is assumed that the network service provider is currently the Internet provider and the service provider is each EC (Electronic Commerce) shop, the authentication ticket issued by each provider, the form of which is made different with respect to each provider, allows the EC shop to identify the provider accessing to the EC shop, thereby enabling to provide the user of each provider with services which can not be provided by the prior art EC shop.

The sixth advantage of the invention is that since the network service provider issuing the authentication ticket performs not only the authentication of the user (the terminal), but also the authentication of the service provider, when an unauthorized service provider provides an unauthorized service to the user, the unauthorized service provider can be immediately cut off from the information communication network. This enables the network communication to be securely performed in the interconnection between the user, the network service provider and the service provider, and the network communication performed by unauthorized service providers to be disconnected, thereby allowing the basis for providing the network service with enhanced safety and flexibility to be built by the use of the single sign-on authentication system according to the invention.

BRIEF DESCRIPTION OF THE DRAWINGS

FIG. 4 is a schematic diagram used for the explanation of the database with which an authentication server is provided;

DETAILED DESCRIPTION OF THE INVENTION

(1) A First Embodiment

Hereafter, a first embodiment according to the invention is described with reference to the drawings. The correspondence relation between terms used in the claims of the specification and those used in the embodiments is described below.

First authentication step: a user authentication processing performed by the user to an authentication server by using the user authentication information including user's ID/password, and the like. The data generated as the authentication result is the authentication approval information (the authentication session ID) or the authentication disapproval information.

Second authentication step: a processing performed by the authentication server which has received a request for issuing an authentication ticket from an authentication terminal, for discriminating the authenticity of the authentication terminal by means of the authentication session ID. Upon determination of the authenticity, the authentication ticket and the authentication session ID are returned to the terminal.

Third authentication step: a service provider's server sends an authentication ticket authentication request including the data (the service provider's ID) for certifying the authenticity of the service provider to the authentication server, and the authentication server authenticates the service provider and the authentication ticket, so that the authentication result is transmitted to the service provider.

Figure 1:
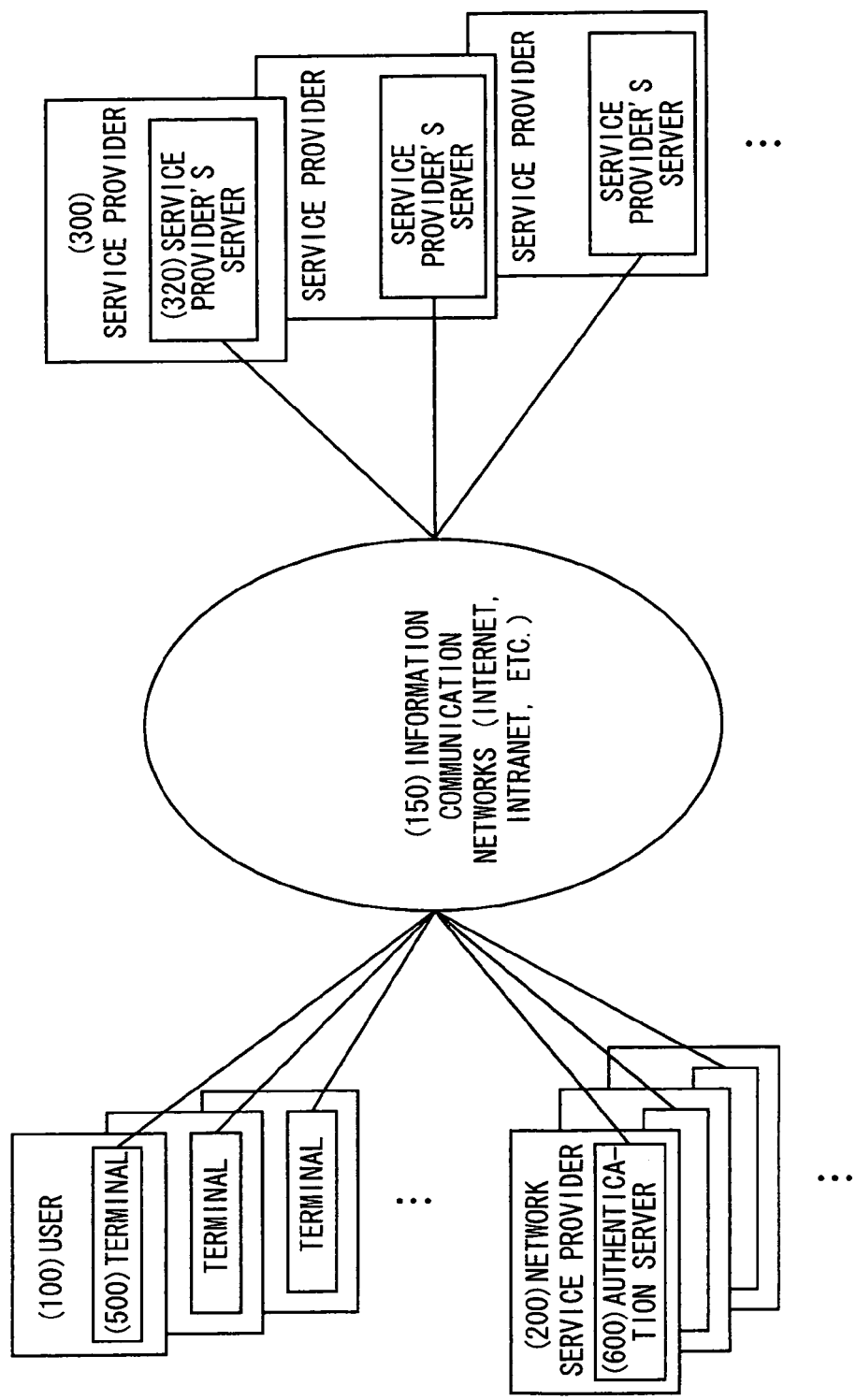
FIG. 1 is a block diagram showing the construction of a first embodiment of the authentication system according to the invention.

FIG. 1 shows a system configuration of an embodiment according to the invention.

First, as a system configuration, the system is assumed to consist of three elements including the user 100, the network service provider 200, and the service provider 300, the number of elements and the relationship between the roles of the elements being defined as follows.

1. The Number of Elements

"the user 100:the network service provider 200:the service provider 300=m:1:n"

2. Roles

1) User 100

The user 100 has a role to be able to receive services through the network service provider 200. Further, when receiving the services, the user is required to make a contract with the network service provider 200 in any case. On the contrary, the user is able to receive the service by making a contract only with the network service provider 200, without making a contract directly with each service provider 300. An example of the services is the connection to the Internet or the Intranet.

2) Network Service Provider 200

The network service provider 200 has a role to mediate between the user 100 and the service provider 300, and performs the operation and management of the portal server which plays a role like a primary window for enabling the user 100 to receive the services. The network service provider 200 makes a direct contract with each service provider 300 so as to provide the user 100 with the entrance to each service, and a security function such as an authentication function required when the user 100 receives the services, and with functions to improve the convenience of the user 100 for receiving the services. The network service provider 200 is also able to make a direct contract with the service provider 300 or to build a direct service by itself in order to expand the service menu for the user 100.

3) Service Provider 300

The service provider 300 has a role to provide the services themselves for the user 100. When providing the services for the user 100, the service provider 300 needs to make a direct contract with the network service provider 200. On the contrary, in the case where the service provider 300 has made a contract with the network service provider 200, the service provider 300 is able to provide the services for all of the users 100 without making a contract directly with each user 100.

Next, a system configuration for realizing the business model is assumed. The individual elements and the numbers and the role of the elements are as follows.

1. The Number of Elements

"the terminal 500:the authentication server 600:the service provider 700=m:1:n"

2. Roles

1) Terminal 500

The terminal 500 is a system, program and apparatus which has functions required for enabling the user to receive the services, and which is connected to the information communication network 150. In an exemplary configuration, all of the terminals which have the terminal functions (described below) required for the single sign-on authentication system of an embodiment are included in the object;

(a) a function of requiring the user authentication (including transmission of the user authentication information) for the authentication server 600.

(b) a function of maintaining the authentication session with the authentication server 600.

(c) a function of requiring the authentication ticket for the authentication server 600.

(d) a function of requiring the authentication (transmission of the authentication ticket) by means of the authentication ticket for the service provider's server 700.

(e) a processing function with regard to the response results in (a) to (d).

2) Authentication Server 600

The authentication server 600 is a system, software and apparatus, which has functions (described below) required when the service provider's server 700 provides services for the terminals 500, for improving the security function and the convenience of the users 100 who receives the services, and which is possessed by the network service provider 200 and is connected to the information communication network 150;

(a) a function of performing the user authentication processing based on the request of the user authentication from the terminal 500 and returning the authentication result, (b) a function of maintaining and managing the authentication session with the terminal 500, (c) a function of the authenticating and managing the service provider's server 700, (d) a function of receiving the authentication ticket request from the terminal 500, and issuing the authentication ticket and returning it to the terminal 500, (e) a function of receiving the authentication ticket confirmation request from the service provider's server 700, performing confirmation and authentication on the authenticity of the authentication ticket and returning the authentication result to the service provider's server 700, (f) a function of receiving the regular registration request from the service provider's server 700 before providing the services for the users 100, registering as the regular service provider 300 and issuing the service provider's ID to the service provider's server 700.

3) Service Provider's Server 700

The service provider's server 700 is a system, program and apparatus, which has functions (described below) to be connected with the terminal 500 to provide the services for the user 100, and to be connected with the authentication server 600 to authenticate the user 100 and the terminal 500, and which is connected to the information communication network 150;

(a) a function of receiving the authentication request by means of the authentication ticket from the terminal 500, transmitting to the authentication server 600 a request for the authenticity confirmation and authentication, and receiving the return result, (b) a function of discriminating the return result received in (a) and returning the authentication result to the terminal 500.

4) Information Communication Network 150

The information communication network 150 is necessary for the interconnection between the terminal 500, the authentication server 600 and the service provider's server 700, and is also an information communication network capable of the transmission and reception of the digital data with which the single sign-on authentication system of an embodiment can be realized, and is the Internet or the intranet.

The operation of the embodiment according to the invention described above will be explained with reference to FIG. 1. Thereafter, the details of the operation will be explained with reference to FIG. 2. The communication path is also assumed to. be fully encrypted from the security point of view, and the meanings of the terms used herein are as follows.

1. Log-in Operation

The log-in operation is an operation in which the user 100 performs the authentication request to the authentication server using the user's ID/password.

On the basis of the authentication result, the accessibility of the user 100 to the network services is discriminated. The user's ID/password are, for example, assumed to be common between a plurality of service providers.

2. Authentication Ticket

Figure 3:
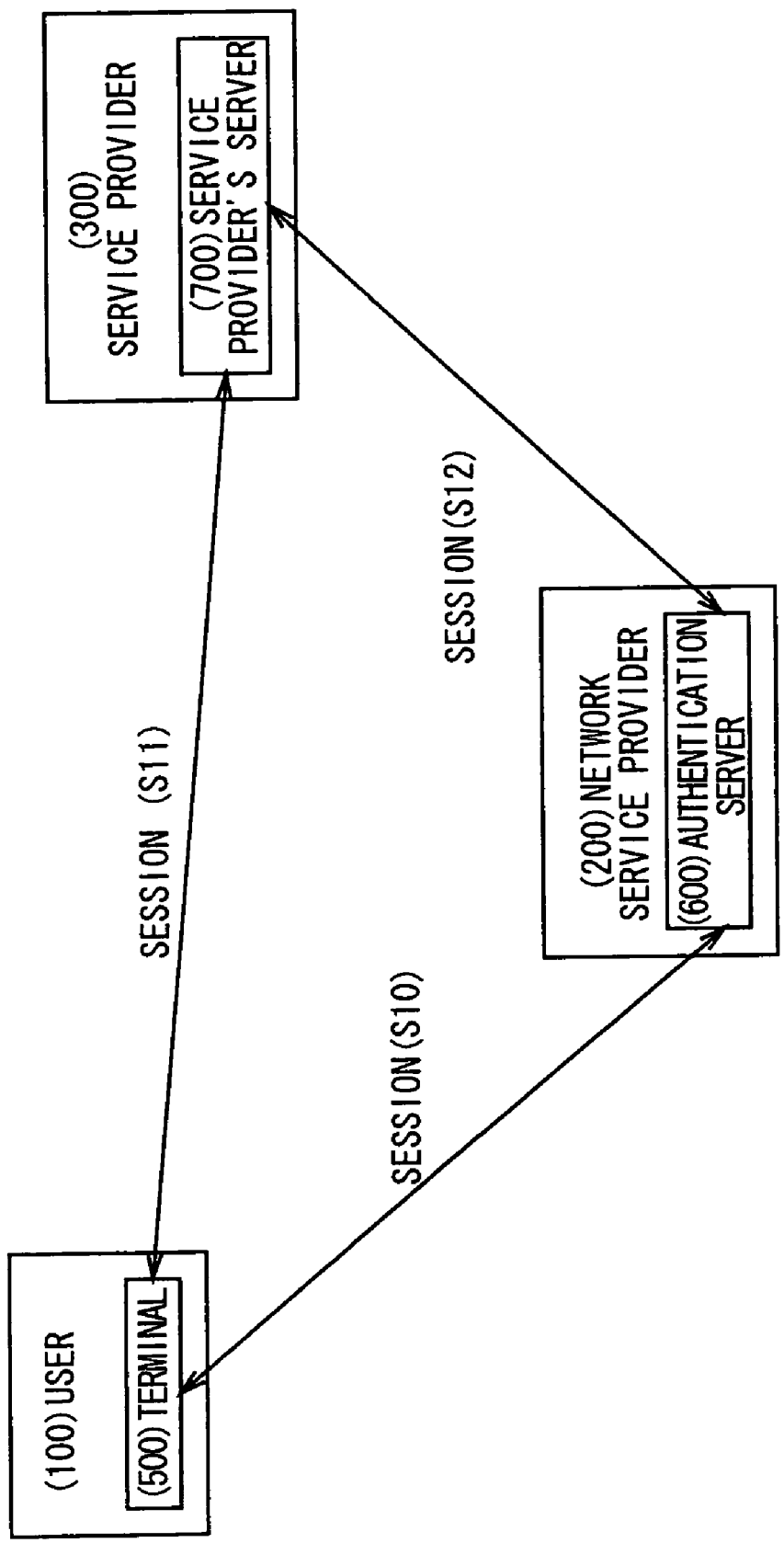
FIG. 3 is a schematic diagram showing the correlation between the authentication in the first embodiment and claims according to the invention.

The authentication ticket is used between the terminals 500 the authentication server 600 and the service provider's server 700 and plays a central role in the single sign-on authentication system of the embodiment. The functions and requirements for the authentication ticket are as follows. The correlation between each link session and the authentication is also shown in FIG. 3 and described below.

1) The authentication ticket is an uniquely different ID (data) which is issued only to the terminal 500 authorized by the authentication server 600 and does not include the user authentication information, and the form of which is various.

2) The authentication ticket is an one-time ID which can be used only once (for the authentication by the authentication server 600).

Figure 2:
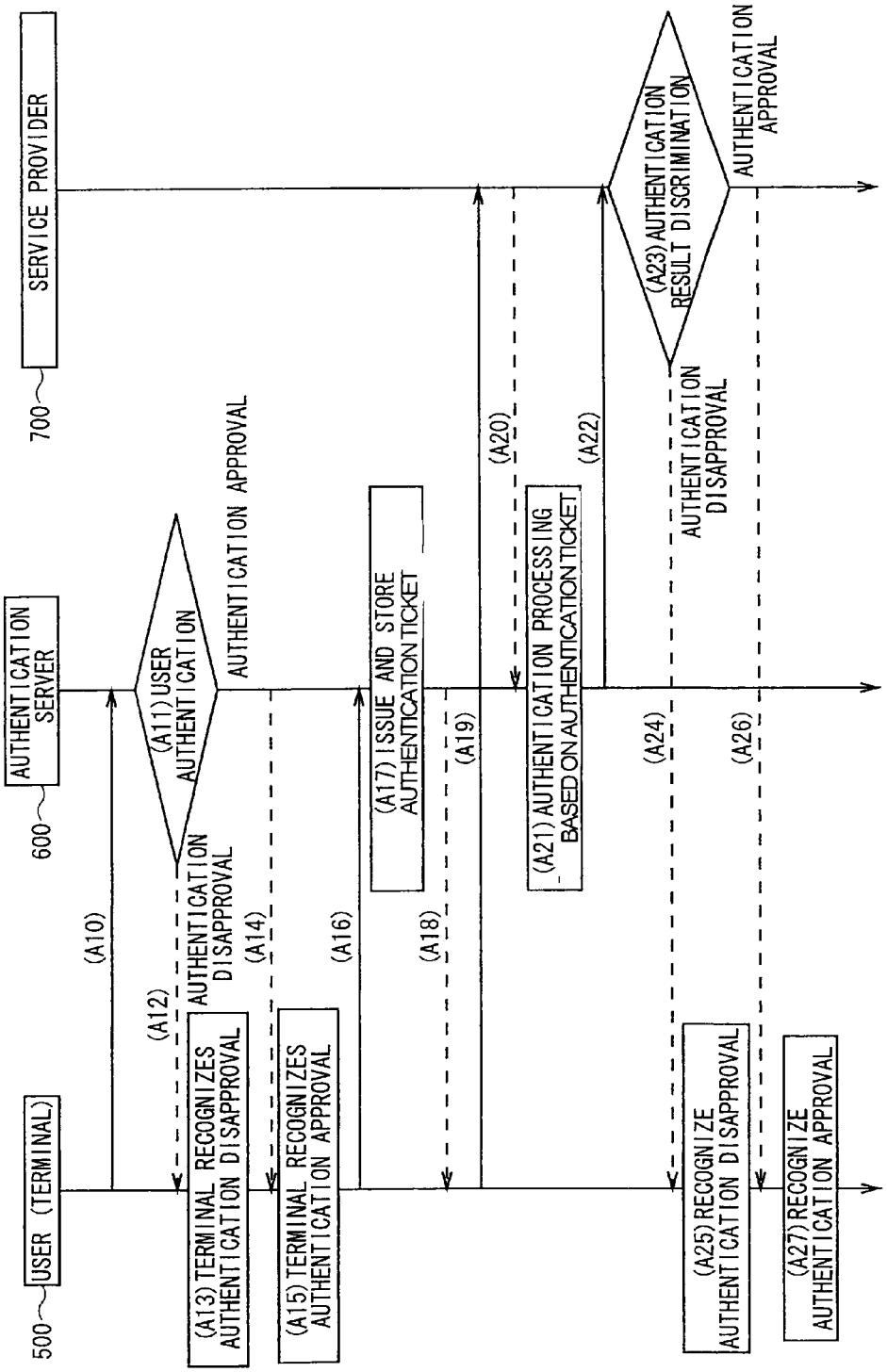
FIG. 2 is a flow chart explaining the flow of the processing of the first embodiment according to the invention.

3) A validity period is provided between the issuance of the authentication ticket and the implementation of the authentication, and when the confirmation request for the authentication ticket after the issuance of the authentication ticket is not received by the authentication server 600 within the validity period (which is, for example, set to several minutes from the issuance in (A17) to the confirmation in (A21) in FIG. 2), the authentication ticket is automatically made invalid. Further, even when the authentication is confirmed within the validity period, the authentication ticket is discarded in the authentication server 600, because it is not used in the subsequent steps. This operation is based on the ground described in 2) and also aims at preventing the unauthorized use of the authentication ticket.

4) The authentication ticket is an uniquely different ID, and hence to be able to be used by the terminal 500 and the service provider 700 for other specified applications without causing any problem. The authentication ticket, for which the validity period is provided, and which is issued for one-time use, is configured such that it can not be stored so as to be used afterward for the unauthorized authentication, thereby preventing the occurrence of the problem.

5) The authentication ticket may be signed and encrypted as required.

3. Authentication Session ID

The authentication session ID is an unique ID which is issued from the authentication server 600 to the terminal 500 when the authentication of the user 100 is normally completed between the terminal 500 and the authentication server 600. A terminal storing the authentication session ID is regarded as the terminal of which the authentication of the user 100 has been normally completed.

The authentication session ID is an authentication which is performed by making the user 100 manually input the authentication information in which a combination of some of the user's ID/password, the apparatus classification information, the apparatus inherent information, the challenge phrase, etc. is employed. The authentication session ID, in which an ID information unique to each apparatus and the authentication ticket itself are also considered to be included, has itself a validity period and may be signed and encrypted as required.

4. Service Session ID

The service session ID is an unique ID issued by the service provider's server 700 to the terminal 500, when the service provider's server 700, which has received the authentication ticket sent from the terminal 500, makes a request of confirmation and authentication of the authentication ticket sent from the terminal 500 to the authentication server 600, so that the authentication is successfully performed by the authentication server 600.

The terminal storing the service session ID is regarded as the terminal of which authentication has already been performed by the authentication server 600 in accordance with the request from the service provider's server 700.

The service session ID, in which an ID information unique to each apparatus and the authentication ticket itself are also considered to be included, has itself a validity period and may be signed and encrypted as required.

5. Service Provider's ID

The service provider's ID is a unique ID which indicates the service provider as the authorized service provider, and which is issued by the authentication server 600, when the service provider, before providing the service for the user 100, performs beforehand the normal procedure of registering in the authentication server 600 the service provider's server 700 to be used at the time of the service provision, so that the registration is normally completed.

The service provider's ID is an ID which needs to be issued before providing the service for the user 100. A service provider, of which service provider's ID has not been issued by the authentication server 600, is not regarded as the authorized service provider, and hence is unable to provide the service for the user 100. The service provider's ID is also able to be provided with a validity period, and in the case where the validity period is set, the regular registration needs to be performed again after expiration of the validity period. Further, the service provider's ID may be signed and encrypted as required.

The method for obtaining the service provider's ID is not limited to the method in which the service provider's ID is obtained from the network service provider 200 by effecting a systematic connection with the authentication server 600.

The service provider 300, which does not possess systematic means for obtaining the service provider's ID, is also able to obtain the service provider's ID by some alternative means when making a contract with the network service provider 200.

FIG. 3 shows a correlation between each authentication and the session. The authentication is permitted by the log-in operation by the user 100, i.e., the transmission of the user's ID/password from the terminal 500, and the session S10 between the terminal 500 and the authentication server 600 is maintained by the authentication session ID issued by the authentication server 600. The authentication session S10 is cut off by the explicit log-out by the user 100, the time out of the authentication session and the disconnection of the network due to the occurrence of abnormality, etc.

The service provider 300 receives an access request from the user 100 (the terminal 500 transmits an authentication ticket), and the service provider 300 discriminates the access request. That is, the service provider's server 700 transmits the authentication ticket received from the terminal 500 to the authentication server 600 for effecting confirmation. As a result, when the access is permitted, the session S11 between the terminal 500 and the service provider's server 700 is maintained by the service session ID issued by the service providers server 700. The service session S11 is cut off by the explicit log-out by the user 100, the time out of the authentication session and network disconnection due to the occurrence of abnormality, etc.

Although the session S12 between the network service provider 200 and the service pro vider 300 is not maintained in particular, the authentication server 600 discriminates whether the access is possible or not, when the service provider's server 700 accesses and transmits to the authentication server 600 the service providers ID assigned when the network service provider 200 made a contract with the service provider 300.

The operation of an embodiment according to the invention is described.

1. When accessing the network service, the user 100 performs the log-in operation to the authentication server 600. The user 100 performs the user authentication by means of the user's ID/password during the log-in operation. When the authentication is completed normally, the terminal 500 receives the authentication approval information (hereinafter referred to as the authentication session ID) from the authentication server 600. Thereafter, the communication between the terminal 500 and the authentication server 600 is performed by surely using the authentication session ID which is effective only therebetween. The authentication session ID is also uniquely different for each terminal 500. When the authentication session ID becomes invalid (in the case of the explicit log-out by the user 100, the automatic session disconnection due to the expiration of the authentication session holding period, etc.), the user 100 performs the log-in operation again.

2. After the log-in operation, the user 100 selects a service which the user 100 wishes to receive. When the user selects the service to go to access the service provider's server 700, the authentication ticket is obtained from the authentication server 600 in advance, because the authentication ticket needs to be transmitted to the service provider's server 700. Here, when the authentication ticket is unable to be received from the authentication server 600, the authentication session ID of 1 described above is invalid, so that the user 100 needs to perform the log-in operation again.

3. The user 100 transmits the authentication ticket received from the authentication server 600 to the service provider's server 700 after the selection of the service.

4. When receiving the authentication ticket, the service provider's server 700 makes an authentication request to the authentication server 600, and receives the result. When the authentication ticket is discriminated to be valid as a result of authentication by the authentication server 600, the service provision authorization information (herein after referred to as service session ID) is transmitted to the terminal 500. When it is discriminated that a problem exists in the authentication ticket, the contents of the problem (the error information) is transmitted to the terminal 500.

5. When receiving the service session ID, the terminal 500 is able to receive the service from the service provider's server 700. Upon receipt of the error information, the log-in operation and the re-acquisition of the authentication ticket is performed by the user 100. Moreover, the service session ID is uniquely assigned for each path between the terminal 500 and the service provider's server 700, when the service session ID becomes invalid (as in the case of the authentication session ID), the user 100 also performs the log-in operation and re-acquisition of the authentication ticket. Here, the format of the service session ID is ignored, but the case where the authentication ticket is included is also taken into account.

Next, the more detailed operation of an embodiment according to the invention is described with reference to FIG. 2. The reference numerals such as (A10) described in FIG. 2 is assigned correspondingly to each operation, and ranges from (A10) to (A27). With the combination of all of such individual operation, the single sign-on authentication system of the embodiment will be realized.

1. In step A10, the terminal 500 transmits to the authentication server 600 the user's ID/password (the user authentication information) which the user 100 has inputted at the time of the log-in operation. After the transmission, the terminal 500 is shifted to a standby state until the authentication result is returned from the authentication server 600.

2. In step A11, the authentication server 600, which has received the user authentication information, performs the user authentication processing based on the information, and obtains the authentication processing result. As a result, when the authentication is disapproved, the authentication disapproval is notified to the terminal 500 (step A12). When the authentication is approved, the authentication session ID is returned to the terminal 500 together with the notification of authorization (step A14).

3. When the terminal 500 which has been in a standby state receives the notification of the authentication disapproval, the terminal 500 notifies the user 100 of the authentication disapproval through a screen display (step A13). When the notification of the authentication approval is received, the terminal 500 performs the session establishment processing using the authentication session ID received together with the notification, and saves the authentication session ID in the terminal 500 (step A15). The processing up to the step A15 is the user authentication, and the following is the authentication by means of the authentication ticket.

4. After completion of the user authentication, the user 100 selects the service that the user wishes to receive, but is required to obtain the authentication ticket in order to receive the service. Then, in step A16, the terminal 500 transmits the authentication ticket request to the authentication server 600. At the same time, the terminal 500 also transmits the authentication session ID which is necessary to access the authentication server 600. After the transmission, the terminal 500 is shifted to a standby state until the request result is returned.

5. The authentication server 600 which has received the authentication ticket request from the terminal 500 discriminates the authenticity of the access from the terminal 500 by using the authentication session ID received simultaneously with the request. After the authentication of the terminal, in step A17, the authentication server 600 issues the authentication ticket which is to be returned to the terminal 500, and also stores the issued authentication ticket in the authentication server 600 itself.

6. In step A18, the authentication server 600 returns the issued authentication ticket to the terminal 500. At the same time, the authentication server 600 also returns the authentication session ID of which the validity period has been extended.

7. The terminal 500 which has been in a standby state receives the authentication ticket and the authentication session ID. Here, in step A19 in which the authentication session ID stored in the terminal 500 is updated based on the authentication session ID of which the validity period has been extended, the terminal 500 transmits a service provision request, for example, a connection request to the network, and the authentication ticket to the service provider's server 700 which has been selected in the above-mentioned stage 4 by the user 100.

After the transmission, the terminal 500 deletes the authentication ticket and is shifted to a standby state.

8. The service provider's server 700 which has received the authentication ticket from the terminal 500 transmits, in step A20, the authentication ticket to the authentication server 600 in order to discriminate the authenticity of the transmitted authentication ticket and waits for the return result. At the same time, the service provider's server 700 also transmits the service provider's ID which represents the authenticity of the service provider 300. In addition, the service provider's server 700, after the transmission of the authentication ticket to the authentication server 600, also delete the received authentication ticket and is shifted to a standby state.

9. The authentication server 600 which has received the authentication ticket and the service provider's ID from the service provider's server 700, first in step 21, discriminates whether the service provider's ID is authorized. If the service provider's ID is authorized, then the authentication of the authentication ticket is performed. If it is confirmed as a result of the authentication that the issuance of the authentication ticket was performed by the authentication server 600 by itself and the authentication thereof was completed within the validity period, the authentication is taken as normally completed.

10. When authentication processing is completed, regardless of the processing result, the authentication result is notified to the service provider's server 700 (step A22).

11. The service provider's server 700 which has been in a standby state, in step A23, discriminates the received authentication result of the authentication ticket and obtains the discrimination result. In the case of the authentication approval, in step A26, together with the notification of the approval to the terminal 500, the service provider's server 700 issues the service session ID so as to return the terminal 500.

In the case of the authentication disapproval, in step A24, the notification of the disapproval is performed to the terminal 500.

12. In the case where the notification of the authentication approval is received, the terminal 500 which has been in a standby state performs the establishment processing of the session by using the service session ID received together with the notification, and stores the service session ID in the terminal 500 (step A27). In the case where the notification of the authentication disapproval is received, the user 100 is notified of the notification through a screen display (step A25).

(2) A Second Embodiment

Next, a second embodiment according to the invention is described. In the second embodiment, the advertisement information in accordance with each user's preference is arranged to be transmitted as described below. The system configuration and the single sign-on authentication method described above with reference to the first embodiment are similarly applied in the other embodiments.

First, the authentication server is assumed to store the database concerning the user information as shown in FIG. 4. The user's name, user's ID and password are recorded in the database shown in FIG. 4 at the time of registration of each user.

The service utilization history information is intended for recording what kinds of services each user has utilized by accessing various service provider's servers. As the method for recording the service utilization history information, there are considered a method, etc. for transmitting the service utilization history information and the recording request from the user or the service provider's server to the authentication server, when the service provision by the service provider's server is completed.

The user's preference information is intended for recording each user's preference information as key words. As the method for recording user's preference information, there are considered a method, etc. in which the authentication server extracts the key words from the above-mentioned service utilization history information, or in which the user, or service provider's server transmits to the authentication server the user's preference information and the recording request so as to effect the recording.

In addition, any service provider's server transmits the advertisement information. Specifically, the article of which the advertisement is desired, the article and service information of the service and the advertisement request are transmitted to the authentication server. In this case, the key words related to the articles and services may be included. The authentication server which has received the article and service information, or the key words, compares such information with the user's preference information included in the above-mentioned database shown in FIG. 4. It is assumed in this case that the user's preference information of all the users in the database be the comparison object. That is, a user without the previous experience of using the service provider's server to which the user transmits the advertising request, is also taken as the comparison object.

The advertisement information is then transmitted only to the user of which the user's preference information coincides with the article and service information or the key words.

This enables the use opportunity of the articles and services to be expanded between the unspecified large number of users and the service provider's servers.

Figure 5:
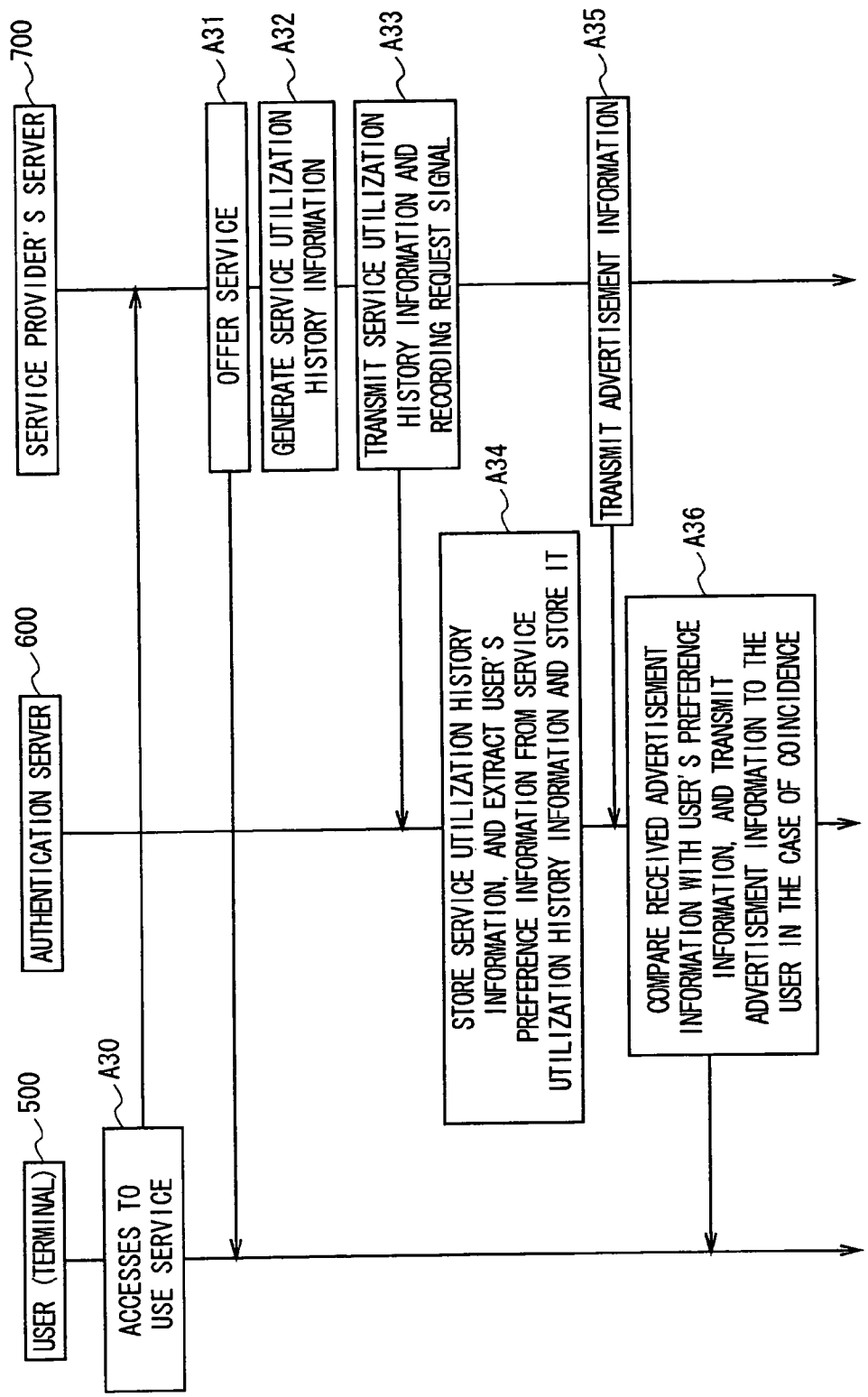
FIG. 5 is a sequence chart explaining the transmission procedure of the advertising information in a second embodiment according to the invention.

Here, the procedure of transmitting such advertisement information is explained in detail with reference to the sequence chart shown in FIG. 5. Here, although the explanation of the authentication processing between each apparatus is abbreviated, the same authentication processing in the first embodiment described above is also actually performed.

In step A30, in accordance with the operation of the user 100, the terminal 500 accesses the service provider's server 700 in order to utilize a predetermined service.

In step A31, the service provider's server 700 provides the predetermined service for the terminal 500 in accordance with the access from the terminal 500.

In step A32, when completing the provision of the service for the terminal 500, the service provider's server 700 generates the service utilization history information indicating what kind of the service was provided for the terminal 500.

In step A33, the service provider's server 700 transmits to the authentication server 600, the service utilization history information and the recording request signal for making the information recorded.

In step A34, when receiving the service utilization history information and the recording request signal from the service provider's server 700, the authentication server 600 records the service utilization history information in the above-mentioned database, and extracts from the service utilization history information the user's preference information which is also recorded in the database. Thereby, the service utilization history information and the user's preference information for every user are recorded in the database, as shown in FIG. 4.

In step A35, the service provider's server 700 transmits to the authentication server 600, the article items and the article and service information of the service (or the key words) that are wished to be advertised, and the advertisement request signal for requiring transmission of the advertisement, as the advertisement information.

In step A36, when the authentication server 600 receives the advertisement information from the service provider's server 700, the article and service information (or the key words) included in the advertisement information are compared with the user's preference information stored in the database, and the advertisement information is transmitted to the user (the terminal 500) corresponding to the user's preference information coincident in the comparison.

Thereby, the advertisement information suitably corresponding to each user's preference can be automatically transmitted to the terminal of each user.

Here, it is described about the case where the service provider's server 700 transmits the service utilization history information and the recording request signal for recording the information to the authentication server 600 when completing the service provision to the terminal 500, but the invention is not limited to the case, and it is also possible, for example, to arrange in such a manner that the service provider's server 700 transmits to the authentication server 600 the user's service utilization history information and the recording request for recording the information at intervals of a certain period (for example, every week).

Moreover, an embodiment described below is also possible.

When issuing the authentication ticket to the user, the authentication server transmits the user's preference information in the database, together with the authentication ticket. It is preferred that the user's preference information is encrypted.

Further, when accessing the service provider, a user transmits the user's preference information of its own. Thereby, even if it is the first time for the user to access the service provider, the service provider is able to understand and store the user's preference information instantaneously. It is also possible to transmit the user advertisement information about the articles and services which are directly provided by the service provider and have a high possibility of utilization, based on such user's preference information.

In addition, when making the authentication request of the authentication ticket to the authentication server so as to receive the authentication result, the service provider may be arranged to receive the user's preference information which is stored in the database by the authentication server.

The invention is not restricted to the first and second embodiments described above, and various modifications and applications will be possible within the scope of the invention. For example, the service provider may be a WWW server which offers a service other than the connection service.

(3) A Third Embodiment

Next, there is described a contents sales system as a third embodiment according to the invention in which the above-mentioned system is applied.

In the third embodiment, the client terminal 2 in FIG. 6 corresponds to the terminal 500 in FIG. 1 in the first embodiment described above, the network 3 in FIG. 6 corresponds to the information communication network 150 in FIG. 1, the portal server 4 in FIG. 6 corresponds to the authentication server 600 in FIG. 1, and the contents sales server 5 in FIG. 6 corresponds to the service provider's server 700 in FIG. 1.

(3-1) The Whole Configuration of the Contents Sales System

Figure 6:
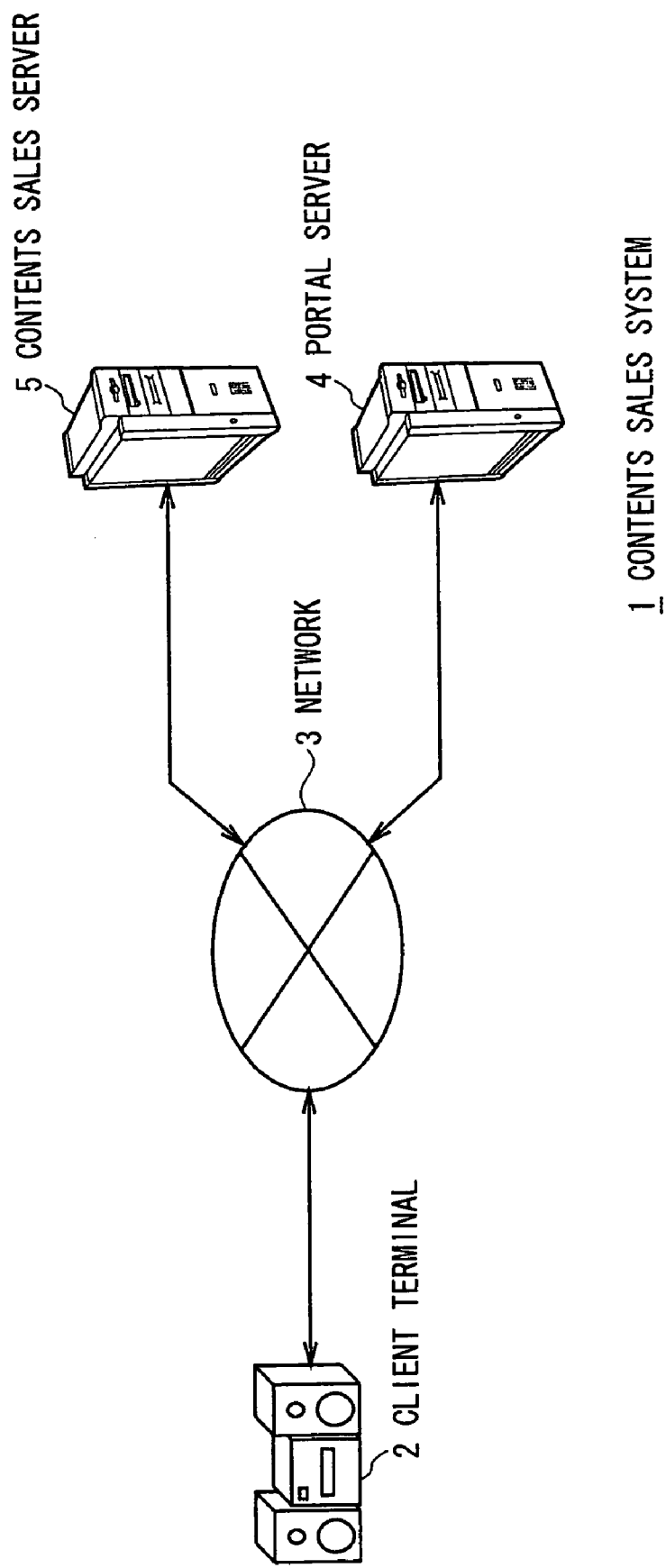
FIG. 6 is a schematic diagram showing the whole construction of a contents sales system in a third embodiment according to the. invention.

In FIG. 6, 1 designates the contents sales system as a whole, and the client terminal 2 of the user which is allowed to participate in the contents sales system 1 is connected via the predetermined network 3 to the portal server 4 for managing the client terminal 2, and to the contents sales server 5 for selling a CD (Compact Disc)/DVD (Digital Versatile Disc) in which various contents are recorded.

Figure 7:
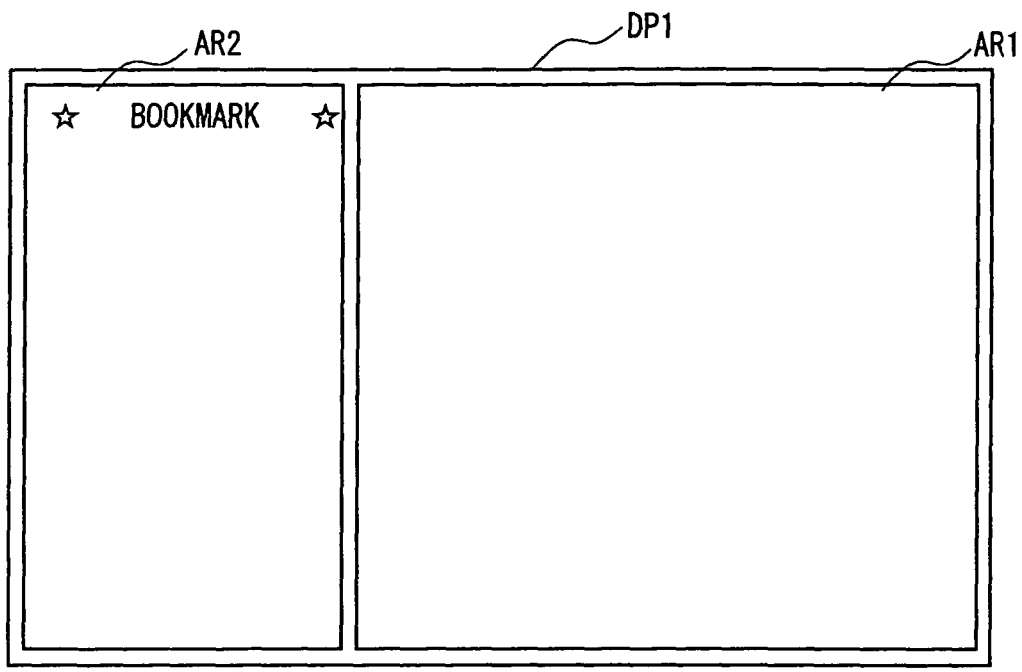
FIG. 7 is a schematic diagram showing a basic picture (1)

The client terminal 2 displays the basic picture DP 1 as shown, for example, in FIG. 7 in the display section, when the power supply is switched on by the user. This basic picture DP 1 has the page display area AR1 in which various pages are displayed based on the source described by a language, such as XML (eXtensible Markup Language), and the bookmark display area AR 2 in which the bookmarks previously registered by the user are displayed.

For example, when the top page display operation for displaying the top page of the contents sales system 1 is performed, the client terminal 2 transmits the request signal for requiring the transmission of the source of the top page, and the user's ID and password which have been registered beforehand, to the portal server 4 storing the source.

When receiving the request signal and the ID and password, the portal server 4 performs the predetermined user authentication processing based on the ID and password.

Then when the user of the client terminal 2 is confirmed as the registered user as a result of the user authentication processing, the portal server 4 generates the authentication result information which indicates the result of the authentication and the time (hereinafter referred to as the authentication completion time) when the authentication is completed, and transmits to the client terminal 2, the generated authentication result information and the source of the top page in accordance with the request signal from the client terminal 2.

Figure 8:
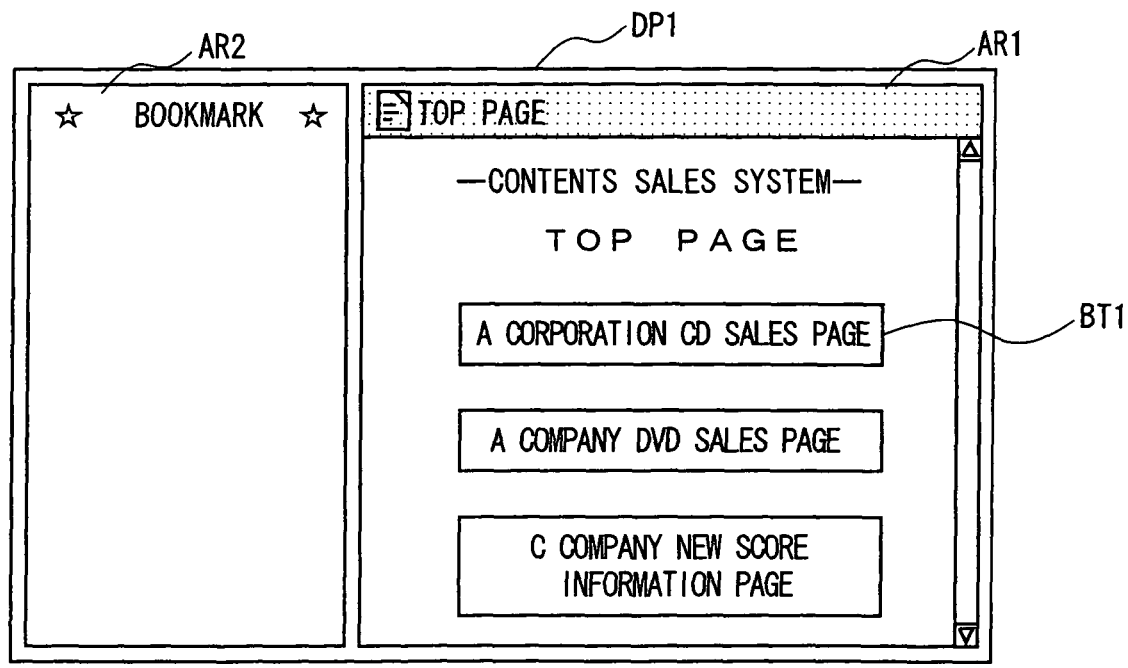
FIG. 8 is a schematic diagram showing a basic picture (2)

When receiving the authentication result information and the source of the top page from the portal server 4, the client terminal 2 displays the top page in the page display area AR1 based on the source, as shown, for example, in FIG. 8. In the top page, the title of the page "top page" is displayed in the upper part, and therebelow there are displayed a plurality of buttons including the button BT 1 to which the link to the A Corporation CD sales page is assigned, and buttons to which the links to other pages are assigned.

For example, when the button BT 1 in the top page is selected by the operation of the user, after recognizing the URL (Uniform Resource Locator) of the A Corporation CD sales page with reference to the source of the top page, the client terminal 2, based on the recognition, transmits to the contents sales server 5 managed by the A company, the request signal for requiring the transmission of the source of the A Corporation CD sales page, and the authentication result information recently obtained from the portal server 4.

The contents sales server 5 which has received the request signal and the authentication result information, is arranged to discriminate whether the user of the client terminal 2 has recently been authorized as the registered user (for example, within past 1 minute) by referring to the authentication completion time, etc. in the authentication result information. For example, as a result of the discrimination, when recognizing that the user of the client terminal 2 has recently been authenticated as the registered user, the contents sales server 5 transmits the source of the A Corporation CD sales page in accordance with the request signal, to the client terminal 2.

As a result of the discrimination, when recognizing that the user of the client terminal 2 has not recently been authorized as the registered user, the contents sales server 5 is arranged to refrain from transmitting to the client terminal 2 the source of the A Corporation CD sales page.

Figure 9:
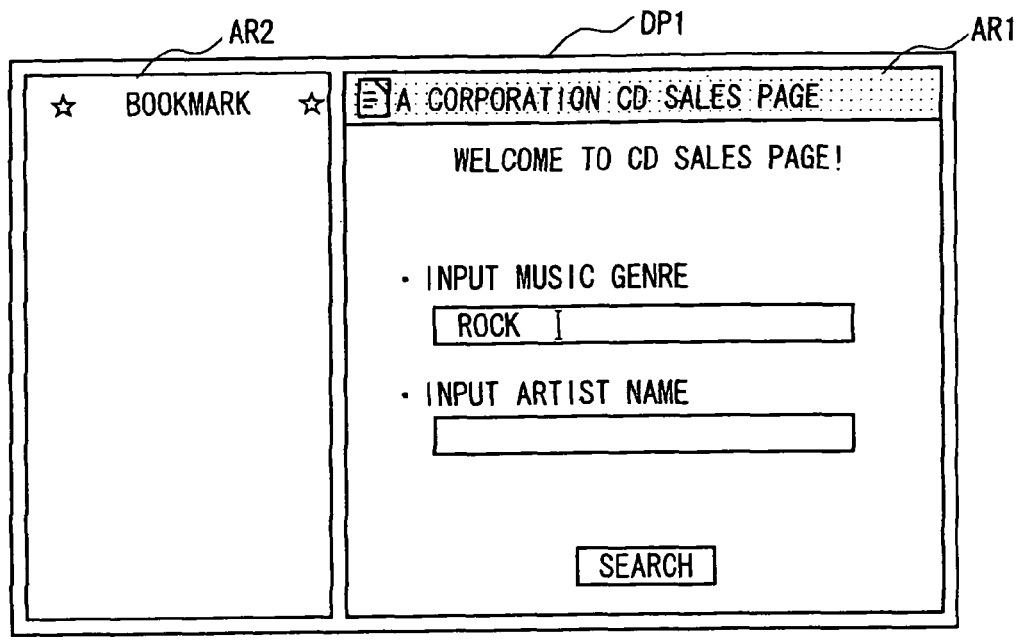
FIG. 9 is a schematic diagram showing a basic picture (3)

The client terminal 2 which has received the source of the A Corporation CD sales page from the contents sales server 5 displays the A Corporation CD sales page in the page display area AR1 based on the source, as shown in FIG. 9. Thereby, the user of the client terminal 2 is arranged to be able to utilize, by way of the A Corporation CD sales page, the CD sales service provided by the contents sales server 5.

In addition, in the source of the A Corporation CD sales page described by the XML, etc., there are described not only the title information of the page: "A Corporation CD sales page", etc., but also the service identification information for indicating that the page is intended for providing the CD sales service.

Figure 10:
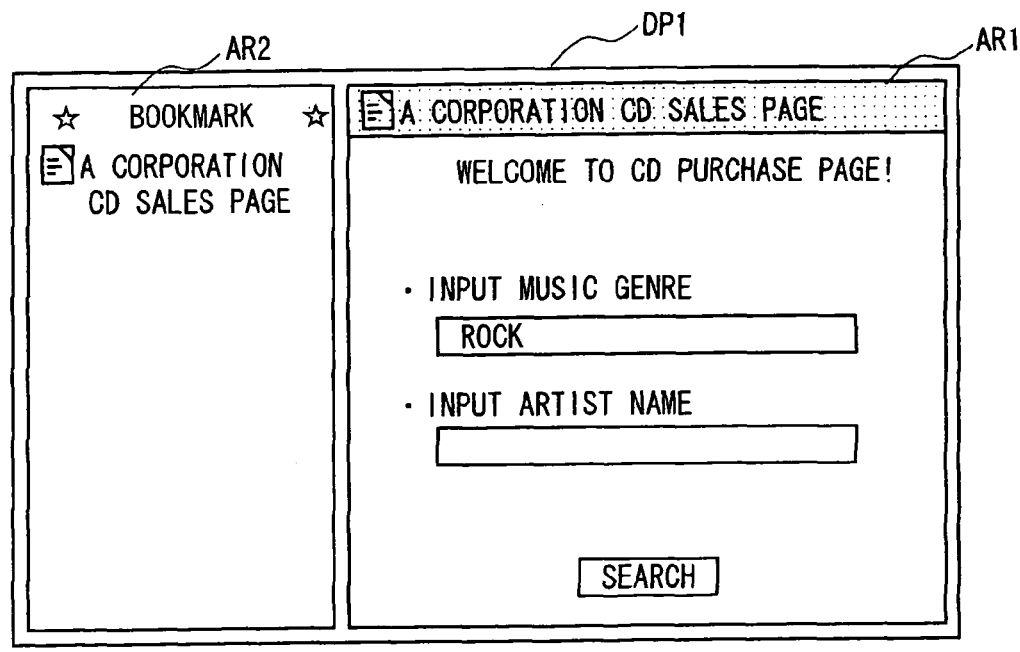
FIG. 10 is a schematic diagram showing a basic picture (4)

Thereafter, when the bookmark setting operation for bookmarking the A Corporation CD sales page is performed by the user, the client terminal 2 stores, in correspondence with the URL of the CD sale page, the title information "A Corporation CD sales page" and the service identification information which are described in the source of the A Corporation CD sale page, and thereafter displays only the title information "A Corporation CD sales page" in the bookmark display area AR 2, as shown, for example, in FIG. 10, In this way, the client terminal 2 is arranged to be able to display the A Corporation CD sales page provided by the contents sales server 5 in the display section, and to bookmark the displayed A Corporation CD sales page.

(3-2) The Configuration of the Portal Server

Figure 11:
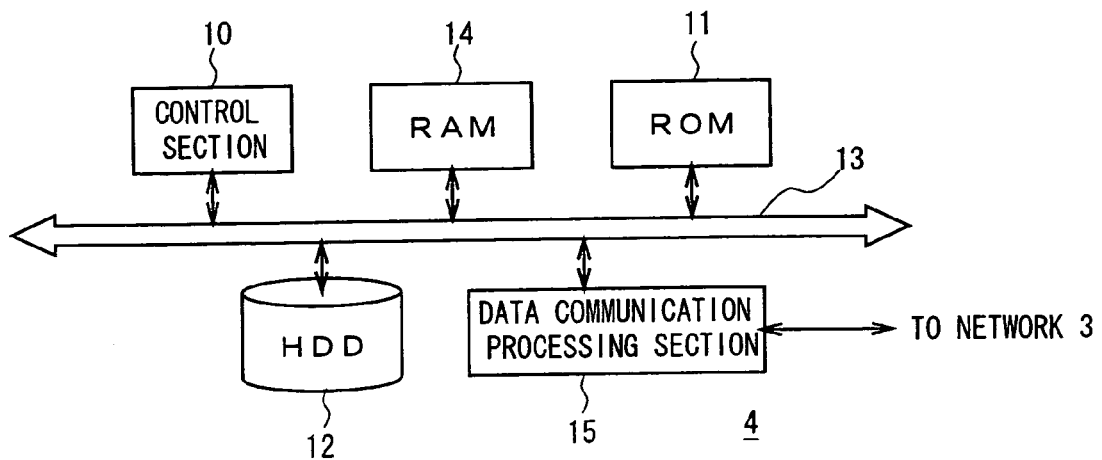
FIG. 11 is a block diagram showing the circuit configuration of a portal server.

As shown in FIG. 11, a control section 10 consisting of a CPU (Central Processing Unit) suitably develops the basic program and the various programs which are stored in a ROM (Read Only Memory) 11 or a hard disk drive 12 to a RAM (Random Access Memory) 14 via a bus 13, and executes the programs, as a result of which the portal server 4 is arranged to perform various processing, such as the user authentication processing. The ID and password of each user allowed to participate in the contents sales system 1 is also stored beforehand in the hard disk drive 12.

For example, when receiving the user's ID and password from the client terminal 2 successively via the network 3 and a data communication processing section 15, the control section 10 of the portal server 4 starts the user authentication processing to discriminate whether the ID and password of the user are stored in the hard disk drive 12.

Then, when recognizing that the ID and password of the user are stored in the hard disk drive 12 as a result of the discrimination, the control section 10 of the portal server 4 authenticates the user of the client terminal 2 as the registered user, and transmits to the client terminal 2 the authentication result information indicating the authentication result and the authentication completion time. On the other hand, when recognizing that the ID and password of the user are not stored in the hard disk drive 12, the control section 10 does not authenticate the user of the client terminal 2 as the registered user, and transmits to the client terminal 2 the authentication result information indicating the authentication result.

(3-3) The Configuration of the Contents Sales Server

Figure 12:
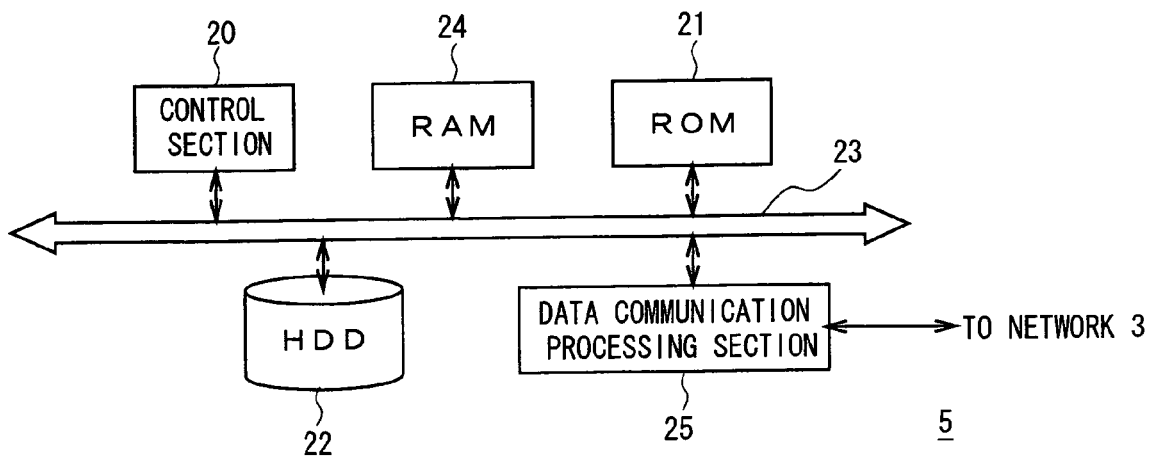
FIG. 12 is a block diagram showing the circuit configuration of a contents sales server.

As shown in FIG. 12, a control section 20 consisting of a CPU is arranged to suitably develop the basic program and other various programs stored in a ROM 21 or a hard disk drive 22 to a RAM 24 via a bus 23 and executes the programs, as a result of which the contents sales server 5 performs the CD sales processing for making the user purchase a CD and other various processing. The source of various pages including the A Corporation CD sales page is stored beforehand in the hard disk drive 22.

When receiving the request signal for requiring the authentication result information and the source of the A Corporation CD sales page from the client terminal 2, successively via the network 3 and a data communication processing section 25, the control section 20 of the contents sales server 5 first discriminates whether the user of the client terminal 2 has recently been authenticated as the registered user (for example, within past 1 minute) by referring to the authentication completion time, etc. in the authentication result information.

In practice, in the hard disk drive 22 of the contents sales server 5, the definition information is stored beforehand in which the authentication result information is defined to be effective within 1 minute after the completion of the user authentication. When recognizing that the authentication result information from the client terminal 2 is effective based on the definition information, the control section 20 of the contents sales server 5 is arranged to determine that the user of the client terminal 2 has recently been authenticated as the registered user. In addition, for example, it may be arranged in such a manner that when the portal server 4 generates the authentication result information so that the validity period information indicating the validity period is included in the authentication result information, the control section 20 of the contents sales server 5 discriminates the effectiveness of the authentication result information, based on the validity period information in the authentication result information.

When recognizing that the user of the client terminal 2 has recently been authenticated as the registered user as a result of the above determination, the control section 20 of the contents sales server 5 reads out, from the hard disk drive 22, the source of the A Corporation CD sales page in accordance with the request signal, and transmits the source to the client terminal 2.

(3-4) The Configuration of the Client Terminal (3-4-1) Circuit Configuration

Figure 13:
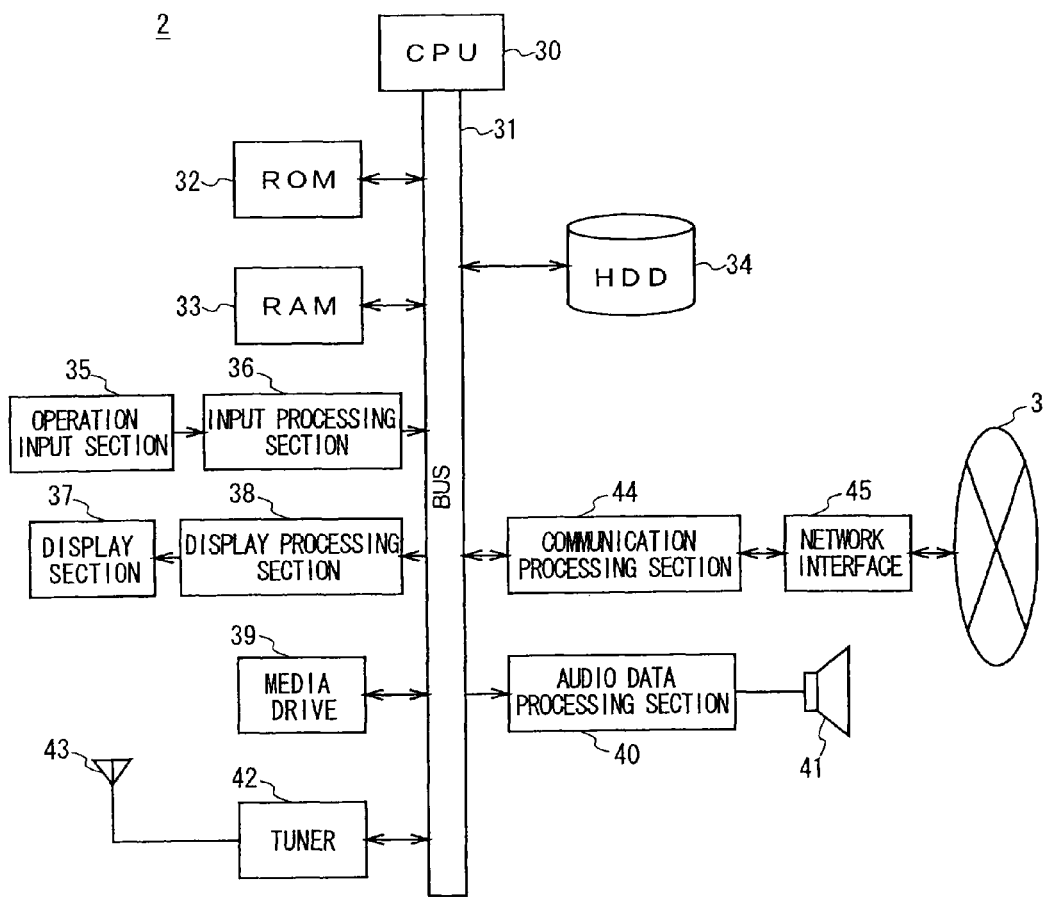
FIG. 13 is a block diagram showing the circuit configuration of a client terminal.

As shown in FIG. 13, a CPU 30 of the client terminal 2 is arranged to perform the overall control and a predetermined data processing, etc. based on the basic program, such as the OS (Operating System) and the various application programs, which are read out from a ROM 32 connected via a bus 31 to be developed in a RAM 33. For example, the CPU performs the communication operation via the network 3, the input/output operation from/to the user, the reproduction of the contents from the media and the writing of the contents downloaded from the radio station in a hard disk drive (HDD) 34 and the management of the latter.

An operation input section 35 is arranged to send out to an input processing section 36, the input information in accordance with the user's operation on various operation elements attached to. the casing surface of a main body part and to a remote controller (not shown). The input information is then arranged to be subjected to a predetermined processing in the input processing section 36, and thereafter sent out to the CPU 30 as an operation command, thereby enabling the CPU 30 to perform the processing in accordance with the operation command.

A display section 37, which may be, for example, a display devices, such as a liquid crystal display attached to the casing surface of the main body part, or an externally mounted display device, is arranged to display various information inputted by way of a display processing section 38. In the case of the embodiment, the display section 37 is arranged to be smaller (about 5 inches) than the display used for the normal televisions and personal computers.

A media drive 39 is, for example, a drive for reproducing a CD and memory stick (registered trademark) which comprises a flash memory, etc., and the reproduction results are arranged to be subjected to the digital/analog conversion processing through an audio data processing section 40, and thereafter to be outputted from a two-channel loudspeaker 41.

When the data reproduced via the media drive 39 is audio contents of musical composition, the CPU 30 also enables the data to be stored in the hard disk drive 34 as an audio data file.

Further, the CPU 30 is also able to read out a plurality of still images stored in the memory stick (registered trademark) by means of the media drive 39, so as to display the images as a slide show in the display section 37 through the display processing section 38.

Further, the CPU 30 is able to read out a plurality of musical compositions stored in the hard disk drive 34, so as to reproduce and output them in the order of user's request just like a jukebox.

A tuner section 42 is the AM, FM radio tuner, and demodulates the broadcast signal received with an antenna 43 based on the control of the CPU 30, so as to output the demodulation result as a broadcast audio from the loudspeaker 41 through the audio data processing section 40.

Based on the control of CPU 30, a communication processing section 44 is arranged to perform the encode processing of data to be transmitted so as to transmit the data to an external network compatible apparatus successively via a network interface 45 and the network 3, and to perform the decode processing of the received data received from the external network compatible apparatus via the network interface 45 so as to transfer the data to the CPU 30.

(3-4-2) Directory Management

Figure 14:
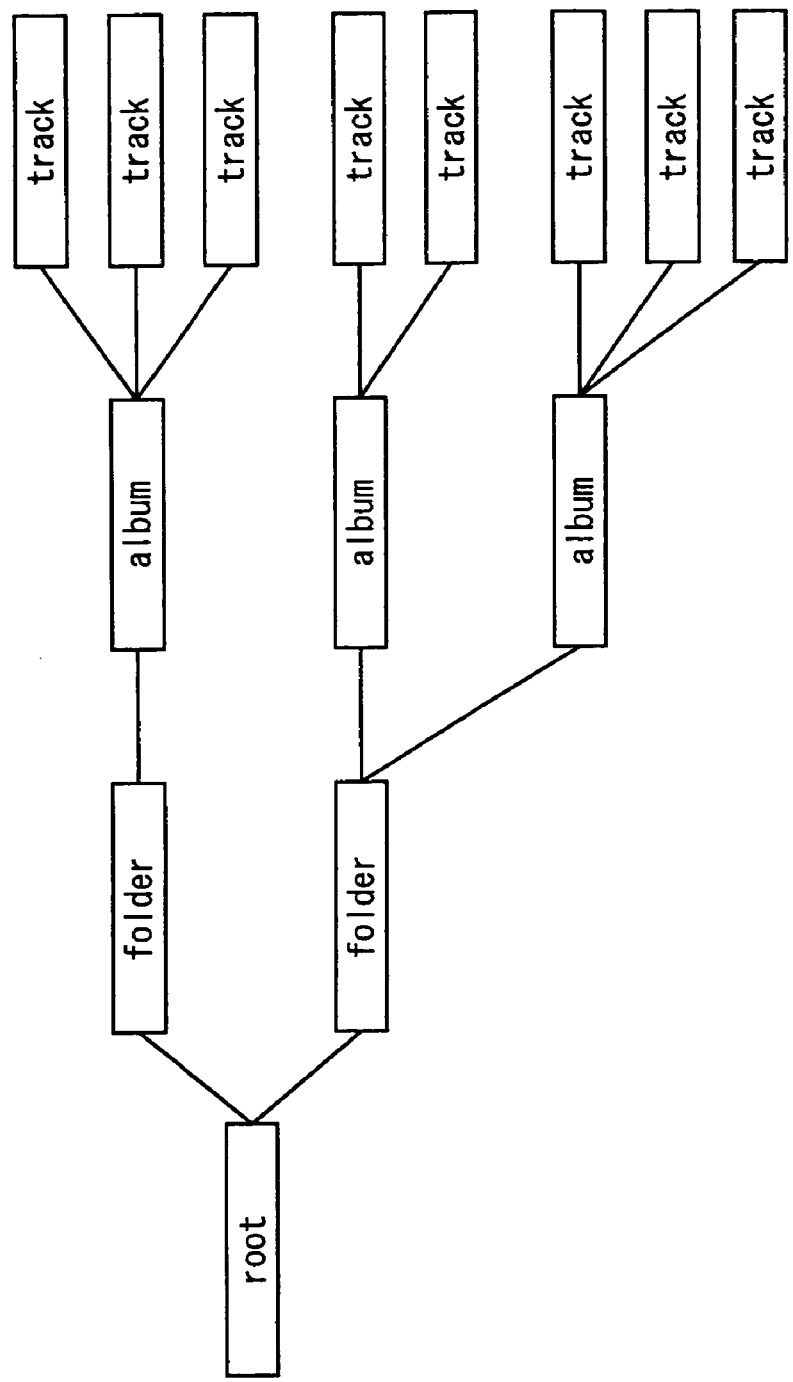
FIG. 14 is a schematic diagram showing a folder configuration.

The CPU 30 of the client terminal 2 is arranged to manage the contents stored in the hard disk drive 34 in the directory configuration shown in FIG. 14. First, in the lower layer of the "root" directory, any number of "folder" directories within a prescribed limit is made. The "folder" directory is arranged to be made corresponding to the genre to which the contents belong, or to the user possessing the contents.

In the lower layer of the "folder" directory, any number of "album" directories within a prescribed limit is made, and the "album" directory is, for example, arranged to correspond to each of the album titles. In the lower layer of the "album" directory, one or more "track" files which are arranged to belong to the "album" directory are stored, and a "track" file includes a musical composition, i.e., a content.

The directory management of the contents is arranged to be performed by the database file stored in the hard disk drive 34.

(3-4-3) Program Module Configuration

Figure 15:
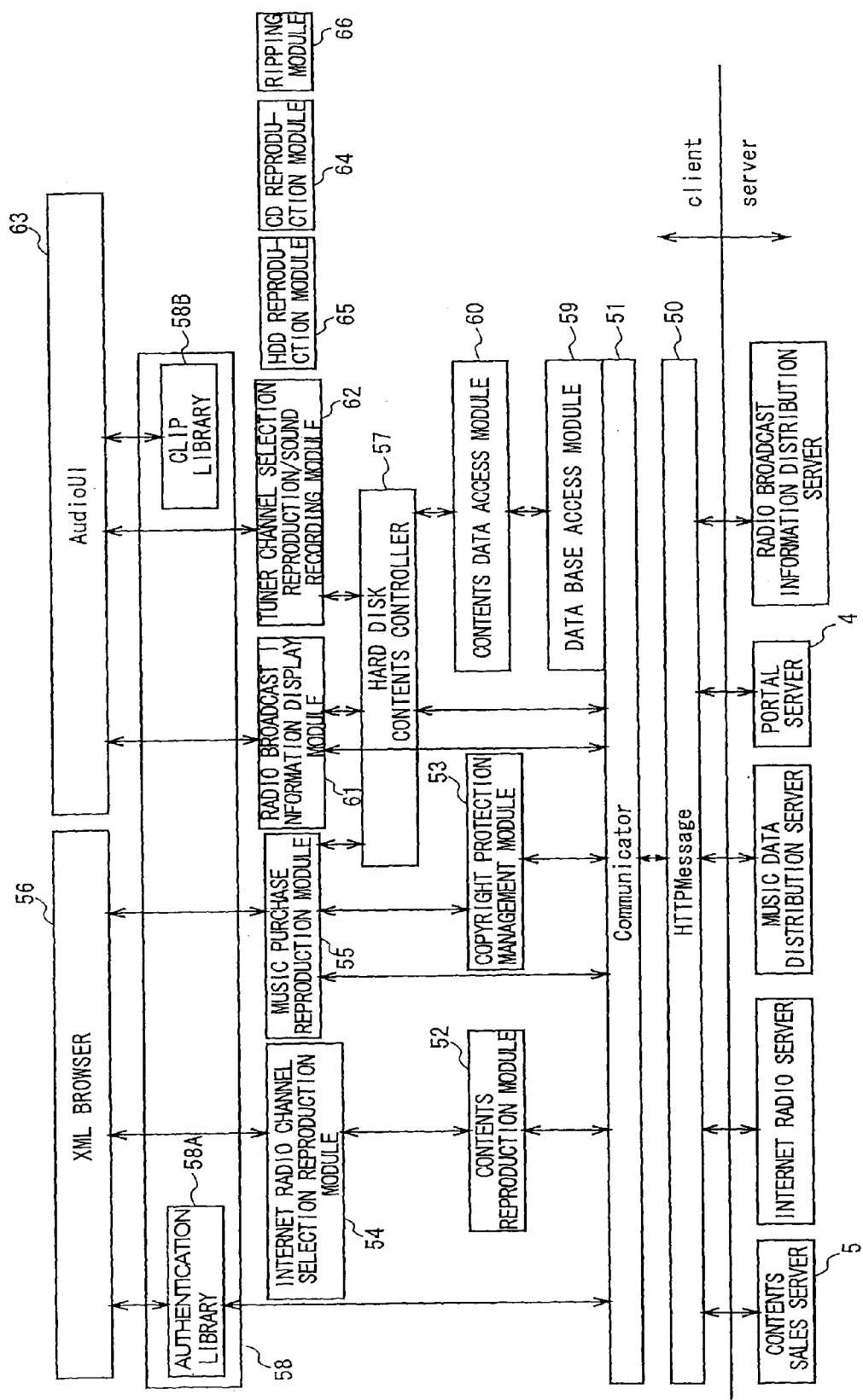
FIG. 15 is a schematic diagram showing a program module of the client terminal.

As shown in FIG. 15, the program module installed in the client terminal 2 is arranged to operate on the OS, and performs the exchange between the portal server 4, the contents sales server 5, the Internet radio server, the music data distribution server and the radio broadcast information distribution server, etc.

A HTTP (Hyper Text Transfer Protocol) message program 50 performs the exchange between various servers, such as the portal server 4 and the contents sales server 5 by means of the HTTP communication, and a communicator program 51 is a module for performing the data exchange with the HTTP message program 50.

A contents reproduction module 52 which interprets and reproduces the codec of the contents, and a copyright protection management module 53 which deals with the information about the copyright protection, are arranged in the upper layer of the communicator program 51. In the upper layer of the contents reproduction module 52 and the copyright protection management module 53, an Internet radio channel selection reproduction module 54 which performs the channel selection and reproduction of the Internet radio, and a music purchase reproduction module 55 which performs the purchase of a music and the reproduction of a trial music.

A voice data reproduced by the Internet radio channel selection reproduction module 54 and the music purchase reproduction module 55 are transmitted to the audio data processing section 40 and eventually outputted as a voice from the loudspeaker 41.

A XML browser 56, which is arranged in the upper layer of the Internet radio channel selection reproduction module 54 and the music purchase reproduction module 55, interprets XML files from various servers, and performs the image display in the display section 37.

For example, a musical composition selected by the user via the XML browser 56 is subjected to the purchase processing in the music purchase reproduction module 55, so as to be written in the hard disk drive 34 via a hard disk contents controller 57.

Also, the communicator program 51 is connected with an authentication library 58A of a library 58, and the authentication library 58A is arranged to perform various authentication processing in association with the portal server 4, etc.

Further, a database access module 59, a contents data access module 60, and the hard disk contents controller 57 are arranged in the upper layer of the communicator program 51.

The database access module 59 is arranged to access various databases built in the hard disk drive 34, the contents data access module 60 is arranged to access the contents data stored in the hard disk drive 34, and the hard disk contents controller 57 is arranged to manage the contents data stored in the hard disk drive 34.

In the upper layer of the hard disk contents controller 57, there are arranged a radio broadcast information display module 61 for displaying the title and artist name, etc. of a musical composition broadcasted by the radio station, and a tuner channel selection reproduction/sound recording module 62 for selecting the radio station and storing in the hard disk drive 34 (sound recording) contents data received from the radio station as a musical composition.

For example, the musical composition received from the radio station selected by way of an audio user interface 63 is arranged to be written in the hard disk drive 34 via the contents data access module 60.

A voice data reproduced by the tuner channel selection reproduction/sound recording module 62 is also transmitted to the audio data processing section 40 so as to be eventually outputted as a voice from the loudspeaker 41.

The radio broadcast information display module 61, depending on the tuner channel selection reproduction/sound recording module 62, receives the radio broadcast information including the now-on-air information, such as a title and artist name, etc. of a musical composition currently broadcast by the radio station, from the radio broadcast information distribution server by way of the HTTP message program 50, and displays the radio broadcast information in the display section 37 via the audio user interface (UI) 63.

The radio broadcast information displayed in the display section 37 via the audio user interface 63 can also be temporarily stored in a clip library 58B of the library 58, and is eventually stored in the hard disk drive 34 via the database access module 59, in accordance with the indication from the user.

A CD reproduction module 64 is controlled so as to enable the media drive 39 to reproduce a CD.

Thus, a voice data reproduced by the CD reproduction module 64 from the CD is transmitted to the audio data processing section 40 so as to be eventually outputted as a voice from the loudspeaker 41.

A HDD reproduction module 65 (not shown) is connected to the hard disk contents controller 57 and the copyright protection management module 53.

Thereby, the HDD reproduction module 65 reproduces voice data read out as the contents data from the hard disk drive 34, under the control of the hard disk contents controller 57, in accordance with the copyright management information supplied from the copyright protection management module 53.

In addition, the voice data reproduced by the HDD reproduction module 65 in accordance with the copyright management information are transmitted to the audio data processing section 40 so as to be eventually outputted as a voice from the loudspeaker 41.

A ripping module 66 (not shown) is connected to the hard disk contents controller 57 and the copyright protection management module 53.

Thereby, the ripping module 66 controls the CD reproduction module 64, the copyright protection management module 53 and the hard disk contents controller 57 in such a manner that a voice data reproduced by the CD reproduction module 64 from a CD, together with the copyright management information for managing the voice data, which is supplied from the copyright protection management module 53, are stored in the hard disk of the hard disk drive 34 under the control of the hard disk contents controller 57 (that is, the ripping is performed).

(3-5) Page Display Processing Procedure

A processing procedure (hereinafter referred to as the page display processing procedure), by means of which various pages, such as the A Corporation CD sales page, supplied from the contents sales server 5 are eventually displayed in the display section 37 of the client terminal 2, is described below.

(3-5-1) The Display of the A Corporation CD Sales Page via the Top Page

When the button BT 1 in the top page shown in FIG. 8 is selected, in response thereto, the client terminal 2 of the embodiment displays the A Corporation CD sales page. Here, the page display processing procedure in this case is described using sequence charts shown in FIGS. 16 and 17.

Figure 16:
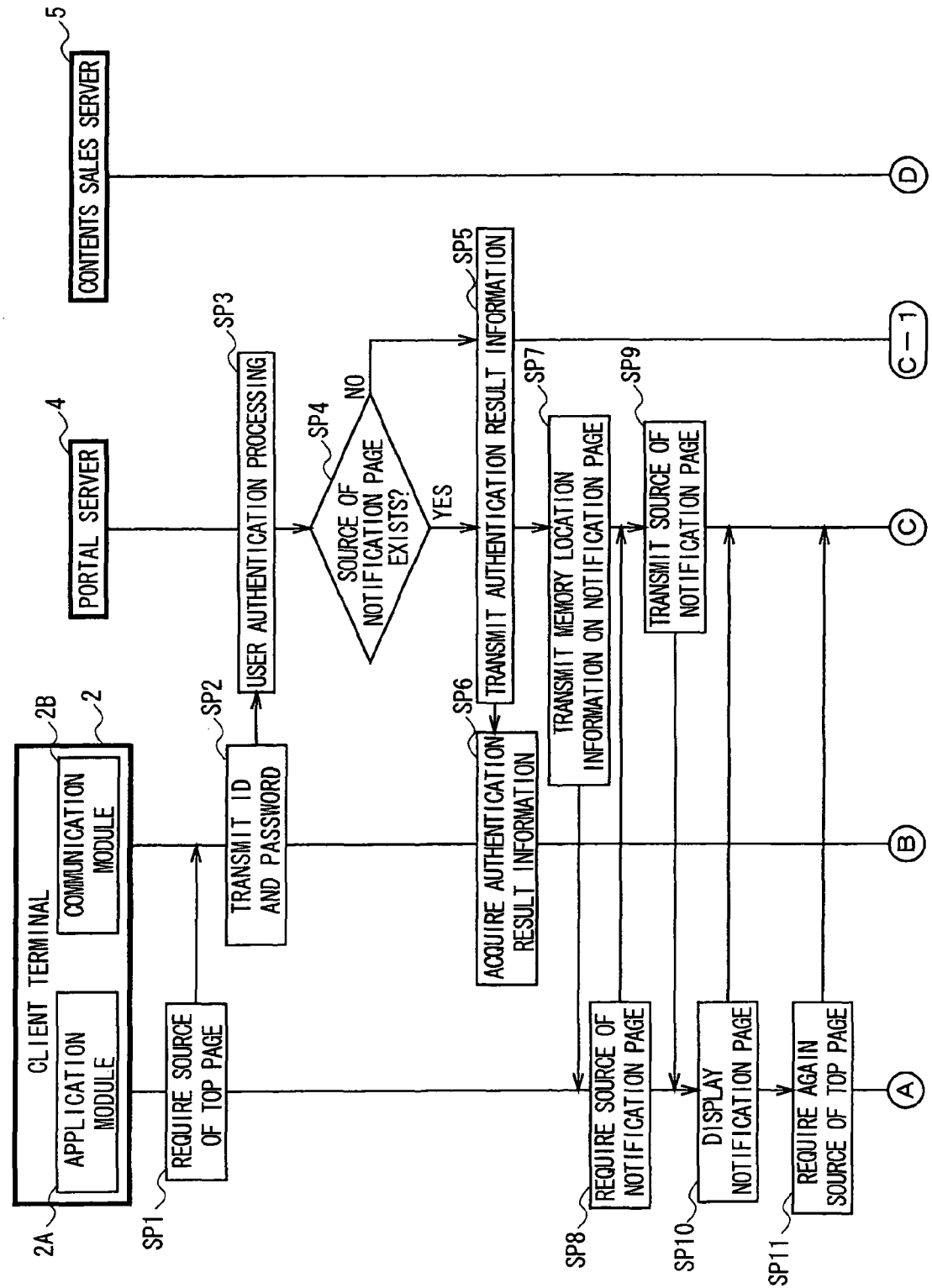
FIG. 16 is a sequence chart showing a page display processing procedure (1)
Figure 17:
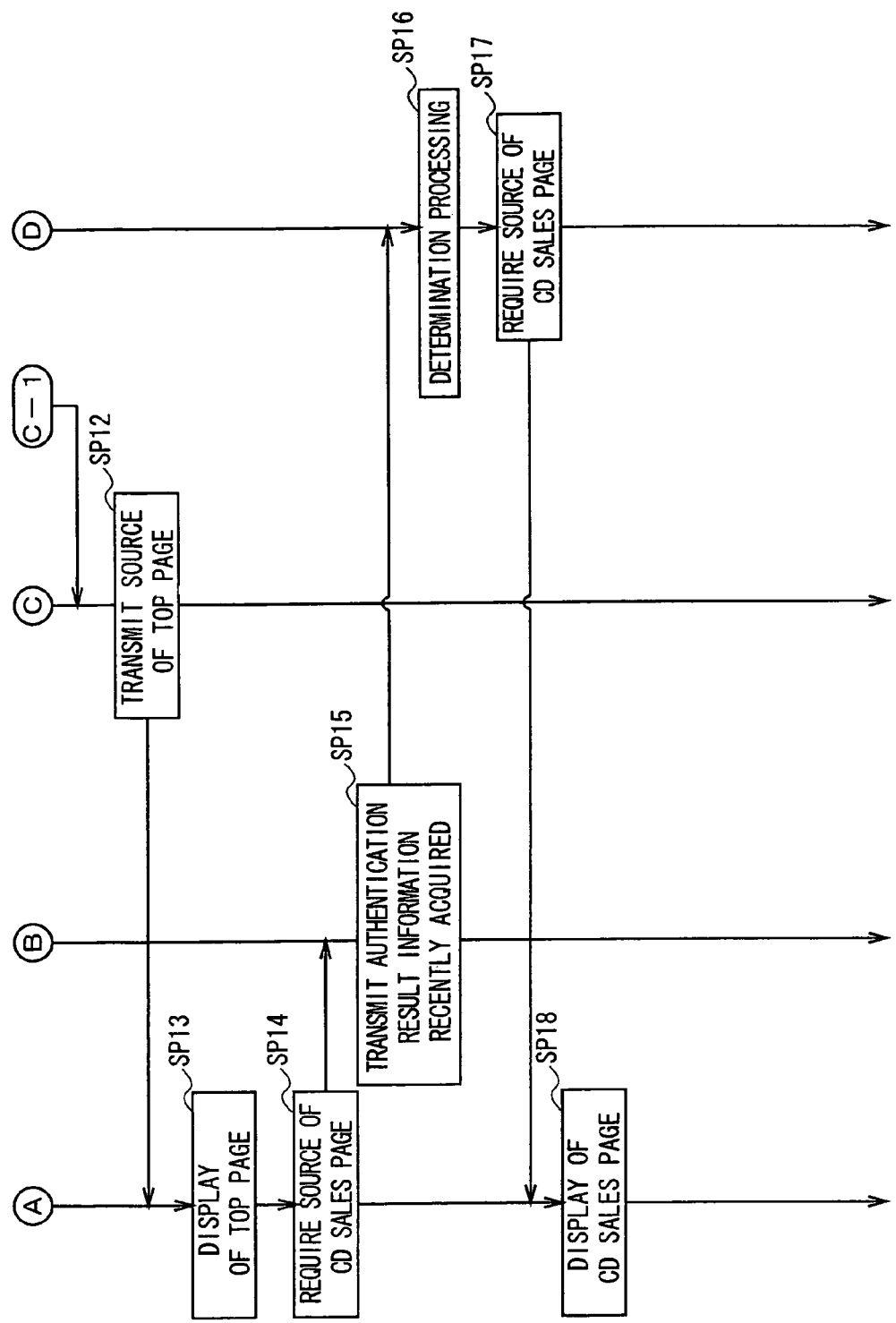
FIG. 17 is a sequence chart showing a page display processing procedure (2)
Figure 19:
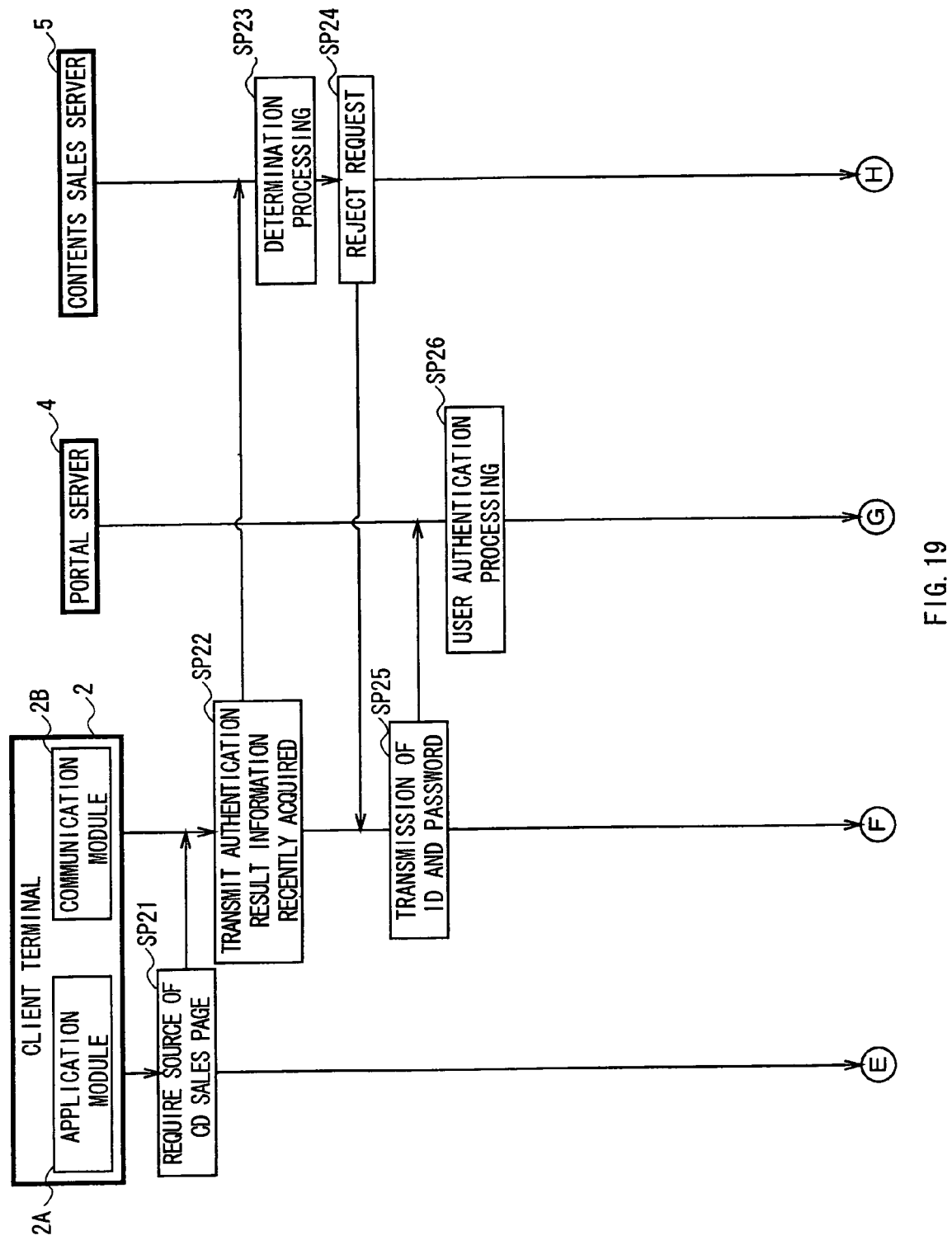
FIG. 19 is a sequence chart showing a page display processing procedure (3)

In FIGS. 16 and 17, and in FIGS. 19, 20, and 21 which are described later, an application module 2A and a communication module 2B in the client terminal 2 are shown specifically. The application module 2A corresponds to the above-mentioned XML browser 56, etc. and the communication module 2B corresponds to the above-mentioned communicator program 51, etc. The application module 2A is arranged to exchange the command and data of the application level with the portal server 4 and the contents sales server 5 via the communication module 2B which is arranged in the. lower layer of the application module 2A.

In the following description, for convenience, the application module 2A and the communication module 2B of the client terminal 2 are mainly described. However, it goes without saying that the CPU 30 (FIG. 13) of the client terminal 2 is, in practice, arranged to perform various processing in accordance with the application module 2A and the communication module 2B.

When recognizing the operation for displaying the top page in the display section 37, the application module 2A of the client terminal 2 delivers to the communication module 2B the request signal (hereinafter referred to as a first request signal) for requiring the source of the top page, and then advances to step SP 2.

In step SP 2, the communication module 2B of the client terminal 2 transmits the user's ID and password to the portal server 4 together with the first request signal delivered from the application module 2A.

The control section 10 of the portal server 4, upon receipt of the user's ID and password together with the first request signal from the client terminal 2, performs, in step SP 3, the user authentication processing based on the user's ID and password. Then, as a result of the user authentication processing, the control section 10 of the portal server 4 performs authentication of the user as the registered user and completes the generation of the authentication result information (corresponding to the authentication session ID to be described later) indicating the authentication result and the authentication completion time, and then advances to the subsequent step SP 4 for discriminating whether the source of a notification page exists in the predetermined memory location of the hard disk drive 12.

In the case of the embodiment, the notification page is suitably made by the operator operating the contents providing system, and is arranged to allow, for example, the maintenance information, etc. of the portal server 4 to be described therein.

If an affirmative result is obtained in step SP 4, which means that the source of the notification page made by the operator is stored in the predetermined memory location of the hard disk drive 12, then the control section 10 of the portal server 4 advances to step SP 5, and transmits the authentication result information generated in step SP 3 to the client terminal 2 so as to make the communication module 2B of the client terminal 2 obtain the authentication result information (step SP 6), and then advances to step SP 7, for transmitting the memory location information (for example, a path, URL, etc.) indicating the memory location of the source of the notification page, to the client terminal 2.

The application module 2A of the client terminal 2, upon receipt of the memory location information transmitted from the portal server 4 via the communication module 2B, advances to step SP 8, and generates, based on the memory location information, a request signal (hereinafter referred to as a notification page request signal) for requiring the transmission of the source of the notification page, so as to transmit the request signal to the portal server 4 via the communication module 2B.

The control section 10 of the portal server 4 which has received the notification page request signal advances to step SP 9, and reads out the source of the notification page from the predetermined memory location in the hard disk drive 12, so as to transmit the source to the client terminal 2.

Figure 18:
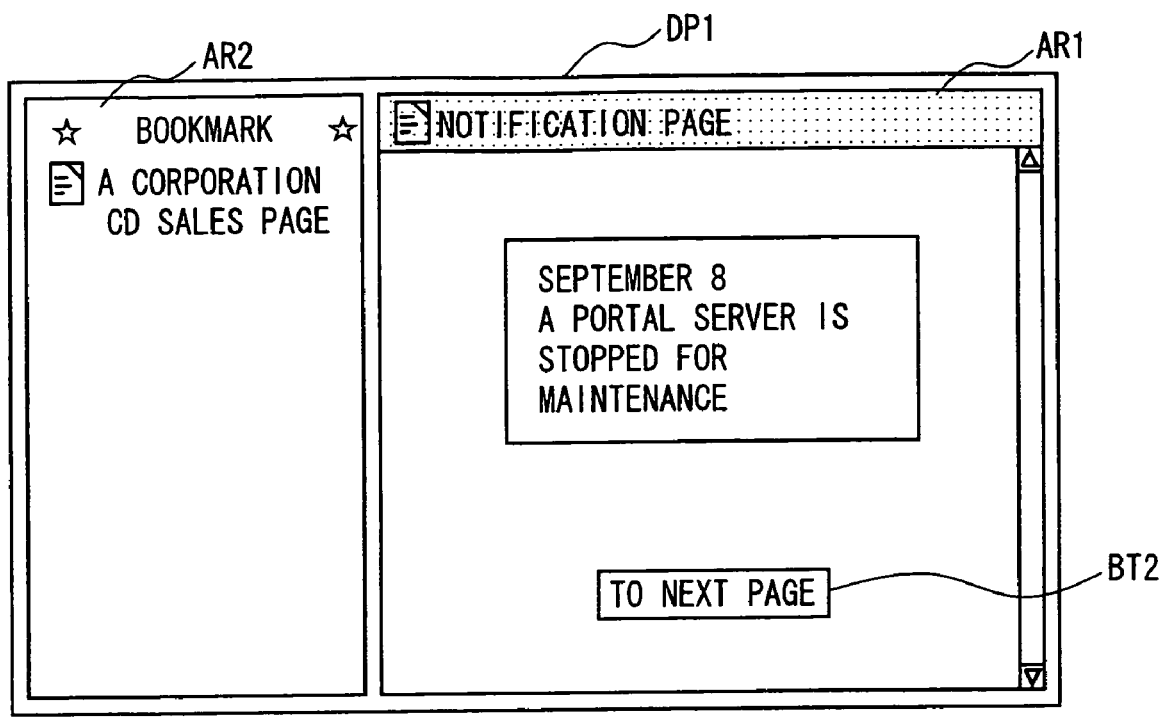
FIG. 18 is a schematic diagram showing a basic picture (5)

Then, the application module 2A of the client terminal 2, upon receipt of the source of the notification page transmitted from the portal server 4 via the communication module 2B, advances to step SP 10, and displays the notification page, such as shown in FIG. 18, in page display area AR1 based on the source. In the notification page, the maintenance information of the portal server 4, and the button BT 2 for displaying the top page are displayed.

Thus, in the contents sales system 1, the information about the server maintenance, etc. of which the user is to be informed, can be forcibly notified via the notification page from the side of the portal server 4.

Thereafter, when the button BT 2 in the notification page is selected by the operation of the user, the application module 2A of the client terminal 2A advances to the subsequent step SP 11, and transmits again the first request signal for requiring the transmission of the source of the top page, to the portal server 4 via the communication module 2B.

Then, the control section 10 of the portal server 4, upon second receipt of the first request signal, advances to step SP 12 (FIG. 17), and reads out the source of the top page from the hard disk drive 12, so as to transmit the source to the client terminal 2.

The application module 2A of the client terminal 2, upon receipt of the source of the top page transmitted from the portal server 4 via the communication module 2B, advances to step SP 13 so as to display the top page (FIG. 8) based on the source.

Thereafter, for example, when the button BT 1 in the top page is selected by the operation of the user, the application module 2A of the client terminal 2 advances to step SP 14, and delivers to the communication module 2B a request signal (hereinafter referred to as a second request signal) for requiring the A Corporation CD sales page.

Then, the communication module 2B, in step 15, transmits the authentication result information obtained in step SP 6, together with the second request signal, to the contents sales server 5 storing the source of the A Corporation CD sales page.

The control section 20 of the contents sales server 5, upon receipt of the second request signal and the authentication result information from the client terminal 2, is arranged to advance to step SP 16 and refers to the authentication completion time, etc. in the authentication result information, so as to discriminate whether the user of the client terminal 2 has recently (for example within past one minute) been authenticated as the registered user. As a result of the discrimination, for example, when recognizing that the user of the client terminal 2 has recently been authenticated as the registered user, the control section 20 of the contents sales server 5, advances to step SP 17 and transmits to the client terminal 2 the source of the A Corporation CD sales page in accordance with the second request signal.

The application module 2A of the client terminal 2, upon receipt of the source of the A Corporation CD sales page transmitted from the contents sales server 5 via the communication module 2B, advances to step SP 18 so as to display the A Corporation CD sales page (FIG. 10) based on the source.

Thus, in the contents sales system 1, despite the fact that the source of the top page has been requested from the client terminal 2, when the source of the notification page describing the information of which the user is to be notified exists in the side of the portal-server 4, the portal server 4 preferentially transmits the source of the notification page to the client terminal 2 before the source of the top page is transmitted.

Accordingly, the notification page is preferentially displayed rather than the top page in the display section 37 of the client terminal 2, which enables the operator of the contents sales system 1 to notify with certainty the information of which the user is to be notified, by the use of the notification page.

Incidentally, when the negative result is obtained in the above-mentioned step SP 4, which means that the source of the notification page does not exist in the predetermined memory location of the hard disk drive 12, the control section 10 of the portal server 4 is arranged to advance to step SP 5 and transmit the authentication result information generated in step SP 3 to the client terminal 2, so as to make the communication module 2B of the client terminal 2 obtain the authentication result information (step SP 6), and thereafter advance to step SP 12 (FIG. 17), for transmitting to the client terminal 2 the source of the top page in accordance with the first request signal.

(3-5-2) The Display of the A Corporation CD Sales Page from the Bookmark

When the title information "the A Corporation CD sales page" displayed in the bookmark display area AR 2 shown in FIG. 10 is, for example, selected, in response thereto, the client terminal 2 in the embodiment is arranged to display the A Corporation CD sales page. Here, the page display processing procedure in this case is described using sequence charts shown in FIGS. 19, 20, and 21.

When recognizing that the title information "A Corporation CD sales page" shown in the bookmark display area AR 2 is selected, for example, by the operation of the user, the application module 2A of the client terminal 2, advances to step SP 21, and generates the second request signal for requiring the source of the A Corporation CD sales page based on the URL stored in correspondence with the title information "A Corporation CD sales page", and delivers the second request signal to the communication module 2B, so as to advance to step SP 22.

In step SP 22, the communication module 2B of the client terminal 2 transmits the authentication result information obtained from the portal server 4, for example, 1 hour before, together with the second request signal delivered from the application module 2A, to the contents sales server 5 storing the source of the A Corporation CD sales page.

The control section 20 of the contents sales server 5, upon receipt of the second request signal and the authentication result information from the client terminal 2, is arranged to advance to step SP 23 and refer to the authentication completion time (in this case the time about 1 hour before) etc. in the authentication result information, so as to discriminate whether the user of the. client terminal 2 has recently (for example, within past 1 minute) been authenticated as the registered user. As a result of the discrimination, when recognizing that the user of the client terminal 2 has not recently been authenticated as the registered user, the control section 20 of the contents sales server 5 advances to step SP 24, and generates the request rejection signal for rejecting the second request signal from the client terminal 2, so as to transmit the request rejection signal to the client terminal 2.

When recognizing the rejection of the request to the contents sales server 5 based on the request rejection signal transmitted from the contents sales server 5, the communication module 2B of the client terminal 2, advances to step SP 25, and transmits the user's ID and password to the portal server 4.

The control section 10 of the portal server 4, upon receipt of the user's ID and password from the client terminal 2, advances to step SP 26, and performs the user authentication processing based on the user's ID and password. When completing, as a result of the user authentication processing, authentication of the user as the registered user and generation of the authentication result information which indicates the authentication result and the authentication completion time, the control section 10 of the portal server 4, then confirms the presence of the source of the notification page in the predetermined memory location in the hard disk drive 12.

Figure 20:
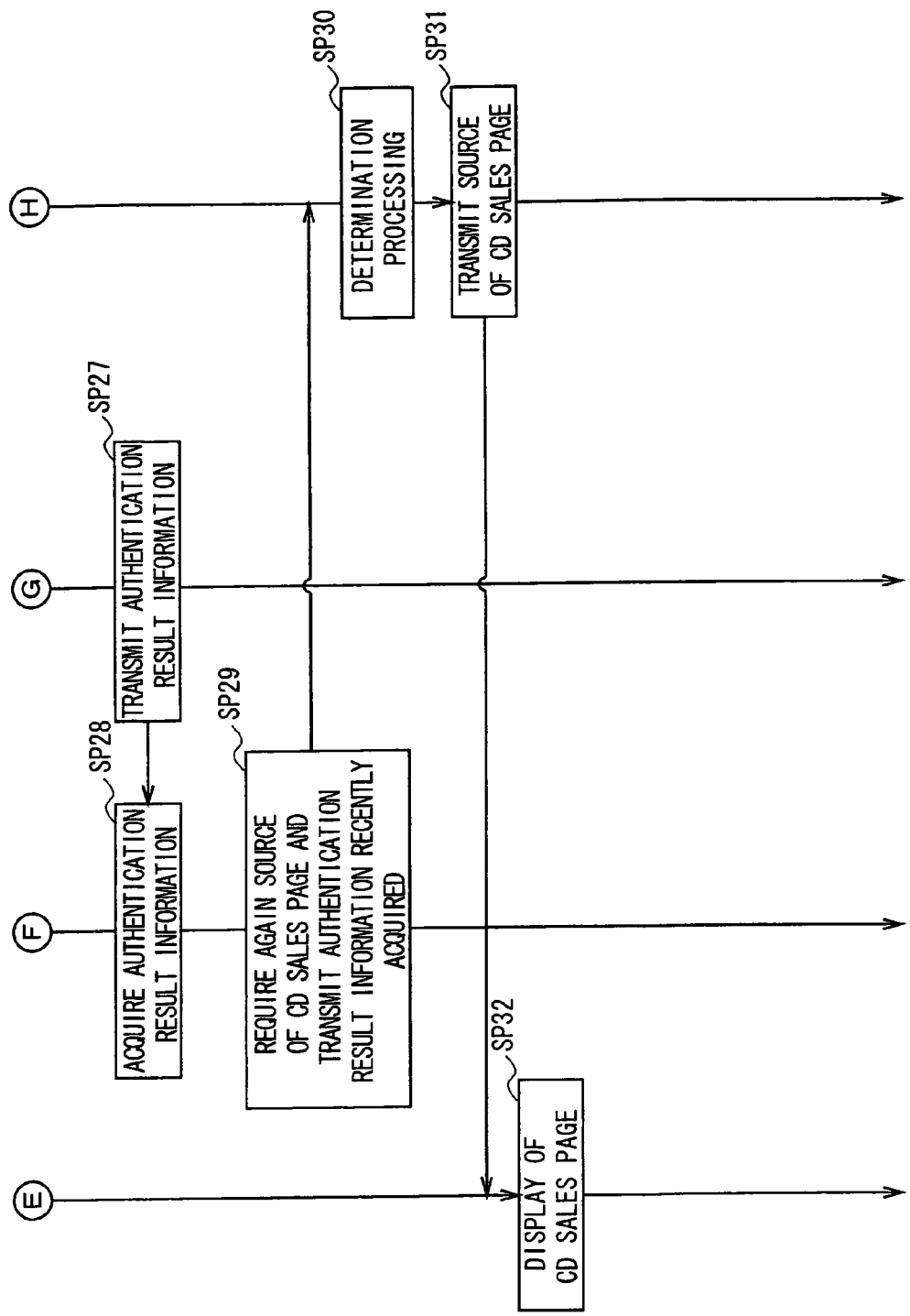
FIG. 20 is a sequence chart showing a page display processing procedure (4)

Here, upon confirming the presence of the source of the notification page in the predetermined memory location, the control section 10 of the portal server 4, advances to step SP 27 in FIG. 20.

In the step SP 27 of FIG. 20, the control section 10 of the portal server 4 transmits the generated authentication result information to the client terminal 2, so as to make the communication module 2B of the client terminal 2 obtain the authentication result information (step SP 28).

Moreover, the communication module 2B of the client terminal 2 advances to step SP 29, and transmits again to the contents sales server 5 the latest authentication result information obtained in step SP 28 together with the second request signal for requiring the source of the A Corporation CD sales page.

The control section 20 of the contents sales server 5, upon receipt of the second request signal and the latest authentication result information from the client terminal 2, advances to step SP 30 and refers to the authentication completion time, etc. in the authentication result information, so as to discriminate whether the user of the client terminal 2 has recently been authenticated as the registered user. As a result of the discrimination, when recognizing that the user of the client terminal 2 has recently been authenticated as the registered user, the control section 20 of the contents sales server 5 advances to step SP 31, and receives the second request signal from the client terminal 2 so as to transmit to the client terminal 2 the source of the A Corporation CD sales page.

The application module 2A of the client terminal 2, upon receipt of the source of the A Corporation CD sales page transmitted from the contents sales server 5 via the communication module 2B, also advances to step SP 32, and displays the A Corporation CD sales page (FIG. 10) based on the source.

Thus, the contents sales server 5 is arranged to receive only the request (the second request signal) made by the client terminal 2 of the user who has been authenticated as the registered user within the predetermined period (here within past 1 minute).

In the client terminal 2, the communication module 2B exclusively performs the processing for making the portal server 4 authenticate the user of the client terminal 2 as the registered. user (steps SP 25, SP 28 etc.), and for making the contents sales server 5 receive the request based on the authentication result information obtained as a result of the authentication (steps SP 21, SP 29 etc.).

This enables the application module 2A of the client terminal 2 to concentrate only on the processing specific to the application (steps SP 21 and SP 32).

As a result, the construction of application module 2A operating in the upper layer of the communication module 2B can be significantly simplified.

Figure 21:
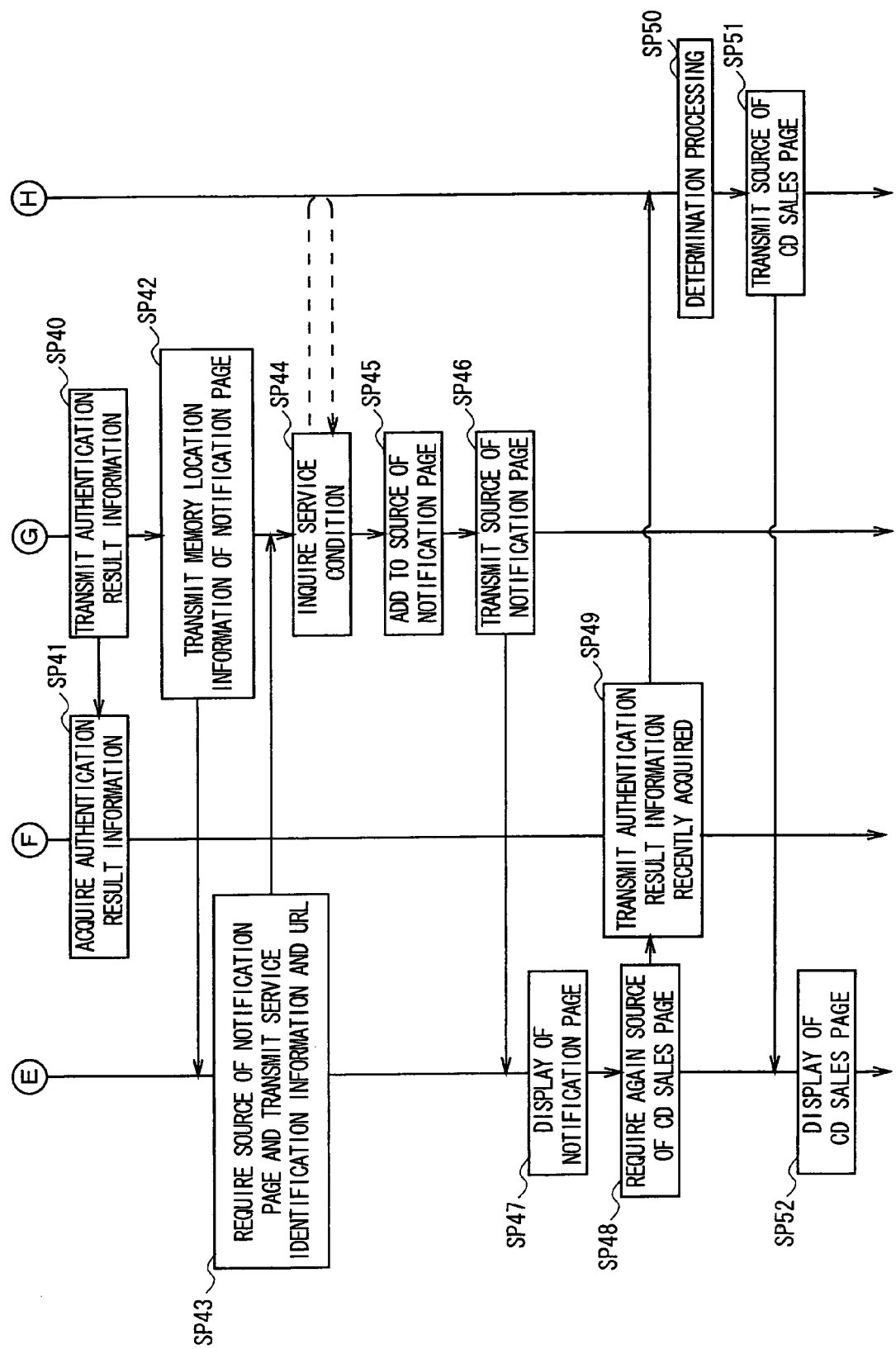
FIG. 21 is a sequence chart showing a page display processing procedure (5)

Next, there is described the case where the control section 10 of the portal server 4 advances to step SP 40 in FIG. 21, after confirming in the above-mentioned step SP 26 (FIG. 19) that the source of the notification page exists in the predetermined memory location in the hard disk drive 12.

That is, in the step SP 40, the control section 10 of the portal server 4 transmits the generated authentication result information to the client terminal 2 so as to make the communication module 2B of the client terminal 2 obtain the authentication result information (step SP 41), and in the subsequent step 42, transmits the memory location information indicating the memory location of the source of the notification page to the client terminal 2.

The application module 2A of the client terminal 2, upon receipt of the memory location information transmitted from the portal server 4 via the communication module 2B, advances to step SP 43 and generates the notification page request signal for requesting the transmission of the source of the notification page based on the memory location information, so as to transmit the notification page request signal to the portal server 4 via the communication module 2B.

At the same time, the application module 2A is also arranged to transmit to the portal server 4 the service identification information and the URL of the A Corporation CD sales page which were stored at the time of performing the bookmark of the A Corporation CD sales page. As described above, the service identification information indicates that the A Corporation CD sales page is a page intended for providing the CD sales service.

The control section 10 of the portal server 4, upon receipt of the URL of the service identification information and the A Corporation CD sales page together with the notification page request signal from the client terminal 2, makes in step SP 44 an inquiry to the contents sales server 5, about the current availability of the CD sales service of the contents sales server 5 indicated by the service identification information.

Figure 22:
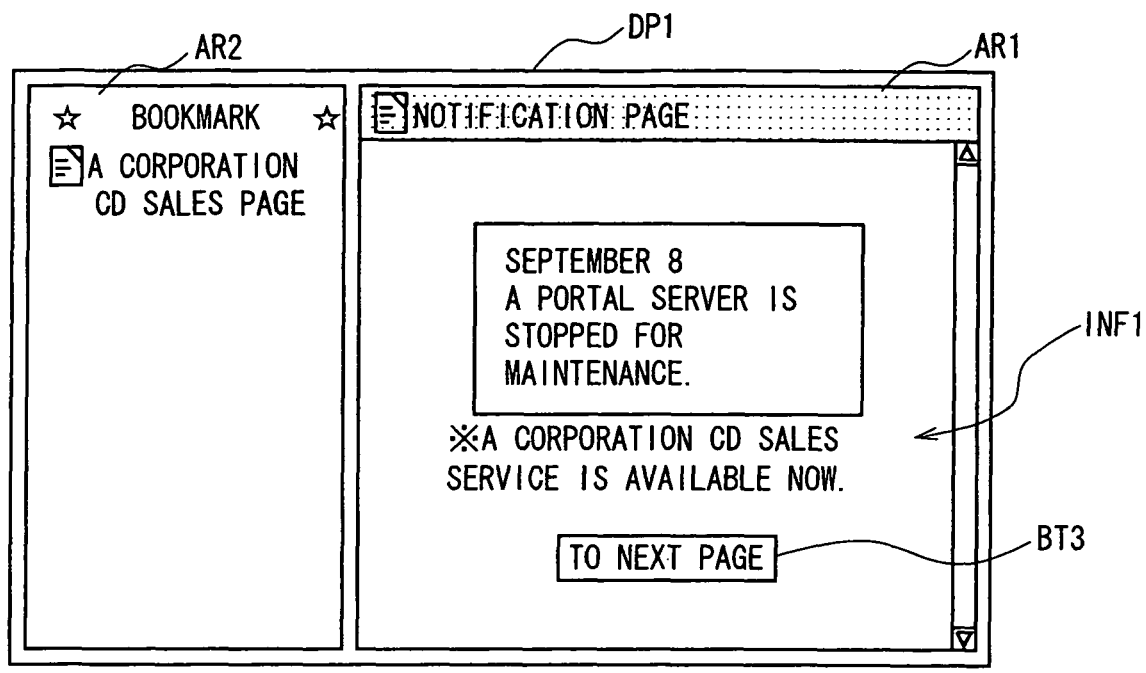
FIG. 22 is a schematic diagram showing a basic picture (6)

In addition, the control section 10 of the portal server 4 advances to step SP 45 and adds the inquiry result and also the URL of the A Corporation CD sales page which has been received, to the source of the notification page, so as to generate the source for displaying the notification page, as shown in FIG. 22.

Then, the control section 1O of the portal server 4 advances to step SP 46 so as to transmits the source of the notification page subjected to the addition, to the client terminal 2 in accordance with the received notification page request signal.

The application module 2A of the client terminal 2, upon receipt of the source of the notification page subjected to the addition, via the communication module 2B, displays the notification page (FIG. 22) in step SP 47.

The notification page also indicates the current status information INF 1 representing the current status of the CD sales service inquired by the portal server 4 to the contents sales server 5 based on the service identification information from the client terminal 2. The current status information INF 1 indicates that the CD sales service in the contents sales server 5 is currently available, or that the CD sales service is in pause, or the like.

This enable the client terminal 2 to notify the current status of the CD sales service of the user by way of the notification page, before displaying the A Corporation CD sales page for the use of the CD sales service.

Since the button BT 3 in the notification page is arranged to correspond with the URL of the A Corporation CD sales page, when the button BT 3 is selected by the operation of the user, for example, the application module 2A of the client terminal 2. advances to step SP 48 and generates the second request signal for requiring the source of the A Corporation CD sales page based on the URL, so as to deliver the request signal to the communication module 2B.

In step SP 49, the communication module 2B transmits the latest authentication result information obtained in step SP 41, together with the delivered second request signal, to the contents sales server 5.

The control section 20 of the contents sales server 5, upon receipt of the second request signal and the latest authentication result information from the client terminal 2, discriminates in step SP 50 whether the user of the client terminal 2 has been authenticated as the registered user recently (for example, within past 1 minute) by referring to the authentication completion time, etc. in the authentication result information. As a result, for example, when recognizing that the user of the client terminal 2 has recently been authenticated as the registered user, the control section 20 of the contents sales server 5 advances to step SP 51, and receives the second request signal from the client terminal 2 so as to transmit the source of the A Corporation CD sales, page to the client terminal 2.

Then, the application module 2A of the client terminal 2, upon receipt of the source of the A Corporation CD sales page transmitted from the contents sales server 5 via the communication module 2B, displays the A Corporation CD sales page (FIG. 10) in step SP 52 based on the source.

Thus, in the contents sales system 1, even if an operation is performed to display the A Corporation CD sales page using the bookmark, in the case where the source of the notification page exists in the portal server 4, the notification page is displayed in the display section 37 of the client terminal 2 more preferentially than the A Corporation CD sales page.

As a result, the operator of the contents sales system 1 is able to notify the user with certainty of the information which the user is to be informed of, by utilizing the notification page.

(3-6) The Operation and Effect in the Third Embodiment

In the above configuration, the communication module 2B in the client terminal 2 exclusively performs the processing (steps SP 25, SP28, etc. (FIGS. 19 and 20)) for making the portal server 4 authenticate the user of the client terminal 2 as the registered user, and the processing (steps SP 22, SP 29, etc.) for making the contents sales server 5 receive the request based on the authentication result information obtained as a result of the authentication.

Thus, the application module 2A of the client terminal 2 needs only to perform the processing (step SP 21) for requiring the source of the A Corporation CD sales page of the contents sales server 5, and the processing (step SP 32) for displaying the A Corporation CD sales page based on the source supplied from the contents sales server 5 in accordance with the requirement. As a result, the construction of the application module 2A can be substantially simplified.

According to the above configuration, the application module 2A corresponding to the communicator program 51 and the XML browser 56, etc. is allowed to concentrate only on the processing specific to the application. As a result, the construction of the application module 2A can be substantially simplified.

(4) A Fourth Embodiment

Next, the other example of the contents sales system to which the system according to the invention is applied, is explained as a fourth embodiment.

Figure 23:
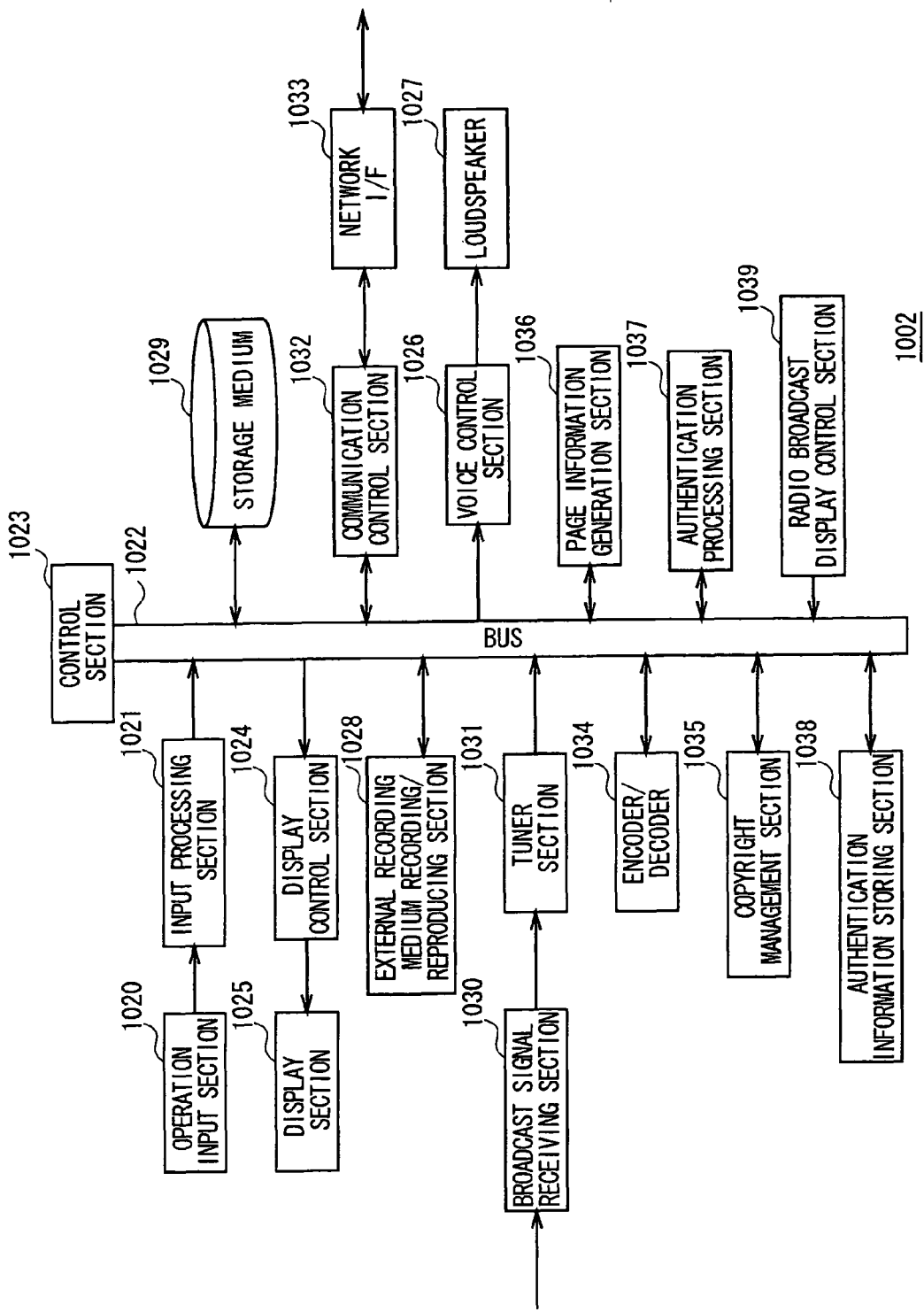
FIG. 23 is a block diagram showing the hardware configuration, illustrated by functional circuit blocks, of the client terminal in a fourth embodiment according to the invention.
Figure 24:
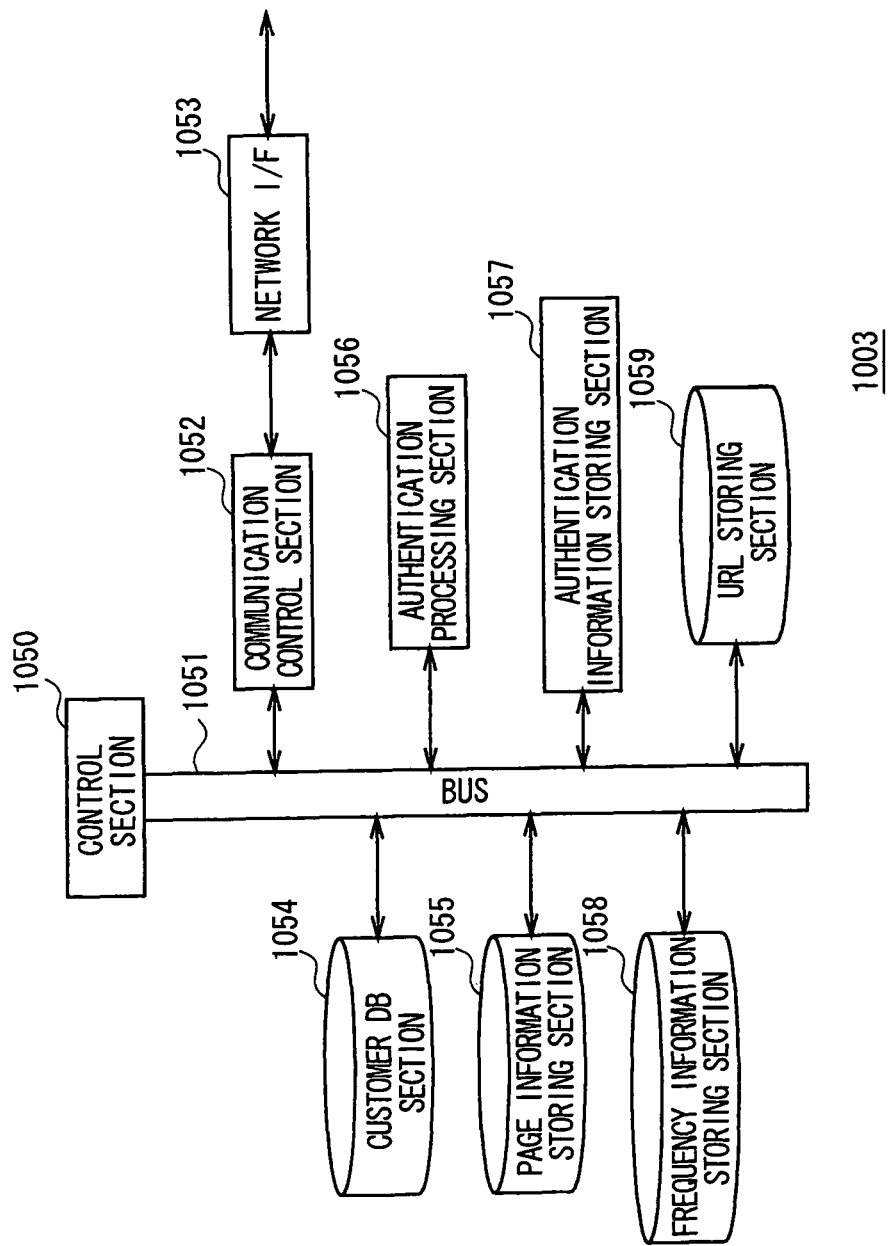
FIG. 24 is a block diagram showing the hardware configuration, illustrated by functional circuit blocks, of the portal server.
Figure 25:
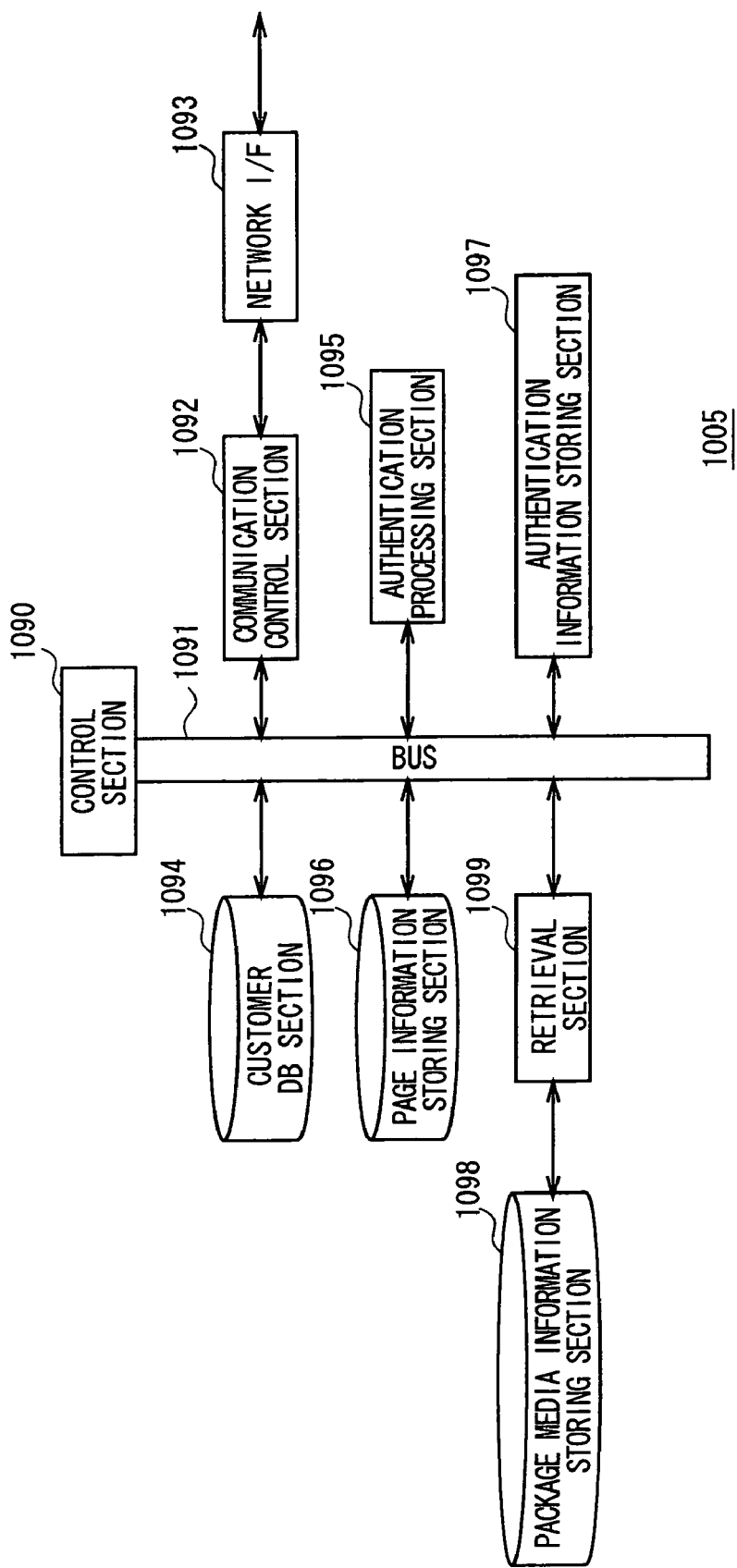
FIG. 25 is a block diagram showing the hardware configuration, illustrated by functional circuit blocks, of the contents sales server.

A client terminal 1002 in FIG. 23 in the fourth embodiment corresponds to the client terminal 2 in FIG. 6 in the third embodiment describe above, a portal server 1003 in FIG. 24 corresponds to the portal server 4 in FIG. 6, and a contents sales server 1005 in FIG. 25 corresponds to the contents sales server 5 in FIG. 6.

(4-1) The Functional Circuit Block Configuration of the Client Terminal

The hardware configuration of the client terminal 1002 represented by the functional circuit block is explained first. As shown in FIG. 23, when an operation input section 1020 comprising various operation buttons provided for the casing surface and the remote controller (not shown) is operated by the user, the client terminal 1002 recognizes the operation through the operation input section 1020, and sends out a control input signal in accordance with the operation to an input processing section 1021.

The input processing section 1021 converts the control input signal supplied from the operation input section 1020 into a specific operation command, and sends it out to a control section 1023 by way of a bus 1022.

The control section 1023 controls the operation of each circuit based on the operation command and the control signal which are supplied from each circuit connected by way of the bus 1022.

A display control section 1024 performs the digital/analog conversion processing of the image data supplied via the bus 1022, and sends out the analog video signal obtained as a result, to a display section 1025.

The display section 1025 is, for example, a display device such as a liquid crystal display, etc., which may be directly attached to the casing surface or externally provided.

When the processing result based on the control section 1023, and the various image data are supplied as the analog video signal via the display control section 1024, the display section 1025 displays an image based on the analog video signal.

A voice control section 1026 subjects the voice data supplied via the bus 1022 to the digital/analog conversion processing, and sends out the resulting analog sound signal to a loudspeaker 1027. The loudspeaker 1027 outputs a voice based on the analog sound signal supplied from the voice control section 1026.

An external-recording-medium recording/reproducing part 1028 is a recording/reproducing part which reads out the contents data recorded in an external recording medium, such as a CD and a memory stick (registered trademark) with a flash memory included in the outer package case, so as to reproduce the contents data, and which records in the external recording medium the contents data intended to be recorded.

When an image data is read out from an external recording medium as the contents data, the external-recording-medium recording/reproducing part 1028 supplies the image data read out, to the display control section 1024 by way of the bus 1022.

This enables the display control section 1024 to convert the image data which has been read out as the contents data from the external recording medium by the external-recording-medium recording/reproducing part 1028, into an analog image signal so as to supply it to the display section 1025.

When a voice data is read out from an external recording medium as the contents data, the external-recording-medium recording/reproducing part 1028 supplies the voice data read out, to the voice control section 1026 by way of the bus 1022.

Thereby, the voice control section 1026 converts the voice data which has been read out as the contents data from the external recording medium by the external-recording-medium recording/reproducing part 1028, into an analog voice signal and supplies it to the loudspeaker 1027.

Furthermore, the control section 1023 is able to send out the contents data which has been read out from the external recording medium by the external-recording-medium recording/reproducing part 1028, to a storage medium 1029 included in the client-terminal 1002 via the bus 1022, and to store the contents data in the storage medium 1029 (such storing of the contents data in the storage medium 1029 is also referred to as ripping).

When image data, such as a picture data or a video data, is read from the storage medium 1029 as contents data, the control section 1023 supplies the read image data to the display control section 1024 via the bus 1022.

When reading out voice data, such as audio data, etc., from the storage medium 1029 as contents data, the control section 1023 supplies the read voice data to the voice control section 1026 via the bus 1022.

In addition, the control section 1023 is also able to read out a music data from the storage medium 1029, and to transmit it td the external-recording-medium recording/reproducing part 1028, thereby making the external-recording-medium recording/reproducing part 1028 store the music data in an external recording medium.

A broadcast signal receiving section 1030 receives the radio broadcast waves transmitted from each radio station, and supplies them to a tuner section 1031.

The tuner section 1031, under the control of the control section 1023, extracts a radio broadcast signal of the broadcast frequency corresponding to a radio station, for example, specified via the operation input section 1020, out of the radio broadcast waves received via the broadcast signal receiving section 1030, and subjects the radio broadcast signal to a predetermined reception processing, so as to send out the resulting voice data to the voice control section 1026 by way of the bus 1022.

The voice control section 1026 converts the voice data supplied from the tuner section 1031 into an analog voice signal and sends it out to the loudspeaker 1027, so as to make the loudspeaker 1027 output the program voice of the radio program broadcast by the radio station, thereby enabling the user to listen the program voice of the radio program.

The control section 1023 is also able to send out and store the voice data obtained in the tuner section 1031 in the storage medium 1029, so as to record the program voice of the radio program.

Further, the control section 1023 is able to be connected to a predetermined network successively via a communication control section 1032 and a network interface 1033, so as to access the portal server 1003 and the contents sales server 1005, etc. on the network, thereby transmitting and receiving a variety of information and data to and from the portal server 1003 and the contents sales server 1005, etc.

An encoder/decoder section 1034 decodes the compression coded contents data which is received from the network successively via the network interface 1033 and the communication control section 1032, or which is read out from the storage medium 1029 and the external recording medium, and sends out the decoded data to the display control section 1024 and the voice control section 1026.

The encoder/decoder section 1034 also applies the compression coding to the uncompressed contents data read out from the external recording medium and to the voice data, etc. supplied from the tuner section 1031, and sends out the resultant compression coded contents data to the storage medium 1029.

As a result, the contents data subjected to the compression coding in the encoder/decoder section 1034 are stored in the storage medium 1029 under the control of the control section 1023.

A copyright management section 1035 generates the copyright management information corresponding to the contents data downloaded from the network successively via the network interface 1033 and the communication control section 1032, and to the contents data read out from the external recording medium by the external recording medium recording/reproducing section 1028.

The copyright management information generated by the copyright management section 1035 is registered under the control of the control section 1023 in the storage medium 1029 in association with the contents data.

The copyright management section 1035 also performs protection of the copyright over the contents data by suitably updating the contents of the copyright management information associated with the contents data, at the time of checking out the contents data associated with the copyright management information from the recording medium 1029 to the specific external recording medium, or of checking in the contents data associated with the copyright management information from the specific external recording medium to the storage media 1029.

A page information generation section 1036 interprets the page information, such as an XML (extensible Markup Language) file or HTML (Hyper Text Markup language) file, etc. received from the network successively via the network interface 1033 and the communication control section 1032 so as to generate the image data for the display in the display section 1025, and sends out the generated image data to the display control section 1024.

An authentication processing section 1037 performs the authentication processing, such as the transmission of the authentication information to the portal server 1003 and the contents sale server 1005, etc. on the network which are connected via the network interface 1033, successively via the communication control section 1032 and the network interface 1033.

An authentication information storing section 1038 stores the authentication information which is required when the authentication processing section 1037 accesses the portal server 1003 and the contents sales server 1005, etc.

A radio broadcast display control section 1039 transmits a request signal for requiring the radio broadcast information about the radio broadcast currently received by the user for listening, to a radio broadcast information distribution server (not shown) corresponding to the radio station broadcasting the radio broadcast currently received, successively via the communication control section 1032 and the network interface 1033.

As a result, the radio broadcast display control section 1039 receives the radio broadcast information transmitted from the radio broadcast information distribution server on the network successively via the network interface 1033 and the communication control section 1032, and delivers the received radio broadcast information to the display control section 1024, thereby making the display section 1025 display the radio broadcast information including the program name of the radio program currently received, and the title and artist name of musical composition currently received, etc.

(4-2) The Configuration of the Portal Server

Next, the hardware configuration of the portal server 1003 represented by the functional circuit block is described with reference to FIG. 24. A control section 1050 in the portal server 1003 controls the operation of each circuit connected by way of a bus 1051.

A communication control section 1052, under the control of the control section 1050, transmits/receives a variety of information to/from the client terminal 1002, the contents sales server 1005, etc. by way of a network interface 1053.

In a customer database section 1054, the ID (Identification) information and the password information of the user who has already completed the contract with the operator of the contents sales system, are registered as the customer information so as to be associated with each other.

A page information storing section 1055 stores the page information, etc. which are managed by the operator of the contents sales system.

The page information is described by a language, such as the XML, and includes the URL (Uniform Resource Locator) information for accessing the contents sales server 1005, etc.

An authentication processing section 1056, upon receipt of the user's ID and password information transmitted from the client terminal 1002 successively via the network interface 1053 and the communication control section 1052, confirms as the user authentication processing, whether the user's ID and password information have been registered in the customer database section 1054 as the customer information.

In addition, the authentication processing section 1056, upon completion of the user authentication processing, issues the portal authentication result information (the authentication session ID information as described later) which indicates the result of the user authentication processing, and stores temporarily the issued portal authentication result information, in an authentication information storing section 1057.

At this time, when the user is authenticated as the registered user as a result of the user authentication processing performed by the authentication processing section 1056, the control section 1050 transmits the page information of the page for the contractors (for example, the top page in the third embodiment described above) stored in the page information storing section 1055, together with portal authentication result information, to the client terminal 1002 successively via the communication control section 1052 and the network interface 1053.

When the user is not authenticated as the registered user as a result of the user authentication processing performed by the authentication processing section 1056, the control section 1050 may be arranged to transmit the authentication error information, together with the authentication failure notification page information indicating the authentication failure stored in the page information storing section 1055, to the client terminal 1002 successively via the communication control section 1052 and a network interface 1053.

As a result of the authentication processing of the user performed by the contents sales server 1005, etc., when receiving the portal authentication result information (the authentication ticket described later), which is obtained and transmitted from the client terminal 1002 of the user, successively via the network interface 1053 and the communication control section 1052, the authentication processing section 1056 compares the received portal authentication result information with the portal authentication result information corresponding to the user which has been stored temporarily in the authentication information storing section 1057.

Thereby, the authentication processing section 1056 performs the confirmation processing for confirming the normality of the portal authentication result information, as the authentication processing for the portal authentication result information received from the contents sales server 1005, etc., and return the confirmation result information indicating the confirmation result to the contents sales server 1005, etc., successively via the communication control section 1052 and the network interface 1053.

In an frequency information storage section 1058, the area code, such as the postal code number, enabling to specify the area, the frequency information indicating the broadcast frequency of the radio broadcast receivable in the area indicated by the area code, the name of the radio station broadcasting the radio broadcast (hereinafter referred to as the radio station's name), and the call sign representing the identification information unique to each radio station, are stored so as to be associated with each other.

In a URL storing section 1059, the call sign for the radio broadcast which is assigned for every radio station, and the URL information enabling to obtain the radio broadcast information (hereinafter referred to as the now-on-air information) which relates to the radio program currently broadcast by the radio station corresponding to the call sign and which includes the program name of the radio program and the title of the musical composition currently broadcast in the radio program, are stored so as to be associated with each other.

(4-3) The Functional Circuit Block Configuration of the Contents Sales Server

Next, the hardware configuration of the contents sales server 1005 represented by the functional circuit block is described with reference to FIG. 25. A control section 1090 in the contents sales server 1005 controls the operation of each circuit connected by way of a bus 1091.

A communication control section 1092 transmits/receives, under the control of the control section 1090, a variety of information to/from the client terminal 1002 and the portal server 1003, etc. by way of a network interface 1093.

In a customer database section 1094, the user's ID and password information of the user who has already completed the contract with the operator of the contents sales server 1005, are registered as the customer information so as to be associated with each other. However, in a case where an authentication processing section 1095 is provided with a function to perform the authentication processing of the user based on the portal authentication result information which is transmitted from the client terminal 1002 and which has been issued by the portal server 1003, the customer database section 1094 need not be provided.

A page information storing section 1096 stores the page information, etc., of the package media sales page (for example, the A Corporation CD sales page in the third embodiment described above) for introducing package media, such as a CD and DVD, etc. for sale, which page information, etc. are managed by the contents sales server 1005.

Incidentally, the page information of the package media sales page is described by a language, such as the XML, enabling the user using the client terminal 1002 to select a package medium, such as a CD and DVD which the user wishes to purchase.

Upon receipt of the request signal for requiring the page information of the package media sales page transmitted from the client terminal 1002 successively via the network interface 1093 and the communication control section 1092, the control section 1090 in accordance with the received request signal, transmits the page information of the package media sales page stored in the page information storing section 1096 to the client terminal 1002 successively via the communication control section 1092 and the network interface 1093.

Upon receipt of the user's ID and password information of the user using the client terminal 1002 transmitted from the client terminal 1002 successively via the network interface 1093 and the communication control section 1092, the authentication processing section 1095 confirms, as the user authentication processing, whether the received user's ID and password information are registered as the customer information in the customer database section 1094.

The authentication processing section 1095 also receives the portal authentication result information (the authentication ticket described later) which is transmitted from the client terminal 1002 as an user authentication method different from the user authentication method using the user's ID and password information, and which has been issued by the portal server 1003, successively via the network interface 1093 and the communication control section 1092, so as to transmit the received portal authentication result information, to the portal server 1003 successively via the communication control section 1092 and the network interface 1093.

Then, in accordance with the transmission of the portal authentication result information to the portal server 1003, the authentication processing section 1095 receives the confirmation result information returned as a result of the execution of the authentication processing (namely, the confirmation processing described above) of the portal authentication result information, from the portal server 1003 successively via the network interface 1093 and the communication control section 1092, so as to confirm whether the user is the registered user who has already completed the contract with the operator of the contents sales system, based on the received confirmation result information.

Thus, upon completion of the user authentication processing, the authentication processing section 1095 issues the server authentication result information (the service session ID information described later) which indicates the result of the user authentication processing.

At this time, when the user is authenticated as the registered user as a result of the user authentication processing performed by the authentication processing section 1095, the control section 1090 transmits to the client terminal 1002 the page information of the package media sales page which is intended for the contractor and stored in the page information storing section 1096, together with the server authentication result information, successively via the communication control section 1092 and the network interface 1093.

On the other hand, when the user fails to be authenticated as the registered user as a result of the user authentication processing performed by the authentication processing section 1095, the control section 1090 transmits to the client terminal 1002 the authentication error information, together with the authentication failure notification page information indicating the unsuccessful authentication which is stored in the page information storing section 1096, successively via the communication control section 1092 and the network interface 1093.

Incidentally, an authentication information storing section 1097 stores temporarily the server authentication resuit information issued by the authentication processing section 1095, and also stores the various authentication information required when the user authentication processing of the user using the client terminal 1002 is performed by the authentication processing section 1095.

A package media information storing section 1098 stores the information about a plurality of package media, such as a CD and DVD for sale (hereinafter referred to as the package media information), in association with the search key of each package media ID information, etc.

When the page information of the package media sales page is transmitted to the client terminal 1002 and, as a result, the media information request signal for requiring the package media information about package media, such as a specific CD and DVD, transmitted from the client terminal 1002, is received successively via the network interface 1093 and the communication control section 1092, a retrieval section 1099 takes out the search key for retrieving the specific package media from the received media information request signal.

Then, the retrieval section 1099 retrieves, based on the search key, the package media information of the specific package media corresponding to the retrieval condition indicated by the search key, out of a plurality of package media information in the package media information storing section 1098.

Thereby, the control section 1090 transmits the retrieved package media information to the client terminal 1002 successively via the communication control section 1092 and the network interface 1093, and presents the package media information about the specific package media to the user.

Consequently, upon receipt of the purchase request signal for requesting the purchase of the specific package media described above successively via the network interface 1093 and the communication control section 1092, the control section 1090 performs the purchase processing, such as a delivering procedure of the specific package media to the user using the client terminal 1002.

The control section 1090 also transmits to a predetermined charging server (not shown), the charging information for use in the charging processing to the user in connection with the purchase of the specific package media, successively via the communication control section 1092 and the network interface 1093, thereby making the charging server perform the charging processing to the user in accordance with the purchase of the specific package media.

When the charging server completes the charging processing to the user, the control section 1090 transmits to the client terminal 1002, the purchase completion page information indicating the completion of the purchase processing of the package media, successively via the communication control section 1092 and the network interface 1093.

(4-4) The Display of the A Corporation CD Sales Page Through the Top Page

Figure 26:
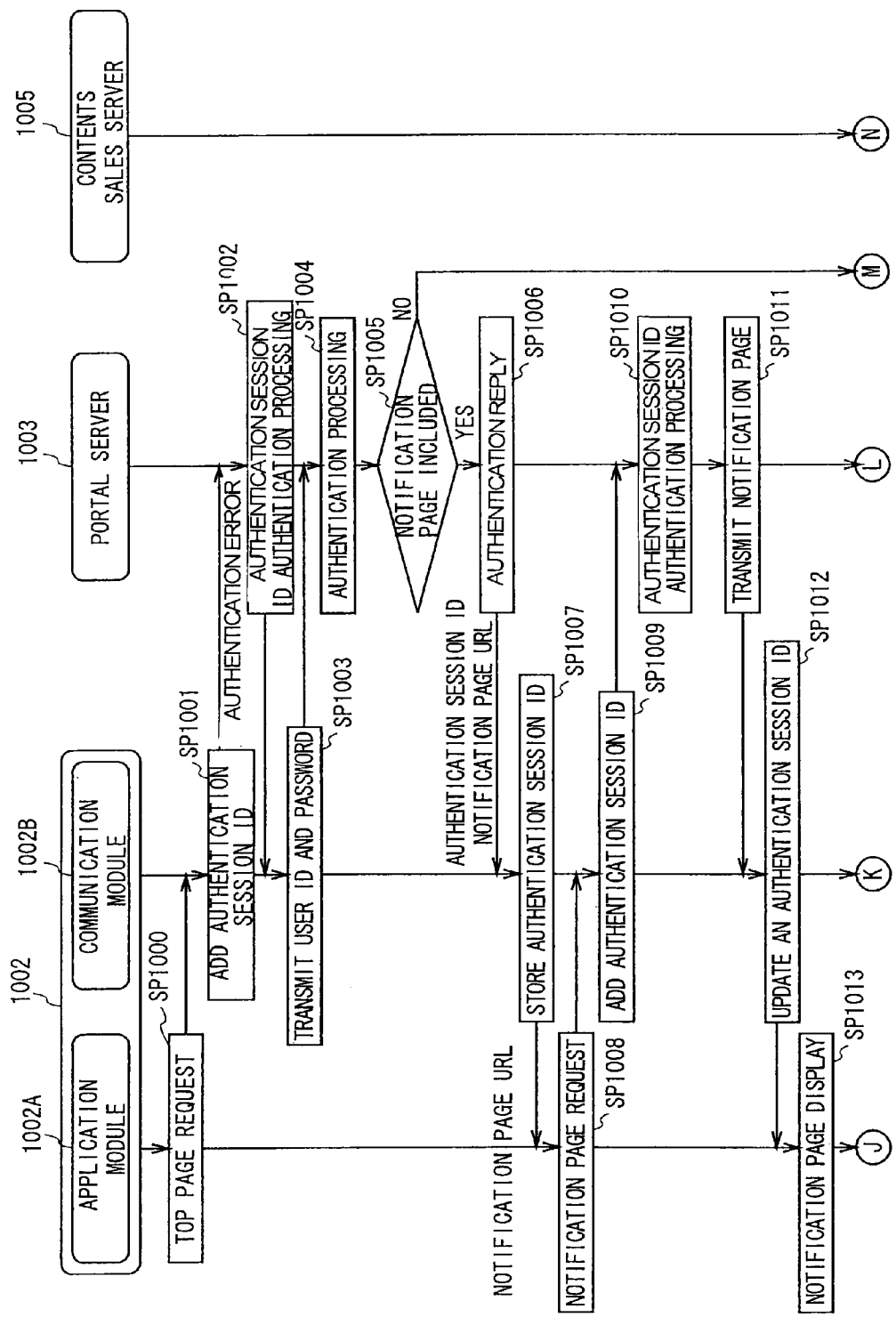
FIG. 26 is a sequence chart showing a page display processing procedure for the A Corporation CD sales page by way of the top page.
Figure 27:
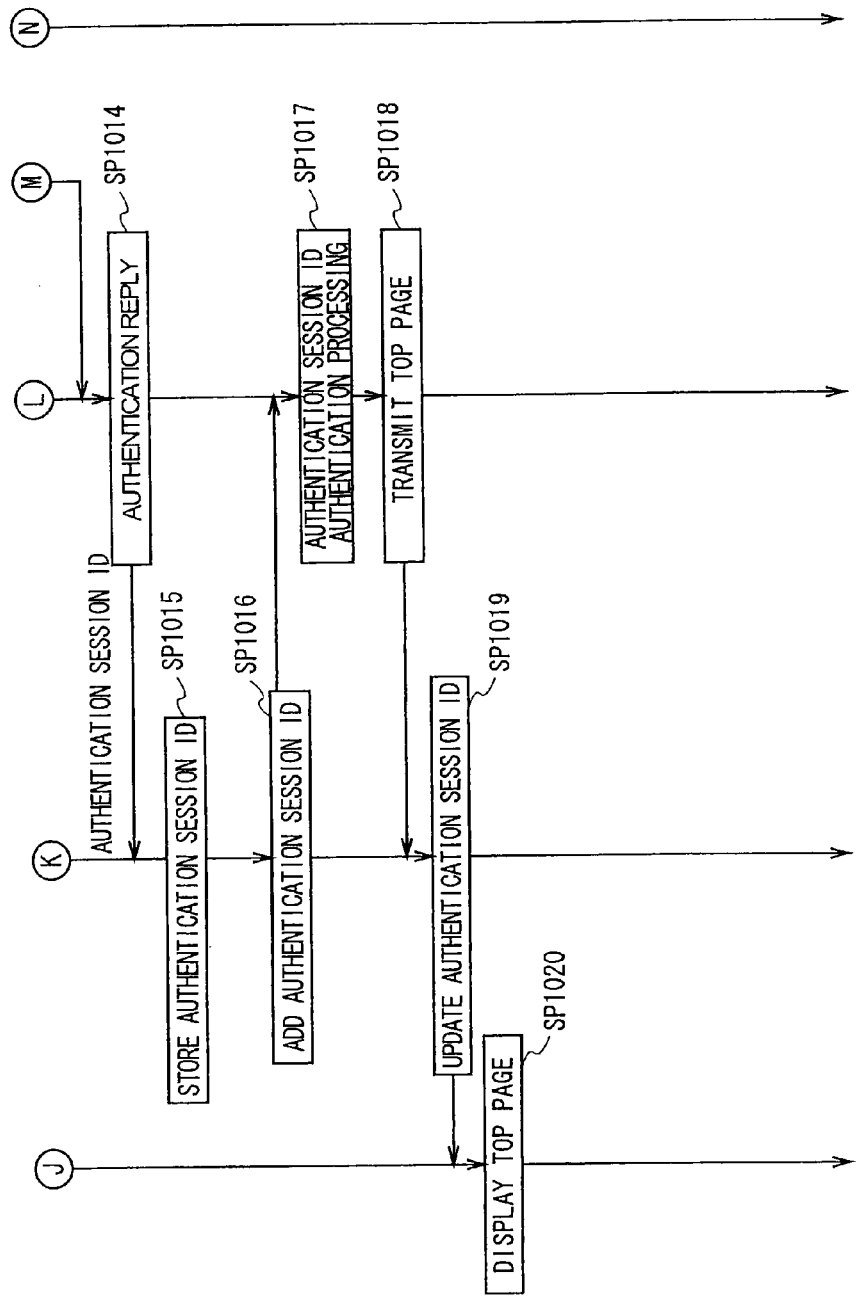
FIG. 27 is a sequence chart following the sequence chart in FIG. 26 showing a page display processing procedure for the A Corporation CD sales page by way of the top page.

Next, the display processing procedure of the package media sales page (here the A Corporation CD sales page) through the top page in the fourth embodiment is described with reference to the sequence charts shown in FIGS. 26 and 27.

An application module 1002A of the client terminal 1002 in FIGS. 26 to 29 corresponds to the control section 1023, the input processing section 1021, the display control section 1024, and the page information generation section 1036 in FIG. 23, and a communication module 1002B corresponds to the communication control section 1032 and the authentication processing section 1037 in FIG. 23.

When recognizing that the operation for displaying the top page in the display section 1025 is performed, the application module 1002A of the client terminal 1002 advances to step SP 1000, so as to deliver to the communication module 1002B, the request signal (hereinafter also referred to as the top page request signal) for requiring the page information (the source) of the top page.

When receiving the top page request signal in step SP 1001, the communication module 1002B of the client terminal 1002 reads out the authentication session ID information, etc., temporarily stored beforehand in the authentication information storing section 1038, and transmits the authentication session ID information etc. and the top page request signal to the portal server 1003 by way of the network interface 1033.

Incidentally, the authentication session ID information is the identification information issued by the portal server 1003 for identifying the individual communication link status (namely, the session), each time the client terminal 1002 and the portal server 1003 establish a communication link for performing various processing, such as the user authentication processing, and the like.

For the use of the user authentication processing etc., the authentication session ID information is also provided with the validity period (for example, about 1 minute) predetermined by the portal server 1003 based on the time when the authentication session ID information was issued.

Therefore, when the client terminal 1002, which has obtained the authentication session ID information from the portal server 1003, is unable to present the authentication session ID information to the portal server 1003 within the validity period, the communication link status specified by the authentication session ID information is determined to have been cut off by the portal server 1003.

This enables the portal server 1003 to prevent the previously issued authentication session ID information from being unfairly used for the user authentication processing etc. by the user who has not made a contract with the operator of the contents sales system.

The authentication session ID information stored temporarily in the authentication information storing section 1038 of the client terminal 1002 is the authentication session ID information issued by the portal server 1003 when the client terminal 1002 and the portal server 1003 previously established the communication link for performing the user authentication processing and the like.

When the authentication session ID information etc. and the top page request signal are transmitted from the client terminal 1002, in response thereto, the control section 1050 of the portal server 1003 receives, in step SP 1002, the authentication session ID information and the top page request signal successively via the network interface 1053 and the communication control section 1052, and sends out the authentication session ID information etc. to the authentication processing section 1056.

The authentication processing section 1056 performs the user authentication processing, under the control of the control section 1050, based on the received authentication session ID information, etc.

As a result, when the user using the client terminal 1002 is unable to be authenticated as the registered user, because of the expiration of the validity period of the authentication session ID information, etc. received from the client terminal 1002, and the like, the authentication processing section 1056 determines that the request of the top page from the client terminal 1002 is not an authorized request.

In this case, the control section 1050 also transmits to the client terminal 1002 the authentication error information indicating the authentication error successively via the communication control section 1052 and the network interface 1053.

In step SP 1003, when receiving the authentication error information via the network interface 1033, the communication module 1002B of the client terminal 1002 reads out the user's ID and password information, etc. which have been stored in the authentication information storing section 1038, and transmit the user's ID and password information, etc. read out, to the portal server 1003 via the network interface 1033.

In step SP 1004, the control section 1050 of the portal server 1003 receives the user's ID and password information, etc. successively via the network interface 1053 and the communication control section 1052 and sends them out to the authentication processing section 1056.

The authentication processing section 1056, under the control of the control section 1050, discriminates, as the user authentication processing, whether the user's ID and the password information, etc., received from the client terminal 1002 are included in the customer information registered in the customer database section 1054.

As a result, when authenticating the user using the client terminal 1002 as the registered user, the authentication processing section 1056 issues, as the portal authentication result information, the authentication session ID information, etc. related to the current communication link status between the client terminal 1002 and the portal server 1003.

At this time, the authentication processing section 1056, under control of a control section 1050, stores temporarily the authentication session ID information, etc. issued to the client terminal 1002 in the authentication information storing section 1057.

In the subsequent step SP 1005, the control section 1050 of the portal server 1003 discriminates whether the page information of the notification page exists in the page information storing section 1055. Incidentally, the notification page, as in the case of the third embodiment described above, is the page in which, for example, the maintenance information of the portal server 1003 and the current status of the CD sales service in the contents sales server 1005, etc. are described.

When an affirmative result is obtained in the step SP 1005, the control section 1050 moves to step SP 1006, where the authentication processing section 1056 transmits to the client terminal 1002, the authentication session ID information etc. issued by the authentication processing section 1056 to the client terminal 1002, and for example, the URL indicating the memory location of the page information of the notification page, successively via the communication control section 1052 and the network interface 1053.

In step SP 1007, the communication module 1002B of the client terminal 1002 receives the authentication session ID information, etc. and the URL of the notification page, transmitted from the portal server 1003, via the network interface 1033, and stores temporarily the received authentication session ID information, etc. in the authentication information storing section 1038, and also delivers the URL of the notification page to the application module 1002A. Incidentally here, the URL of the notification page is assumed to indicate the portal server 1003.

In step SP 1008, the application module 1002A of the client terminal 1002 generates the request signal (hereinafter also referred to as the notification page request signal) for requiring the page information of the notification page, based on the URL of the notification page received from the portal server 1003 via the communication module 1002B, and delivers the request signal to the communication module 1002B.

When receiving the notification page request signal in step SP 1009, the communication module 1002B of the client terminal 1002 reads out the authentication session ID information, etc. stored temporarily in the authentication information storing section 1038, and transmits the authentication session ID information, etc. and the notification page request signal to the portal server 1003 via the network interface 1033.

In step SP 1010, the control section 1050 of the portal server 1003 receives the authentication session ID information etc. and the notification page request signal transmitted from the client terminal 1002 successively via the network interface 1053 and the communication control section 1052, and sends out the authentication session ID information etc. to the authentication processing section 1056.

The authentication processing section 1056, under the control of the control section 1050, performs the user authentication processing so as to compare the received authentication session ID information, etc. with the authentication session ID information, etc., which were issued in the step SP 1004 described above to the client terminal 1002, and which have been stored temporarily in the authentication information storing section 1057.

As a result, when authenticating the user using the client terminal 1002 as the registered user in step SP 1011, the authentication processing section 1056 determines the request of the notification page from the client terminal 1002 as the authorized request, so as to extend the validity period of the authentication session ID information, etc. issued to the client terminal 1002.

At this time, the control section 1050 of the portal server 1003 also reads out the page information of the notification page required by the user from the page information storing section 1055, and transmits to the client terminal 1002 the page information read out, together with the authentication session ID information, etc. of which the validity period has been extended by the authentication processing section 1056, successively via the communication control section 1052 and the network interface 1053.

In step SP 1012, the communication module 1002B of the client terminal 1002 receives, via the network interface 1033, the page information of the notification page and the authentication session ID information, etc. of which the validity period has been extended, each transmitted from the portal server 1003, and delivers the received page information to the application module 1002A. In addition, the communication module 1002B of the client terminal 1002 also temporarily stores in the authentication information storing section 1038, the authentication session ID information, etc. of which the validity period has been extended, in such a manner that the authentication session ID information, etc. before the validity period is extended are overwritten with the authentication session ID information, etc. of which the validity period has been extended, thereby, making the authentication session ID information, etc. stored temporarily in the step SP 1007 described above updated to be the authentication session ID information, etc. of which the validity period has been extended, so as to move to the subsequent step SP 1016 (FIG. 27). The step SP 1015 in FIG. 27 is a step performed only when the negative result is obtained in step SP 1005 in FIG. 26.

In step SP 1013, the application module 1002A displays the notification page in the display section 1025 based on the page information of the notification page supplied from the communication module 1002B.

On the other hand, when the negative result is obtained in the above-mentioned step SP 1005, i.e., when the page information of the notification page does not exist in the page information storing section 1055, the control section 1050 of the portal server 1003 moves to step SP 1014 (FIG. 27), and, in this step, transmits to the client terminal 1002 the authentication session ID information, etc. issued by the authentication processing section 1056 to the client terminal 1002 in the above-mentioned step SP 1004, successively via the communication control section 1052 and the network interface 1053.

In step SP 1015, the communication module 1002B of the client terminal 1002 receives the authentication session ID information, etc. transmitted from the portal server 1003 via the network interface 1033, and stores temporarily the received authentication session ID information, etc. in the authentication information storing section 1038, so as to move to the subsequent step SP 1016.

In step SP 1016, the communication module 1002B reads out the authentication session ID information, etc. stored temporarily in the authentication information storing section 1038, and transmits the authentication session ID information, etc. and the top page request signal obtained in step SP 1001, to the portal server 1003 via the network interface 1033.

When the authentication session ID information, etc. and the top page request signal are transmitted from the client terminal 1002, in response thereto, in step SP 1017, the control section 1050 of the portal server 1003 receives the authentication session ID information, etc. and the top page request signal successively via the network interface 1053 and the communication control section 1052, and sends out the authentication session ID information, etc. to the authentication processing section 1056.

The authentication processing section 1056 performs the user authentication processing, under the control of the control section 1050, based on the received authentication session ID information and the like.

As a result, when authenticating the user using the client terminal 1002 as the registered user, the authentication processing section 1056 determines that the request of the top page from the client terminal 1002 is an authorized request, so as to extend the validity period of the authentication session ID information, etc. issued to the client terminal 2.

At this time, in the subsequent step SP 1018, the control section 1050 of the portal server 1003 reads out the page information of the top page required by the user from the page information storing section 1055, and transmits to the client terminal 1002, the page information read out, together with the authentication session ID information, etc. of which the validity period has been extended by the authentication processing section 1056, successively via the communication control section 1052 and the network interface 1053.

In step SP 1019, the communication module 1002B of the client terminal 1002 receives, via the network interface 1033, the page information of the top page and the authentication session ID information, etc. of which the validity period has been extended, each transmitted from the portal server 1003, and sends out the received page information to the application module 1002A. In addition, the communication module 1002B of the client terminal 1002 stores temporarily in the authentication information storing section 1038, the authentication session ID information, etc. of which the validity period has been extended, in such a manner that the authentication session ID information, etc. before the validity period is extended is overwritten with the authentication session ID information, etc. of which the validity period has been extended, thereby making the authentication session ID information, etc. stored temporarily in the above-mentioned steps SP 1012 or SP 1015 updated to be the authentication session ID information, etc. of which the validity period has been extended.

In step SP 1020, the application module 1002A displays the top page in the display section 1025 based on the page information of the top page supplied from the communication module 1002B.

When the link button (for example, the button BT1 in FIG. 8) leading to the A Corporation CD sales page currently displayed in the top page is pressed, the application module 1002A, based on the URL embedded in the link, delivers to the communication module 1002B, the request signal (hereinafter referred to as the sales page request signal) for requiring the page information of the A Corporation CD sales page, and thereafter performs the same processing as in the steps SP 1051 to SP 1081 in the display processing procedure of the A Corporation CD sales page from the bookmark which is to be described later (however, the steps SP 1057 to SP 1065 may be eliminated), so as to display the A Corporation CD sales page in the display section 1025.

(4-5) The Display of the A Corporation CD Sales Page from the Bookmark

Figure 28:
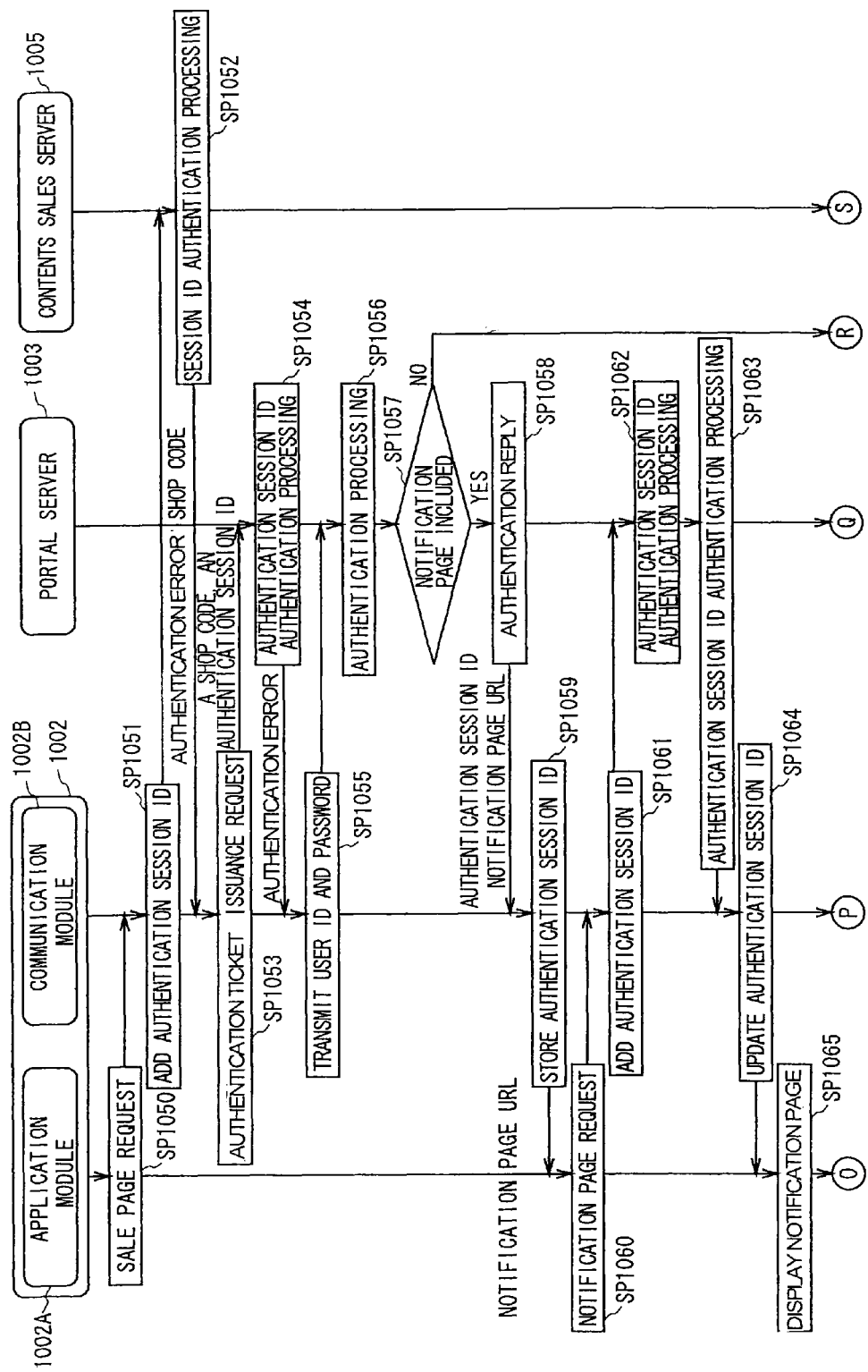
FIG. 28 is a sequence chart showing a page display processing procedure for the A Corporation CD sales page from a bookmark.
Figure 29:
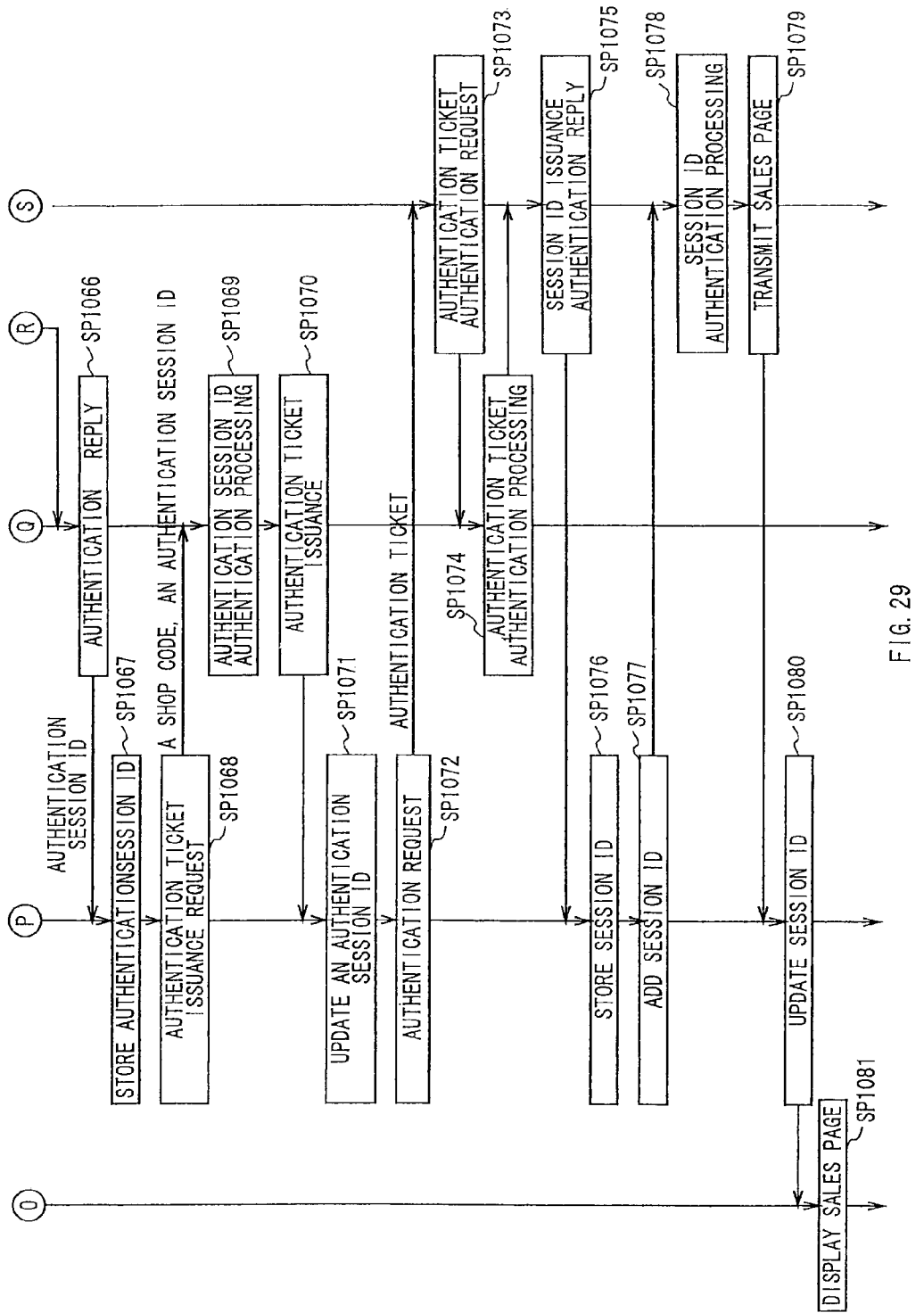
FIG. 29 is a sequence chart following the sequence chart in FIG. 28, showing a page display processing procedure for the A Corporation CD sales page from the bookmark.

Then, the display processing procedure of the A Corporation CD sales page from the bookmark in the fourth embodiment is described with reference to the sequence charts shown in FIGS. 28 and 29.

When recognizing that the operation is performed for displaying in the display section 1025 the A Corporation CD sales page in which the URL is registered as the bookmark, the application module 1002A of the client terminal 1002 advances to step SP 1050, so as to deliver to the communication module 1002B the sale page request signal for requiring the page information of the A Corporation CD sales page.

When receiving the sale page request signal in step SP 1051, the communication module 1002B of the client terminal 1002 reads out the service session ID information, etc. stored temporarily beforehand in the authentication information storing section 1038, so as to transmit the service session ID information etc. and the sales page request signal to the contents sales server 1005 via the network interface 1033.

Incidentally, the service session ID information is the identification information, issued by the contents sales server 1005 to which the client terminal 1002 accesses, for identifying the individual communication link status (namely, the session), each time the client terminal 1002 and the contents sales server 1005 establishes the communication link for performing various processing, such as the user authentication processing.

In addition, as in the case of the authentication session ID information described above, a predetermined validity period (for example, about 1 minute) is provided for the service session ID information, based on the time when it is issued by the contents sales server 1005, for the use of the user authentication processing, etc.

Therefore, when the client terminal 1002, which has obtained the service session ID information from the contents sales server 1005, is unable to present the service session ID information within the validity period to the contents sales server 1005, from which the service session ID information was issued, the communication link status specified by the service session ID information is determined to have been cut off by the contents sales server 1005.

Thereby, the contents sales server 1005 prevents the previously issued service session ID information from being unfairly used in the user authentication processing etc. by the user who has not made a contract with the operator of the contents sales system.

Moreover, the service session ID information stored temporarily in the authentication information storing section 1038 is the service session ID information issued by the contents sales server 1005 to which the client terminal 1002 accessed, when the client terminal 1002 and the contents sales server 1005 previously established the communication link for performing the user authentication processing and the like.

In step SP 1052, the control section 1090 of the contents sales server 1005 receives the service session ID information, etc. and the sale page request signal transmitted from the client terminal 1002 successively via the network interface 1093 and the communication control section 1092, and sends out the service session ID information, etc. to the authentication processing section 1095.

The authentication processing section 1095, under the control of the control section 1090, performs the user authentication processing so as to compare the received service session ID information, etc. with the service session ID information, etc. which have already been stored temporarily in the authentication information storing section 1097.

As a result, when the user using the client terminal 1002 is unable to be authenticated as the registered user because of the expiration of the validity periods of the service session ID information, etc. received from the client terminal 1002, the authentication processing section 1095 determines the request of the sales page information from the client terminal 1002 as the unauthorized request.

In this case, the control section 1090 transmits to the client terminal 1002 the authentication error information indicating the authentication error and the shop code for identifying the contents sales server 1005, successively via the communication control section 1092 and the network interface 1093.

In step SP 1053, the communication module 1002B of the client terminal 1002 receives the authentication error information and the shop code transmitted from the contents sales server 1005 via the network interface 1033.

Here, when recognizing the un-authentication of the user in the contents sales server 1005 based on the authentication error information received from the contents sales server 1005, the communication module 1002B generates the authentication ticket issuance request signal for requiring the issuance of the authentication ticket for accessing the contents sales server 1005, and transmits, to the portal server 1003, the authentication ticket issuance request signal, together with the received shop code and the authentication session ID information, etc. temporarily stored in the authentication information storing section 1038, via the network interface 1033.

At this time, the communication module 1002B stores temporarily the received shop code in the authentication information storing section 1038.

In step SP 1054, the control section 1050 of the portal server 1003 receives the authentication ticket issuance request signal, the shop code, and the authentication session ID information, etc., which are transmitted from the client terminal 1002, successively via the network interface 1053 and the communication control section 1052, and sends out those to the authentication processing section 1056.

The authentication processing section 1056 performs the user authentication processing under the control of the control section 1050, so as to compare the received authentication session ID information, etc. with the authentication session ID information, etc. which have already been stored temporarily in the authentication information storing section 1057.

As a result, for example, when the user using the client terminal 1002 is unable to be authenticated as the registered user because the validity period of the authentication session ID information received from the client terminal 1002 has already expired, the authentication processing section 1056 determines that the request for requiring the issuance of the authentication ticket from the client terminal 1002 is not authorized.

Further, in this case, the control section 1050 transmits the authentication error information indicating the authentication error to the client terminal 1002 successively via the communication control section 1052 and the network interface 1053.

In step SP 1055, when receiving the authentication error information from the portal server 1003 via the network interface 1033, the communication module 1002B of the client terminal 1002 reads out the user's ID and password information, etc., stored in the authentication information storing section 1038, and transmits the user's ID and password information, etc. read out, to the portal server 1003 via the network interface 1033.

In step SP 1056, the control section 1050 of the portal server 1003 receives the user's ID and password information, etc. successively via the network interface 1053 and the communication control section 1052, and sends out those to the authentication processing section 1056.

Then, the authentication processing section 1056, as the user authentication processing, under the control of the control section 1050, discriminates whether the user's ID and password information, etc. received from the client terminals 1002 are included in the customer information registered in the customer database section 1054.

As a result, when authenticating the user using the client terminal 1002 as the registered user, the authentication processing section 1056 issues the authentication session ID information, etc. related to the current communication link status between the client terminal 1002 and the portal server 1003, as the portal authentication result information.

At this time, the authentication processing section 1056 also stores temporarily, under the control of the control section 1050, the authentication session ID information, etc. issued to the client terminal 1002 in the authentication information storing section 1057.

In the subsequent step SP 1057, the control section 1050 of the portal server 1003 discriminates whether the page information of the notification page exists in the page information storing section 1055.

When the affirmative result is obtained in step SP 1057, the control section 1050 then moves to step SP 1058.

In step SP 1058, the control section 1050 of the portal server 1003 transmits, to the client terminal 1002, the authentication session ID information etc. issued by the authentication processing section 1056 to the client terminal 1002 and, for example, the URL indicating the memory location of the page information of the notification page, successively via the communication control section 1052 and the network interface 1053.

In step SP 1059, the communication module 1002B of the client terminal 1002 receives the authentication session ID information, etc. and the URL of the notification page, transmitted from the portal server 1003, by way of the network interface 1033, and stores temporarily the received authentication session ID information, etc. in the authentication information storing section 1038, and delivers the URL of the notification page to the application module 1002A.

In step SP 1060, the application module 1002A of the client terminal 1002 generates the notification page request signal for requiring the page information of the notification page based on the URL of the notification page received from the portal server 1003 via the communication module 1002B, and delivers the notification page request signal to the communication module 1002B.

In step SP 1061, when receiving the notification page request signal, the communication module 1002B read out the authentication session ID information, etc. stored temporarily in the authentication information storing section 1038, and transmits the authentication session ID information, etc. and the notification page request signal to the portal server 1003 via the network interface 1033.

In step SP 1062, the control section 1050 of the portal server 1003 receives the authentication session ID information, etc. and the notification page request signal transmitted from the client terminal 1002 successively via the network interface 1053 and the communication control section 1052, and sends out the authentication session ID information, etc. to the authentication processing section 1056.

Then, the authentication processing section 1056, under the control of the control section 1050, performs the user authentication processing so as to compare the received authentication session ID information, etc. with the authentication session ID information, etc. issued to the client terminal 1002 in the above-mentioned step SP 1056, and stored temporarily in the authentication information storing section 1057.

As a result, in step SP 1063, when authenticating the user using the client terminal 1002 as the registered user, the authentication processing section 1056 determines the request of the notification page from the client terminal 1002 as the authorized request, so as to extend the validity periods of the authentication session ID information, etc. issued to the client terminal 1002.

At this time, the control section 1050 of the portal server 1003 reads out from the page information storing section 1055, the page information of the notification page required by the user, and transmits to the client terminal 1002, the page information read out, together with the authentication session ID information, etc. of which the validity period has been extended by the authentication processing section 1056, successively via the communication control section 1052 and the network interface 1053.

In step SP 1064, the communication module 1002B of the client terminal 1002 receives, via the network interface 1033, the page information of the notification page and the authentication session ID information, etc. of which the validity period has been extended, each transmitted from the portal server 1003, and sends out the received page information to the application module 1002A. In addition, the communication module 1002B of the client terminal 1002 stores temporarily in the authentication information storing section 1038 the authentication session ID information etc., of which the validity period has been extended, in such a manner that the authentication session ID information, etc. before the validity period is extended is overwritten with the authentication session ID information etc., of which the validity period has been extended, thereby making the authentication session ID information stored temporarily in the above-mentioned step SP 1059 updated to be the authentication session ID information of which the validity period has been extended, so as to move to the subsequent step SP 1068 (FIG. 29). The step SP 1067 in FIG. 29 is also the step performed only when the negative result is obtained in step SP 1057 in FIG. 28.

In step SP 1065, the application module 1002A displays the notification page in the display section 1025 based on the page information of the notification page supplied from the communication module 1002B.

On the other hand, when the negative result is obtained in the above-mentioned step SP 1057 (i.e., when the page information of the notification page does not exist in the page information storing section 1055), the control section 1050 of the portal server 1003 moves to step SP 1066 (FIG. 29), and in this step transmits to the client terminal 1002, the authentication session ID information, etc. which the authentication processing section 1056 have issued to the client terminal 1002, successively via the communication control section 1052 and the network interface 1053.

In step SP 1067, the communication module 1002B of the client terminal 1002 receives the authentication session ID information, etc. transmitted from the portal server 1003 via the network interface 1033, and stores temporarily the received authentication session ID information, etc. in the authentication information storing section 1038, so as to move to the subsequent step SP 1068.

In step SP 1068, the communication module 1002B generates the autentication ticket issuance request signal for requiring the portal server 1003 to issue again the authentication ticket, and transmits the authentication ticket issuance request signal, together with the shop code and the authentication session ID information, etc., which are stored in the authentication information storing section 1038, to the portal server 1003 via the network interface 1033.

In the embodiment, the shop code is stored temporarily in the authentication information storing section 1038 of the client terminal 1002, but there may be the other method. When the processing in steps SP 1051 to SP 1068 is performed between the client terminal 1002 and the portal server 1003, the shop code is arranged to be sequentially transmitted and received, so that the shop code can be transmitted to the portal server 1003 in step SP 1068 without the shop code being temporarily stored in the authentication information storing section 1038 of the client terminal 1002.

In step SP 1069, the control section 1050 of the portal server 1003 receives the authentication ticket issuance request signal, the shop code and the authentication session ID information, etc. transmitted from the client terminal 1002 successively via the network interface 1053 and the communication control section 1052, and sends out those to the authentication processing section 1056.

Then, the authentication processing section 1056, under the control of the control section 1050, performs the user authentication processing so as to compare the received authentication session ID information, etc. with the authentication session ID information stored temporarily in the authentication information storing section 1057.

As a result, when the user using the client terminal 1002 is authenticated as the registered user because the validity period of the authentication session ID information received from the client terminal 1002 has not yet expired, the authentication processing section 1056 determines the issuance request of the authentication ticket from the client terminal 1002 as the authorized request, and in the subsequent step SP 1070, issues, as the portal authentication result information, the authentication ticket, etc. for accessing the contents sales server 1005 indicated by the shop code, based on the shop code and the authentication ticket issuance request signal received from the client terminal 1002 in the above-mentioned step SP 1069.

In addition, the authentication processing section 1056 stores temporarily, under the control of a control section 1050, the authentication ticket, etc. in the authentication information storing section 1057, and extends the validity periods of the authentication session ID information, etc. which have been issued to the client terminal 1002.

The control section 1050 of the portal server 1003 also transmits the authentication ticket, etc. issued by the authentication processing section 1056, together with the authentication session ID information, etc. of which the validity period has been extended, to the client terminal 1002 successively via the communication control section 1052 and the network interface 1053.

In step SP 1071, the communication module 1002B of the client terminal 1002 receives via the network interface 1033, the authentication ticket, etc. and the authentication session ID information, etc. of which the validity period has been extended, each transmitted from the portal server 1003, so as to move to the subsequent step SP 1072.

In step SP 1072, the communication module 1002B transmits the received authentication ticket, etc., together with the authentication request signal, to the contents sales server 1005 via the network interface 1033.

At this time, the communication module 1002B also stores temporarily, in the authentication information storing section 1038, the authentication session ID information, etc. received from the portal server 1003, of which the validity period has been extended, in such a manner that the authentication session ID information, etc. before the validity period is extended are overwritten with the received authentication session ID information, etc. of which the validity period has been extended, thereby making the authentication session ID information, etc. stored temporarily in the above mentioned steps SP 1064 or SP 1067 updated to be the authentication session ID information, etc. of which the validity period has been extended.

In step SP 1073, when receiving the authentication request signal and the authentication ticket, etc. transmitted from the client terminal 1002, successively via the network interface 1093 and the communication control section 1092, the control section 1090 of the contents sales server 1005 transmits the received authentication ticket, etc., together with the authentication ticket confirmation request signal for requiring confirmation of the authentication ticket, etc., to the portal server 1003 successively via the communication control section 1092 and the network interface 1093.

In step SP 1074, the control section 1050 of the portal server 1003 receives the authentication ticket confirmation request signal and the authentication ticket, etc. transmitted from the contents sales server 1005 successively via the network interface 1053 and the communication control section 1052, and sends out those to the authentication processing section 1056.

The authentication processing section 1056, under the control of the control section 1050 and in accordance with authentication ticket confirmation request signal, performs the confirmation processing of the received authentication ticket, etc., so as to compare the received authentication ticket, etc. with the authentication ticket, etc. stored temporarily in the authentication information storing section 1057.

In addition, when the authentication processing section 1056 confirms the received authentication ticket, etc. as the registered authentication ticket, etc., the control section 1050 transmits the confirmation result information indicating that the authentication ticket etc. have been confirmed as the regular authentication ticket etc., to the contents sales server 1005 successively via the communication control section 1052 and the network interface 1053.

In step SP 1075, the control section 1090 of the contents sales server 1005 receives the confirmation result information transmitted from the portal server 1003 successively via the network interface 1093 and the communication control section 1092, and sends out the information to the authentication processing section 1095.

The authentication processing section 1095 issues, under the control of the control section 1090 and in accordance with the confirmation result information, the service session ID information, etc. related to the current communication link status between the client terminal 1002 and the contents sales server 1005, and stores temporarily the issued service session ID information, etc. in the authentication information storing section 1097.

Also, the control section 1090 of the contents sales server 1005 transmits the issued service session ID information etc. to the client terminal 1002 successively via the communication control section 1092 and the network interface 1093.

In step SP 1076, the communication module 1002B of the client terminal 1002 receives the service session ID information, etc. transmitted from the contents sales server 1005 via the network interface 1033, and stores temporarily the received service session ID information, etc. in the authentication information storing section 1038, so as to move to the subsequent step SP 1077.

In step SP 1077, the communication module 1002B transmits again the sales page request signal obtained in the above-mentioned step SP 1051 together with the service session ID information, etc. stored temporarily in the authentication information storing section 1038 in step SP 1076, to the contents sales server 1005 via the network interface 1033.

In step SP 1078, the control section 1090 of the contents sales server 1005 receives the sales page request signal and the service session ID information, etc., transmitted from the client terminal 1002, successively via the network interface 1093 and the communication control section 1092, and sends out the service session ID information etc. to the authentication processing section 1095.

The authentication processing section 1095 performs, under the control of the control section 1090, the user authentication processing so as to compares the received service session ID information, etc. with the service session ID information, etc., which, in the above-mentioned step SP 1075, have already been issued to the client terminal 1002 and stored temporarily in the authentication information storing section 1097.

As a result, when authenticating the user using the client terminal 1002 as the registered user because the validity periods of the service session ID information, etc. received from the client terminal 1002, have not yet expired, the authentication processing section 1095 determines the request of the A Corporation CD sales page from the client terminal 1002 as the authorized request, so as to extend the validity periods of the service session ID information, etc. which have been issued to the client terminal 1002.

Then, in the subsequent step SP 1079, the control section 1090 reads out the page information of the A Corporation CD sales page required by the user, from the page information storing section 1096, and transmits the page information read out, together with the service session ID information, etc. of which the validity period has. been extended by the authentication processing section 1095, to the client terminal 1002 successively via the communication control section 1092 and the network interface 1093.

In step SP 1080, the communication module 1002B of the client terminal 1002 receives, via the network interface 1033, the page information of the A Corporation CD sales page and the service session ID information, etc. of which the validity period has been extended, each transmitted from the contents sales server 1005, so as to send out the received page information of the A Corporation CD sales page to the application module 1002A. In addition, the communication module 1002B of the client terminal 1002 also temporarily stores in the authentication information storing section 1038, the service session ID information, etc. of which the validity period has been extended, in such a manner that the service session ID information, etc. before the validity period is extended are overwritten with the service session ID information, etc. of which the validity period has been extended, thereby making the service session ID information, etc. stored temporarily in the above-mentioned step SP 1076 updated to be the service session ID information, etc., of which the validity period has been extended.

In step SP 1081, the application module 1002A displays the A Corporation CD sales page in the display section 1025 based on the page information of the A Corporation CD sales page supplied from the communication module 1002B.

According to the above configuration, the same effect as the first and third embodiments described above can also be obtained in the contents sales system according to the fourth embodiment.

By the way, among the program modules (FIG. 15) of the client terminal 2 explained in the third embodiment described above, the HTTP message program 50 and the communicator program 51 are the program modules capable of realizing the same functions as the communication control section 1032 (FIG. 23) of the client terminal 1002 described in the fourth embodiment.

In addition, the contents reproduction module 52 (FIG. 15) is the program module capable of realizing the same functions as the encoder/decoder section 1034 (FIG. 23).

Further, the copyright protection management module 53 (FIG. 15) is the program module capable of realizing the same functions as the copyright management section 1035 (FIG. 23).

Further, the Internet radio channel selection reproduction module 54 (FIG. 15) is the program module capable of realizing the same functions as the control section 1023 and the voice control section 1026 (FIG. 23).

Further, the music purchase reproduction module 55 (FIG. 15) is the program module capable of realizing the same functions as the control section 1023 and the voice control section 1026 (FIG. 23).

Further, the XML browser 56 (FIG. 15) is the program module capable of realizing the same functions as the input processing section 1021 and the page information generation section 1036 (FIG. 23).

Further, the hard disk contents controller 57, the data base access module 59, and the contents data access module 60 (FIG. 15) are program modules capable of realizing the same functions as the control section 1023 (FIG. 23).

Further, the authentication library 58A (FIG. 15) of the library 58 is the program module capable of realizing the same functions as the authentication processing section 1037 and the authentication information storing section 1038 (FIG. 23).

Further, the clip library 58B (FIG. 15) of the library 58 is the program module capable of realizing the same functions as the control section 1023 (FIG. 23).

Further, the radio broadcast information display module 61 (FIG. 15) is the program module capable of realizing the same functions as the radio broadcast display control section 1039 (FIG. 23).

Further, the tuner channel selection reproduction/sound recording module 62 (FIG. 15) is the program module capable of realizing the same functions as the control section 1023, the voice control section 1026, and the tuner section 1031 (FIG. 23).

Further, the audio user interface 63 (FIG. 15) is the program module capable of realizing the same functions as the input processing section 1021, the control section 1023, and the display control section 1024 (FIG. 23).

Further, the CD reproduction module 64 (FIG. 15) is the program module capable of realizing the same functions as the voice control section 1026 and the external recording medium recording/reproducing section 1028 (FIG. 23).

Further, the HDD reproduction module 65 (FIG. 15) is the program module capable of realizing the same functions as the control section 1023 and the voice control section 1026 (FIG. 23).

Further, the ripping module 66 (FIG. 15) is the program module capable of realizing the same functions as the control section 1023, the external recording medium recording/reproducing section 1028, and the encoder/decoder section 1034 (FIG. 23).

Accordingly, the client terminal 2 with the hardware circuit block configuration in the third embodiment described above, in which the CPU 30 uses various program modules, is also capable of performing the same processing as the client terminal 1002 with the functional circuit block configuration in the fourth embodiment.

Further, in the portal server 4 (FIG. 11) in the third embodiment described above, the suitable selection of various programs stored in the ROM 11 and the hard disk drive 12, in accordance with the functions of the portal server 1003 (FIG. 24) in the fourth embodiment described above, enables the control section 10 to perform the same functions as the control section 1050, the communication control section 1052 and the authentication processing section 1056, of the portal server 1003, in accordance with the various programs, and also enables the ROM 11, the RAM 14 and the hard disk drive 12 to be used in the same manner as the customer database section 1054, the page information storing section 1055, the authentication information storing section 1057, the frequency information storing section 1058, and the URL storing section 1059, of the portal server 1003.

Further, in the contents sales server 5 (FIG. 12) in the third embodiment described above, the suitable selection of various programs stored in the ROM 21 and the hard disk drive 22, in accordance with the functions of the contents server 1005 (FIG. 25) in the fourth embodiment described above, enables the control section 20 to perform the same functions as the control section 1090, the communication control section 1092, the authentication processing section 1095 and the retrieval section 1099, of the contents sales server 1005, and also enables the ROM 21, the RAM 24, and the hard disk drive 22 to be used in the same manner as the customer database section 1094, the page information storing section 1096, the package media information storing section 1098 and the authentication information storing section 1097, of the contents sales server 1005.

(5) The Other Embodiments

In the above-mentioned third embodiment, there is described a case where the client terminal 2 having the music reproduction function is applied as the terminal unit having the first module (the application module 2A) and the second module (the communication module 2B), for receiving the page data from the page data offering device (the contents sales server 5) which offers the page data (the source of the A Corporation CD sales page), but the invention is not limited to the case, and the other various information processing units such as a personal computer may be applied to the case, provided that the page can be displayed based on the source described by the language, such as the XML.

In the above-mentioned third embodiment, there is described a case where the CPU 30, etc. of the client terminal 2 is applied as the delivery means to perform the processing of delivering the first request signal from the first module to the second module, but the invention is not limited to the case, and the other various configurations, e.g., the MPU (Micro Processing Unit), etc. may be applied to the case.

Further, in the above-mentioned third embodiment, there is described a case where the network interface 45 and the communication processing section 44 of the client terminal 2 are applied as the transmitting means to perform the processing for transmitting the first request signal and the reception request information (the authentication result information) to the page data offering device, and as the receiving means for receiving the page data, etc., but the invention is not limited to the case, the other various configurations may be applied to the case.

Further, in the above-mentioned embodiment, there is described a case where the program which has been installed beforehand in the client terminal 2, for performing the page display processing, as shown in FIGS. 16 and 17 or FIGS. 19 to 21, FIGS. 26 to 29, is applied as the page data receiving program having the first and second modules, for receiving the page data offered from the page data offering device for offering the page data, but the invention is not limited to the case and, for example, the program which is distributed from a predetermined server via the network, may be arranged to be installed at the times optional to the user.

Moreover, in the above-mentioned fourth embodiment, there is described a case where the control section 1023, etc. of the client terminal 1002 is applied as the delivery means which performs the processing, etc. for delivering the first request signal from the first module to the second module, but the invention is not limited to the case, and the other various configurations, e.g., MPU (Micro Processing Unit) etc. may be applied to the case.

Further, in the above-mentioned fourth embodiment, there is described a case where the communication control section 1032, etc. of the client terminal 1002 is applied as the transmitting means which performs the processing, etc. for transmitting the first request signal and the reception request information (the authentication result information) to the page data offering device, and as the receiving means for receiving the page data, etc., but the invention is not limited to the case, and the other various configurations may be applied to the case.

Further, in the above-mentioned embodiment, the radio broadcast broadcasted from the radio station is applied as the broadcast which can be received by the client terminals 2 and 1002, but the other case may be possible, such as a case where the client terminals 2 and 1002 receive the Internet radio broadcast and the satellite radio broadcast so as to obtain the related information (the radio broadcast information), or receive the television broadcast broadcasted from the television broadcasting station so as to obtain various broadcast information related to the television program of the television broadcast from the server on the network.

Further, in the above-mentioned embodiment, there is described a case where the hardware circuit block, the functional circuit block and the program module are mounted in the client terminals 2 and 1002, but the invention is not limited to the case, those may also be arranged to be mounted in various terminals, such as a portable telephone and personal computer, other than the client terminal 2 and 1002, so as to enable the same processing as the client terminal 2 and 1002 described above, to be effected, provided that the hardware circuit block, the functional circuit block and the program module describe above, are mounted in the terminals.

In the above-mentioned embodiment, there is describe a case where the terminal unit (the client terminal 1002) is constructed so as to comprise, the first transmitting means (the communication module 1002B) which transmits to the authentication server (the portal server 1004), the authentication request information (including the authentication session ID information, etc.) for requiring the user authentication, and the first receiving means (the communication module 1002B) which receives the authentication reply (including the authentication session ID information and the authentication error information, etc.) from the authentication server, the second transmitting means (the communication module 1002B) which in accordance with the authentication reply, transmits to the authentication server, the authentication ticket request information (including the authentication session ID information etc.) for requiring the authentication ticket for accessing the specific service provider's server (the contents sales server 1005), the second receiving means (the communication module 1002B) which receives the authentication reply including the authentication ticket from the authentication server, the third transmitting means (the communication module 1002B) which transmits, together with the received authentication ticket, the service request information (including the sales page request signal and the service session ID information, etc.) for requiring the service provision of the specific service provider's server, and the third receiving means (communication module 1002B) for receiving from the service provider's server, the authentication reply (including the service session ID information, etc.) indicating the authentication approval, when the authentication ticket is determined as authorized by the service provider's server.

However, the invention is not limited to the case, and the other various configurations which have functions equivalent to those described above may be applied.

INDUSTRIAL APPLICABILITY

The invention is able to be used, for example, in the system which offers various services by way of the network.

The invention claimed is:

1. A communication method in which a terminal unit connected with an authentication server and a plurality of service provider's servers via a network makes a request for authentication to each server, said communication method comprising:

transmitting authentication request information for requiring user authentication to said authentication server;

receiving a server authentication reply from said authentication server;

transmitting, in accordance with said server authentication reply, authentication ticket request information for requiring an authentication ticket for accessing a specific service provider's server, to said authentication server;

receiving an authentication ticket reply including said authentication ticket from said authentication server;

transmitting service request information for requiring a service provision, together with said received authentication ticket, to said specific service provider's server; and receiving an authentication service reply including a session identifier issued by the specific service provider's server, the service reply indicating the authentication approval from the service provider's server when said authentication ticket is determined as authorized by said service provider's server, and said authentication ticket is unique and issued only to said terminal unit and does not include the user authentication information;

transmitting by the terminal unit to said service provider's server, page request information for requiring page information;

transmitting by the terminal unit to said authentication server authentication ticket issuance request information for requiring issuance of said authentication ticket upon receipt of an authentication service reply indicating an authentication service error from said service provider's server;

transmitting by the terminal unit to said authentication server authentication request information for requiring user authentication, upon receipt of an authentication ticket reply indicating an authentication ticket error from said authentication server;

receiving at the terminal unit from said authentication server, a server authentication reply indicating a user authentication approval;

transmitting by the terminal unit to the authentication server authentication ticket request information for requiring an authentication ticket allowing an access to the specific service provider's server in accordance with said server authentication reply;

receiving at the terminal unit an authentication ticket reply including said authentication ticket from said authentication server; and transmitting by the terminal unit service request information for requiring a service provision from said specific service provider's server together with said received authentication ticket, when said authentication ticket is determined as authorized by said service provider's server, receiving an authentication service reply indicating the authentication approval from the service provider's server, and retransmitting said page request information to said service provider's server and receiving the page information from said service provider's server.

2. The communication method of claim 1, wherein the authentication request information requiring the user authentication, includes at least the user's identification information and password, and said server authentication reply indicating the user authentication approval includes authentication session information for accessing the authentication server for a predetermined period of time.

3. The communication method of claim 2, further comprising:

transmitting from the terminal unit to said authentication server, authentication ticket request information for requiring an authentication ticket for accessing a specific service provider's server, together with said authentication session information, wherein said authentication service reply indicating the authentication approval from the service provider's server further includes service session information for accessing the service provider's server for a predetermined period of time, and wherein retransmitting said page request information to said service provider's server includes said service session information.

4. A terminal unit which is connected with an authentication server and a plurality of service provider's servers via a network, said terminal unit comprising:

first transmitting means for transmitting authentication request information requiring user authentication to said authentication server;

first receiving means for receiving a server authentication reply from said authentication server;

second transmitting means for transmitting, to said authentication server, authentication ticket request information for requiring an authentication ticket for accessing a specific service provider's server, in accordance with said server authentication reply;

second receiving means for receiving an authentication ticket reply including said authentication ticket from said authentication server;

third transmitting means for transmitting service request information requiring a service provision together with said received authentication ticket, to said specific service provider's server, and third receiving means for receiving an authentication service reply including a session identifier issued by the specific service provider's server, the service reply indicating the authentication approval from the specific service provider's server, when said authentication ticket is determined as authorized by said specific service provider's server, wherein said authentication ticket is unique and issued only to said terminal unit and does not include the user authentication information, and wherein said terminal unit further includes a first module and a second module, said first module transmits page request information for requiring page information to said second module, said second module transmits said page request information to said specific service provider's server, when said second module receives an authentication service reply indicating an authentication service error from said specific service provider's server, said second module, after transmitting authentication ticket issuance request information for requiring issuance of said authentication ticket to said authentication server, and when receiving an authentication ticket reply indicating an authentication ticket error from said authentication server, transmits authentication request information for requiring the user authentication to said authentication server, said second module, receives a server authentication reply indicating the authentication approval from said authentication server, said second module, in accordance with said server authentication reply, transmits, to said authentication server, authentication ticket request information for requiring an authentication ticket for accessing the specific service provider's server, said second module receives an authentication ticket reply including said authentication ticket from said authentication server, second module transmits, together with said received authentication ticket, service request information for requiring a service provision to said specific service provider's server, said second module, when said authentication ticket is determined as authorized by said service provider's server, receives an authentication service reply indicating the authentication approval from the specific service provider's server, said second module retransmits said page request information to said specific service provider's server, said second module receives the page information from said specific service provider's server, and transmits the page information to said first module, and said first module generates image information from the received page information.

* * * * *